(12) United States Patent
Yamamoto et al.

(10) Patent No.: US 7,725,467 B2
(45) Date of Patent: May 25, 2010

(54) INFORMATION SEARCH SYSTEM, INFORMATION PROCESSING APPARATUS AND METHOD, AND INFORMATION SEARCH APPARATUS AND METHOD

(75) Inventors: Noriyuki Yamamoto, Tokyo (JP); Mari Saito, Kanagawa (JP)

(73) Assignee: Sony Corporation, Tokyo (JP)

( * ) Notice: Subject to any disclaimer, the term of this patent is extended or adjusted under 35 U.S.C. 154(b) by 1113 days.

(21) Appl. No.: 10/509,278

(22) PCT Filed: Mar. 27, 2003

(86) PCT No.: PCT/JP03/03795

§ 371 (c)(1),
(2), (4) Date: Sep. 27, 2004

(87) PCT Pub. No.: WO03/083723

PCT Pub. Date: Oct. 9, 2003

(65) Prior Publication Data

US 2005/0165739 A1 Jul. 28, 2005

(30) Foreign Application Priority Data

Mar. 29, 2002 (JP) ............................. 2002-095414

(51) Int. Cl.
*G06F 7/00* (2006.01)
*G06F 17/30* (2006.01)
(52) U.S. Cl. ..................... 707/736; 707/748; 707/750; 707/755; 707/738
(58) Field of Classification Search ...................... None
See application file for complete search history.

(56) References Cited

U.S. PATENT DOCUMENTS 5,481,296 A * 1/1996 Cragun et al. ............... 725/136

(Continued)

FOREIGN PATENT DOCUMENTS

EP 0 924 927 A2 6/1999

(Continued)

OTHER PUBLICATIONS

Takeshi Motohashi et al., *Internet Construction of TV Guide Service*, No. 1-No. 2, The Information Processing Society of Japan,. No. 53 (1996).

(Continued)

*Primary Examiner*—Tim T. Vo
*Assistant Examiner*—Jay A Morrison
(74) *Attorney, Agent, or Firm*—Finnegan, Henderson, Farabow, Garrett & Dunner, L.L.P.

(57) ABSTRACT

The present invention relates to an information search system, an information processing apparatus and method, and information search apparatus and method. A PC extracts, from the mail document transmitted/received by a user, words corresponding to the user's interests and records the interest data. In steps S121 and S122, upon logged in by the user, an HDD recorder requests the acquisition of interest data. On the basis of this request, the PC sends the interest data corresponding to the login user. In steps S123 and S124, the HDD recorder sends the received interest data to a server. In step S131, the server searches for the program information that matches the received interest data. In step S125, on the basis of the program information contained in the search result, the HDD recorder sets the timer-recording of a program. The present invention is applicable to programs which are installed in personal computers.

31 Claims, 41 Drawing Sheets

U.S. PATENT DOCUMENTS

| | | | |
|---|---|---|---|
| 5,561,457 A * | 10/1996 | Cragun et al. | 725/137 |
| 5,619,247 A | 4/1997 | Russo | |
| 5,732,216 A * | 3/1998 | Logan et al. | 709/203 |
| 5,794,249 A * | 8/1998 | Orsolini et al. | 707/104.1 |
| 6,011,895 A | 1/2000 | Abecassis | |
| 6,088,722 A | 7/2000 | Herz et al. | |
| 6,199,076 B1 * | 3/2001 | Logan et al. | 715/203 |
| 6,424,997 B1 * | 7/2002 | Buskirk et al. | 709/206 |
| 6,591,245 B1 * | 7/2003 | Klug | 705/10 |
| 6,983,483 B2 * | 1/2006 | Maze et al. | 725/53 |
| 7,007,294 B1 * | 2/2006 | Kurapati | 725/53 |
| 7,107,271 B2 * | 9/2006 | Aoki et al. | 707/10 |
| 7,111,042 B2 * | 9/2006 | Kikugawa | 709/204 |
| 7,315,881 B2 * | 1/2008 | Menez | 709/206 |
| 2002/0059180 A1 | 5/2002 | Aoki et al. | |
| 2002/0059588 A1 * | 5/2002 | Huber et al. | 725/35 |
| 2002/0087577 A1 * | 7/2002 | Manjunath et al. | 707/104.1 |
| 2002/0199193 A1 * | 12/2002 | Gogoi et al. | 725/46 |
| 2002/0199194 A1 * | 12/2002 | Ali | 725/46 |
| 2003/0070173 A1 * | 4/2003 | Nakano et al. | 725/89 |
| 2003/0101451 A1 * | 5/2003 | Bentolila et al. | 725/34 |

FOREIGN PATENT DOCUMENTS

| | | |
|---|---|---|
| EP | 1 189 151 | 3/2002 |
| JP | 2000-341599 | 12/0000 |
| JP | 7-135621 | 5/1995 |
| JP | 10-257405 | 9/1998 |
| JP | 11-7453 | 1/1999 |
| JP | 11-7453 P | 1/1999 |
| JP | 2000-155764 | 6/2000 |
| JP | 2000-307993 | 11/2000 |
| JP | 2001-57543 | 2/2001 |
| JP | 2001-189896 | 7/2001 |
| JP | 2001-275048 | 10/2001 |
| JP | 2001-282830 | 10/2001 |
| JP | 2001-282831 | 10/2001 |
| JP | 2001-283101 | 10/2001 |
| JP | 2001-312513 | 11/2001 |
| JP | 2001-312515 | 11/2001 |
| JP | 2002-51287 | 2/2002 |
| JP | 2002-77755 | 3/2002 |
| WO | WO 97/13368 A | 4/1997 |
| WO | WO 01/78382 A | 10/2001 |

OTHER PUBLICATIONS

Notification of Reasons for Refusal issued from Japanese Patent Office in counterpart application No. JP 2003-581075 dated Mar. 5, 2009 (3 pages) with English language translation thereof (3 pages).
Sato et al., "Network Navigation Assistance Systems Based on Intelligent Search Technologies," Matsushita Technical Journal vol. 44 No. 5, Oct. 1998 (7 pages).
Communication from Japanese Patent Office in counterpart application No. JP 2003-581075 dated Jul. 23, 2009 (2 pages) with English language translation thereof (2 pages).

* cited by examiner

F I G. 2 2

☐ MAIL GROUP WITH URL EXECUTED ☐▼ TIMES IS DETERMINED TO BE UPDATED.

☐ MAIL GROUP WITH ALL RECOMMENDED URLS USED IS DETERMINED TO BE UPDATED.

☐ MAIL GROUP THAT HAS PASSED ☐▼ DAYS FROM LAST UPDATE IS DETERMINED TO BE UPDATED.

☐ MAIL GROUP WITH SEARCH WORD CHANGED BY ANALYSIS OF NEWLY RECEIVED MAIL IS DETERMINED TO BE UPDATED.

FIG. 31

TO:**@aa.co.jp
FROM:OOO@bb.co.jp
SUBJECT:TIMER RECORDING MAIL

RECORD A MUSIC PROGRAM TODAY.
ESPECIALLY, CLASSICAL. IF THERE
IS ANY JAZZ PROGRAM, RECORD IT
TOO. LASTLY, RECORD THE WORLD
CUP INFORMATION.

TO:OOO@bb.co.jp
FROM: XX@cc.co.jp
SUBJECT:TIMER RECORDING SETTING
COMPLETION MAIL

THE FOLLOWING PROGRAMS
HAVE BEEN RECORDED:

(1) 4CH, 19:00-20:00
"WORLD CUP HIGHLIGHTS"
(2) 3CH, 21:00-21:54
"XXX CLASSICAL"

~ 251

F I G. 4 2

| COMPONENT | GENRE | BROADCASTING STATION | BROADCAST TIME ZONE | CAST | KEYWORD | ... |
|---|---|---|---|---|---|---|
| No. 1 | COOKING | TAS | NOON | AAA | RECIPE, INGREDIENTS, STEPS, TELETEXT BROADCAST, STEREO | ... |
| No. 2 | DAILY LIFE INFORMATION | MHK | NIGHT | BBB | LEISURE, RESORT, CHILDREN, TELETEXT BROADCAST, STEREO | ... |
| No. 3 | CHILDREN | MHK | MORNING | CCC | LEISURE, CHILDREN, TELETEXT BROADCAST, STEREO | ... |
| ... | ... | ... | ... | ... | ... | ... |

FIG. 43

| COMPONENT | GENRE | BROADCASTING STATION | BROADCAST TIME ZONE | CAST | KEYWORD |
|---|---|---|---|---|---|
| No. 1-1 | COOKING | TAS | NOON | AAA | RECIPE, INGREDIENTS, STEPS, TELETEXT BROADCAST, STEREO |
| No. 1-2 | COOKING | MHK | NOON | DDD | RECIPE, INGREDIENTS, STEPS, BOILED FOOD, TELETEXTBROADCAST, STEREO |
| No. 1-3 | COOKING | MHK | MORNING | EEE | RECIPE, INGREDIENTS, STEPS, KITCHEN, TELETEXT BROADCAST, STEREO |
| ... | ... | ... | ... | ... | ... |

FIG. 45

| | KEYWORD | FREQUENCY/MONTH | GENRE | OTHER COMPONENTS |
|---|---|---|---|---|
| 1 | RECIPE | 3 | COOKING | ... |
| 2 | INGREDIENTS | 7 | COOKING | ... |
| 3 | STEPS | 2 | COOKING | ... |
| 4 | LEISURE | 15 | DAILY LIFE INFORMATION, CHILDREN | ... |
| 5 | RESORT | 3 | DAILY LIFE INFORMATION | ... |
| 6 | CHILDREN | 12 | DAILY LIFE INFORMATION, CHILDREN | ... |
| ... | ... | ... | ... | ... |

INFORMATION SEARCH SYSTEM, INFORMATION PROCESSING APPARATUS AND METHOD, AND INFORMATION SEARCH APPARATUS AND METHOD

TECHNICAL FIELD

The present invention relates generally to an information search system, an information processing apparatus and method, and an information search apparatus and method, and more particularly, to an information search system, an information processing apparatus and method, and an information search apparatus and method which acquire words of user's interest from documents such as electronic mail and recommend program information associated with the words.

BACKGROUND ART

Known for the methods of recommending television programs and radio programs are initial interest registering, viewing log using, and emphasis filtering, for example.

In each of these methods, the source data is EPG (Electronic Program Guide) information or program information (program metadata) on the Web for example. The methods are classified into the above-mentioned three methods depending on how the user's preference data to be matched with these pieces of information are obtained.

In the initial interest registering method, user's favorite categories (such as drama and variety for example), favorite genre names (such as drama and music for example), and favorite entertainers' names for example are registered by the user at the time of starting the use of a recommendation service. Subsequently, matching is executed with the program metadata by use of the registered information as keywords, thereby acquiring program names to be recommended.

In the viewing log using method, every time the user views programs, the program metadata about each viewed program are accumulated, and when a predetermined amount of viewing log (or program metadata) are accumulated, the accumulated viewing log is analyzed to acquire program names for recommendation. With a device on which video recording is made onto its hard disk drive for example, an operation log such as timer video recording and starting of video recording for example by the user may be used instead of the above-mentioned viewing log. In this case, the information highly reflecting user's interest can be obtained, rather than vague program information.

In the emphasis filtering method, the viewing (or operation) log of one user is matched with the viewing logs of other users to acquire viewing logs of other users which are similar to the viewing log of the user concerned. Then, of the programs viewed by other users similar in viewing log (namely, similar in preference) to the viewing of the user concerned, those program names which have not been viewed by the user concerned are obtained for recommendation.

Use of the above-mentioned known program recommendation methods allows the recommendation of programs in which each user seems to be interested.

However, each of the above-mentioned known recommendation methods comes to extract user's interest from program metadata (namely, resulting in the acquisition of lopsided interests in television programs). And, in the structure of program metadata, each of these methods uses generally intelligible program names, thereby presenting a problem that similarly sounding programs are recommended.

Namely, each of the above-mentioned known recommendation methods cannot reflect user's daily interests to the programs, thereby failing to recommend timely and useful programs.

At the same time, each of these methods presents a problem that, when particular programs are recommended, the user cannot understand the reason of the recommendation.

DISCLOSURE OF INVENTION

It is therefore an object of the present invention to analyze the electronic mail daily used by each user, extract words corresponding to user's interest, search the program names which match the extracted words, recommend the matching programs, and present the reasons of the recommendations.

The first information search system according to the present invention is characterized in that it includes the information processing apparatus having: extraction means for analyzing predetermined information to extract an interest word for obtaining program information about a program; search request means for sending the interest word extracted by the extraction means to the information search apparatus to request a search for the program information corresponding to the interest word; and reception means for receiving the program information from the information search apparatus on the basis of the search request means; the information search apparatus having: accumulation means for accumulating the program information; search means for searching the accumulation means for the program information associated with the interest word contained in the search request on the basis of the search request sent from the information processing apparatus; and transmission means for sending the program information retrieved by the search means to the information processing apparatus.

The extraction means of the information processing apparatus may include morphological analysis means for performing morphological analysis on the predetermined information to resolve the predetermined information into the interest word.

The information processing apparatus may further include database construction means for generating a database of the interest word extracted by the extraction means.

The information processing apparatus may further include recording control means for controlling the recording of the program on the basis of the program information received by the reception means.

The information processing apparatus may further include display control means for controlling the display of the program information received by the reception means.

The accumulation means of the information search apparatus may include database construction means for making a database by relating the program information with the program.

The predetermined information may include at least one of document information, preference information associated with the program, and a viewing log of the program.

The document information may be electronic mail.

The program information may include recording start time, recording end time, and channel information for recording the program.

The information processing apparatus may acquire the predetermined information from another information processing apparatus.

The first information processing apparatus according to the present invention is characterized in that it includes: extraction means for analyzing predetermined information to extract an interest word for obtaining program information associated with a program; search request means for sending the interest word extracted by the extraction means to an information search apparatus to request the search of the program information corresponding to the interest word; and reception means for receiving the program information from the information search apparatus on the basis of the search request means.

The extraction means may include morphological analysis means for performing morphological analysis on the predetermined information to resolve the predetermined information into the interest word.

The information processing apparatus may further include database construction means for generating a database of the interest word extracted by the extraction means.

The information processing apparatus may further include recording control means for controlling the recording of the program on the basis of the program information received by the reception means.

The information processing apparatus may further include display control means for controlling the display of the program information received by the reception means.

The predetermined information may include at least one of document information, preference information associated with the program, and a viewing log of the program.

The document information may be electronic mail.

The program information may include recording start time, recording end time, and channel information for recording the program.

The predetermined information may be obtained from another information processing apparatus.

The first information processing method according to the present invention is characterized in that it includes: an extraction step of analyzing predetermined information to extract an interest word for obtaining program information associated with a program; a search request step of sending the interest word extracted by the extraction step to an information search apparatus to request the search of the program information corresponding to the interest word; and a reception control step of controlling reception of the program information from the information search apparatus on the basis of the search request step.

The first recording medium according to the present invention is characterized in that it records a program which includes: an extraction step of analyzing predetermined information to extract an interest word for obtaining program information associated with a program; a search request step of sending the interest word extracted by the extraction step to an information search apparatus to request the search of the program information corresponding to the interest word; and a reception control step of controlling reception of the program information from the information search apparatus on the basis of the search request step.

The first program according to the present invention makes a computer execute: an extraction step of analyzing predetermined information to extract an interest word for obtaining program information associated with a program; a search request step of sending the interest word extracted by the extraction step to an information search apparatus to request the search of the program information corresponding to the interest word; and a reception control step of controlling reception of the program information from the information search apparatus on the basis of the search request step.

The first information search apparatus according to the present invention is characterized in that it records a program which includes: accumulation means for accumulating program information associated with a program; reception means for receiving an interest word for obtaining the program information, the interest word being sent from an information processing apparatus; search means for searching the accumulation means for the program information associated with the interest word received by the reception means; and transmission means for sending the program information retrieved by the search means to the information processing apparatus.

The interest word may be a word obtained by performing morphological analysis on predetermined information on the information processing apparatus.

The program information may contain recording start time, recording end time, and channel information for recording the program.

The first information search apparatus may further include: analysis means for analyzing the program information; dictionary generation means for generating dictionary data for relating a genre of the program information with a keyword on the basis of a result of the analysis by the analysis means; and database generation means for assigning a genre to the program information on the basis of the dictionary data generated by the dictionary generation means and storing the program information with the genre.

The information search apparatus may further include keyword search means for extracting a keyword from the interest word, acquires a genre corresponding to the keyword by searching the dictionary data on the basis of the keyword, and searching for the program information on the basis of the genre.

The dictionary generation means may have keyword detection means for detecting a word which is high in cooccurrence in metadata of a particular genre among words included in the metadata, as a keyword of the genre.

The dictionary generation means may generate the dictionary data by storing, with the keyword, a frequency at which the keyword is detected.

The database generation means may complement a component which is not included in the program information on the basis of a component contained in the program information.

The first information search method according to the present invention is characterized in that it includes: an accumulation control step of controlling accumulation of program information associated with a program; a reception control step of controlling reception of an interest word for obtaining the program information, the interest word being sent from an information processing apparatus; a search step of searching for the program information associated with the interest word received by the reception control step; and a sending control step of controlling sending of the program information retrieved by the search step to the information processing apparatus.

The second recording medium according to the present invention is characterized in that it records a program which includes: an accumulation control step of controlling accumulation of program information associated with a program; a reception control step of controlling reception of an interest word for obtaining the program information, the interest word being sent from an information processing apparatus; a search step of searching for the program information associated with the interest word received by the reception control step; and a sending control step of controlling sending of the program information retrieved by the search step to the information processing apparatus.

The second program according to the present invention makes a computer execute: an accumulation control step of controlling accumulation of program information associated with a program; a reception control step of controlling reception of an interest word for obtaining the program information, the interest word being sent from an information processing apparatus; a search step of searching for the program information associated with the interest word received by the reception control step; and a sending control step of controlling sending of the program information retrieved by the search step to the information processing apparatus.

The second information search system according to the present invention is characterized in that it includes the mobile terminal apparatus having: generation means for generating timer-recording information for timer-recording a program; and first transmission means for sending the timer-recording information generated by the generation means to the information processing apparatus; the information processing apparatus having: extraction means for analyzing the timer-recording information sent from the mobile terminal apparatus to extract an interest word for obtaining program information associated with the program; search request means for sending the interest word extracted by the extraction means to the information search apparatus to request for the search for the program information corresponding to the interest word; and reception means for receiving the program information from the information search apparatus on the basis of the search request means; the information search apparatus having: accumulation means for accumulating the program information; search means for searching the accumulation means for the program information associated with the interest word contained in the search request on the basis of the search request sent from the information processing apparatus; and second transmission means for sending the program information retrieved by the search means to the information processing apparatus.

The extraction means may include morphological analysis means for performing morphological analysis on the predetermined information to resolve the predetermined information into the interest word.

The information processing apparatus may further include recording control means for controlling the recording of the program on the basis of the program information received by the reception means.

The accumulation means of the information search apparatus may include database construction means for generating a database by relating the program information with the program.

The timer-recording information may include at least one of program name, genre name, and cast name.

The timer-recording information may be electronic mail.

The program information may contain recording start time, recording end time, and channel information for recording the program.

The second information processing apparatus according to the present invention is characterized in that it includes: extraction means for analyzing timer-recording information sent from a mobile terminal apparatus to extract an interest word for obtaining program information associated with a program; search request means for sending the interest word extracted by the extraction means to an information search apparatus to request for the search for the program information corresponding to the interest word; and reception means for receiving the program information from the information search apparatus on the basis of the search request means.

The extraction means may include a morphological analysis means for performing morphological analysis on the predetermined information to resolve the predetermined information into the interest word.

The information processing apparatus may further include recording control means for controlling the recording of the program on the basis of the program information received by the reception means.

The timer-recording information may include at least one of program name, genre name, and cast name.

The timer-recording information may be electronic mail.

The program information may contain recording start time, recording end time, and channel information for recording the program.

The second information processing method according to the present invention is characterized in that it includes: an extraction step of analyzing timer-recording information sent from a mobile terminal apparatus to extract an interest word for obtaining program information associated with a program; a search request step of sending the interest word extracted by the extraction step to an information search apparatus to request for the search for the program information corresponding to the interest word; and reception control step of controlling reception of the program information from the information search apparatus on the basis of the search request step.

The third recording medium according to the present invention is characterized in that it records a program which includes: an extraction step of analyzing timer-recording information sent from a mobile terminal apparatus to extract an interest word for obtaining program information associated with a program; a search request step of sending the interest word extracted by the extraction step to an information search apparatus to request for the search for the program information corresponding to the interest word; and a reception control step of controlling reception of the program information from the information search apparatus on the basis of the search request step.

The third program according to the present invention makes a computer execute: an extraction step of analyzing timer-recording information sent from a mobile terminal apparatus to extract an interest word for obtaining program information associated with a program; a search request step of sending the interest word extracted by the extraction step to an information search apparatus to request for the search for the program information corresponding to the interest word; and a reception control step of controlling reception of the program information from the information search apparatus on the basis of the search request step.

The third information search system according to the present invention is characterized in that it includes the information processing apparatus having: extraction means for analyzing electronic mail to extract an interest word for obtaining program information associated with a program; search request means for sending the interest word extracted by the extraction means to the information search apparatus to request for the search for the program information corresponding to the interest word; and reception means for receiving the program information from the information search apparatus on the basis of the search request by the search request means, the information search apparatus having: accumulation means for accumulating the program information; search means for searching the accumulation means for the program information associated with the interest word contained in the search request on the basis of the search request sent from the information processing apparatus; and transmission means for sending the program information retrieved by the search means to the information processing apparatus.

The third information processing apparatus is characterized in that it includes: extraction means for analyzing electronic mail to extract an interest word for obtaining program information associated with a program; search request means for sending the interest word extracted by the extraction means to an information search apparatus to request for the search for the program information corresponding to the interest word; and reception means for receiving the program information from the information search apparatus on the basis of the search request by the search request means.

The third information processing method is characterized in that it includes: an extraction step of analyzing electronic mail to extract an interest word for obtaining program information associated with a program; a search request step of sending the interest word extracted by the extraction step to an information search apparatus to request for the search for the program information corresponding to the interest word; and a reception control step of controlling reception of the program information from the information search apparatus on the basis of the search request by the search request step.

The fourth recording medium according to the present invention is characterized in that it records a program which includes: an extraction step of analyzing electronic mail to extract an interest word for obtaining program information associated with a program; a search request step of sending the interest word extracted by the extraction step to an information search apparatus to request for the search for the program information corresponding to the interest word; and a reception control step of controlling reception of the program information from the information search apparatus on the basis of the search request by the search request step.

The fourth program according to the present invention makes a computer execute: an extraction step of analyzing electronic mail to extract an interest word for obtaining program information associated with a program; a search request step of sending the interest word extracted by the extraction step to an information search apparatus to request for the search for the program information corresponding to the interest word; and a reception control step of controlling reception of the program information from the information search apparatus on the basis of the search request by the search request step.

In the first information search system according to the present invention, the information processing apparatus analyzes predetermined information to extract an interest word for obtaining program information about a program; requests a search for the program information corresponding to the extracted interest word; and receives the program information from the information search apparatus on the basis of the search request; the information search apparatus searches for the program information associated with the interest word contained in the search request on the basis of the search request sent from the information processing apparatus; and sends the retrieved program information to the information processing apparatus.

In the first information processing apparatus and method, as well as the program according to the present invention, predetermined information is analyzed and an interest word is extracted to obtain program information associated with a program; the search of the program information corresponding to the extracted interest word is requested; the program information from the information search apparatus on the basis of the search request is requested.

In the information search apparatus and method, as well as the second program according to the present invention, an interest word for obtaining the program information which has been sent from an information processing apparatus is received; the received program information associated with the interest word is searched for; the retrieved program information is sent to the information processing apparatus.

In the second information search system according to the present invention, the mobile terminal apparatus generates timer-recording information for timer-recording a program; and sends the timer-recording information to the information processing apparatus; the information processing apparatus analyzes the timer-recording information sent from the mobile terminal apparatus to extract an interest word for obtaining program information associated with the program; requests for the search for the program information corresponding to the interest word; and receives the program information from the information search apparatus on the basis of the search request; the information search apparatus searches for the program information associated with the interest word contained in the search request on the basis of the search request sent from the information processing apparatus; and sends the retrieved program information to the information processing apparatus.

In the second information processing apparatus and method, as well as the third program according to the present invention, timer-recording information sent from a mobile terminal apparatus is analyzed and an interest word is extracted to obtain program information associated with a program; the search for the program information corresponding to the extracted interest word is requested; and the program information from the information search apparatus on the basis of the search request is received.

In the third information search system according to the present invention, the information processing apparatus analyzes electronic mail to extract an interest word for obtaining program information associated with a program; requests for the search for the program information corresponding to the interest word; and receives the program information from the information search apparatus on the basis of the search request, the information search apparatus searches for the program information associated with the interest word contained in the search request on the basis of the search request sent from the information processing apparatus; and sends the retrieved program information to the information processing apparatus.

In the third information processing apparatus and method, as well as the fourth program according to the present invention, electronic mail is analyzed and an interest word is extracted to obtain program information associated with a program; the search for the program information corresponding to the extracted interest word is requested; and the program information from the information search apparatus on the basis of the search request is received.

BRIEF DESCRIPTION OF DRAWINGS

FIG. 22 shows an exemplary display of a user interface through which database update conditions are entered.

FIG. 31 shows one example of mail for timer recording.

FIG. 32 shows one example of mail indicative of completion of timer recording setting.

FIG. 42 shows an exemplary configuration of metadata resolved into components.

FIG. 43 shows an exemplary configuration of metadata collected by genre.

FIG. 45 shows an exemplary configuration of dictionary data.

BEST MODE FOR CARRYING OUT THE INVENTION

This invention will be described in further detail by way of example with reference to the accompanying drawings.

Figure 1:
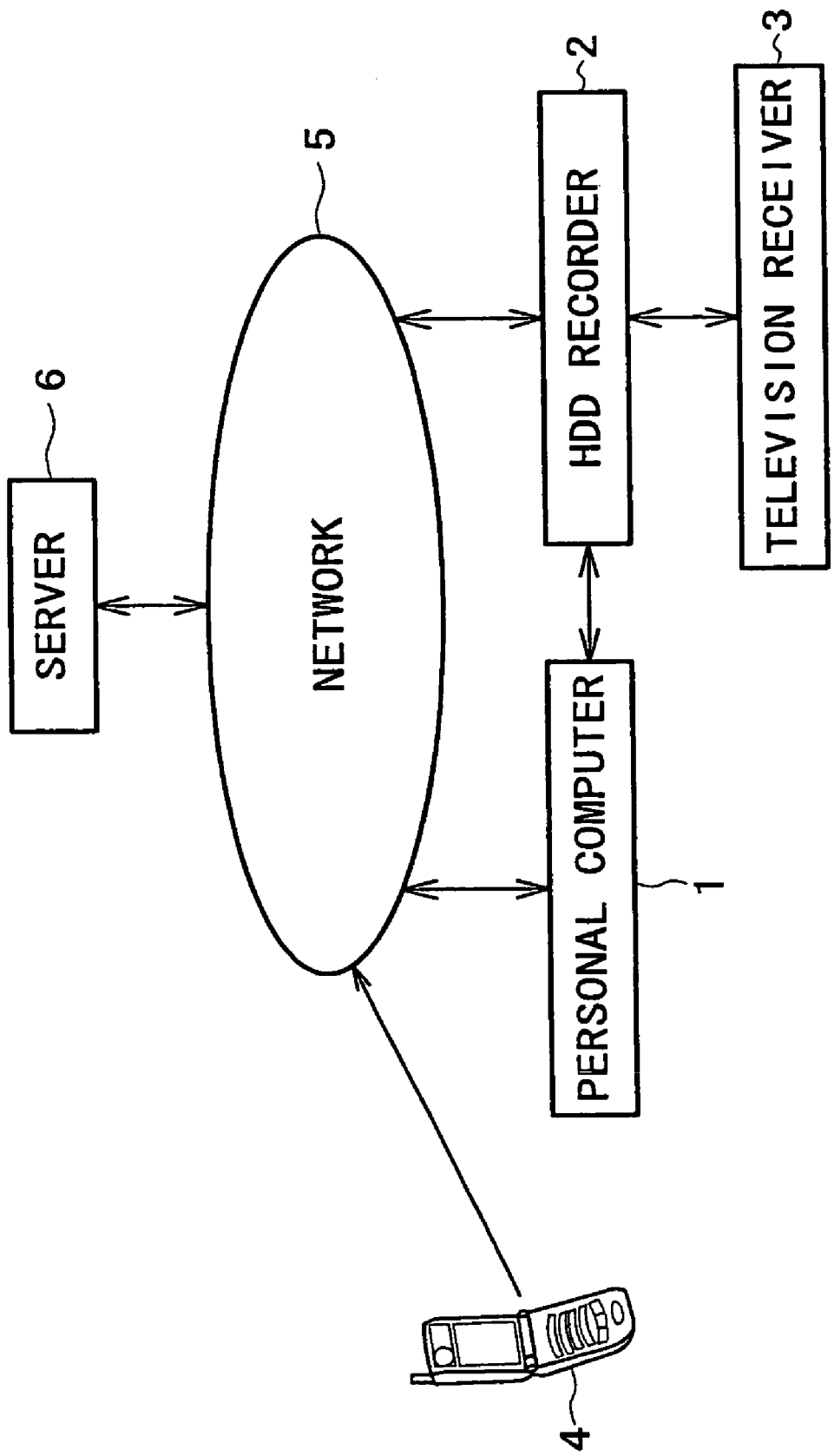
FIG. 1 is a schematic diagram illustrating an exemplary configuration of a program search system to which the present invention is applied.

FIG. 1 shows an exemplary configuration of a program search system to which the present invention is applied. In this program search system, the user terminals such as a personal computer 1, a hard disk drive (HDD) recorder 2, and a digital mobile phone 4 are connected to a network 5 such as the Internet, and a server 6 for searching for program information (or program metadata) to be recommended is also connected to this network 5. The personal computer 1 is connected to the HDD recorder 2 via Ethernet (trademark) for example. The HDD recorder 2 is connected to a television receiver 3. Namely, the personal computer 1, HDD recorder 2, and television receiver 3 are owned by one user (or one family), each being arranged in the proximity of another.

The personal computer 1 is an information processing apparatus on which various application programs can be executed, performing the transmission and reception of electronic mail, the browsing of Web pages, and the generation of documents, for example. In addition, the personal computer 1 extracts words (hereafter appropriately referred to as interest words) corresponding to user's interests from documents obtained by the transmission/reception of electronic mail to generate a database of interest data, which will be described later with reference to the flowchart shown in FIG. 23.

The HDD recorder 2 records television programs to a mass storage hard disk drive, and on the basis of user instructions, outputs recorded television programs to the television receiver 3 to reproduce them. In addition, the HDD recorder 2 acquires interest data from the personal computer 1 and sends the interest data to the server 6 via the network 5 to acquire the recommendation of programs matching the interest data, which will be described later with reference to the flowchart shown in FIG. 25.

Figure 30:
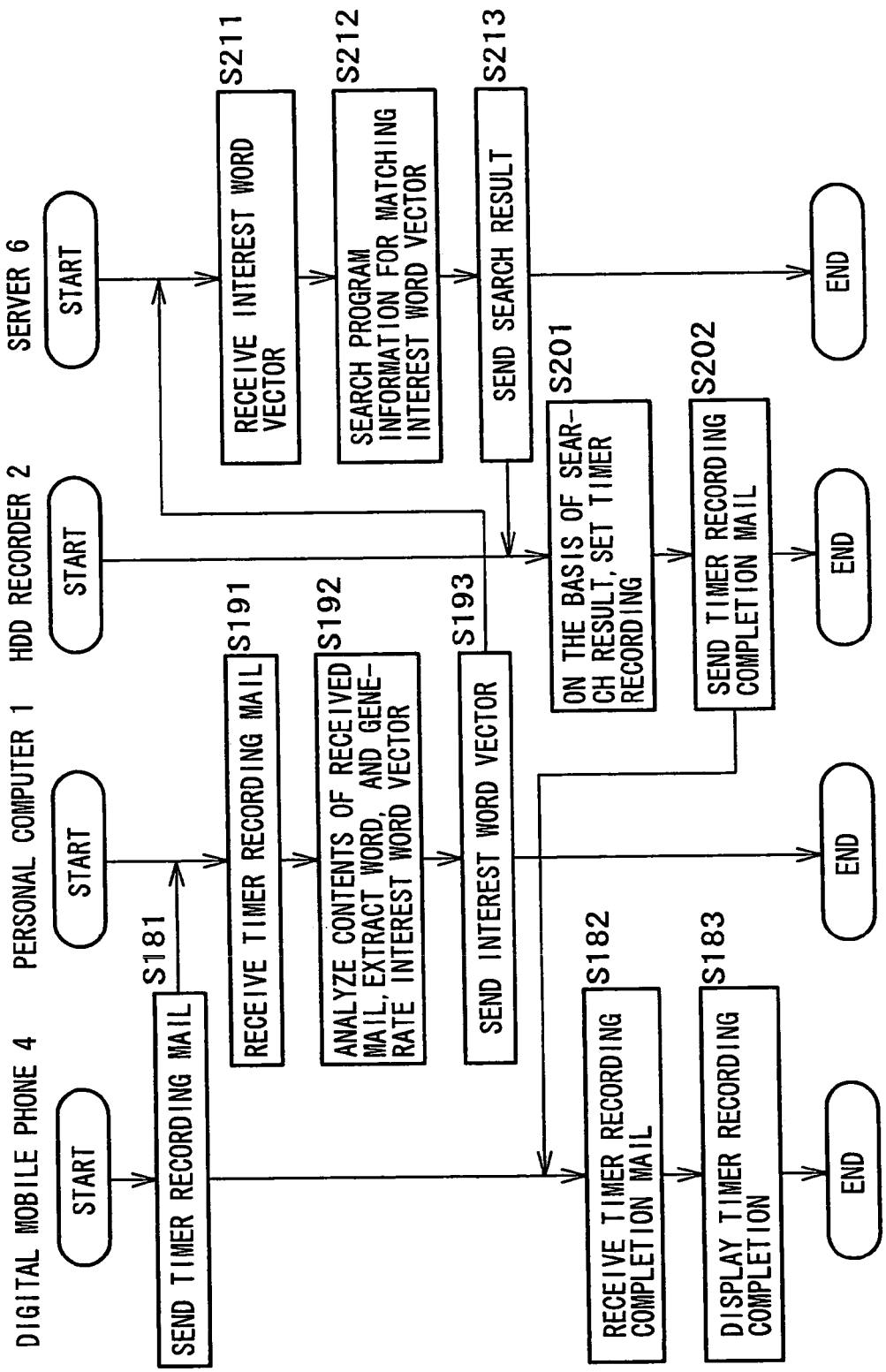
FIG. 30 is a flowchart indicative of program timer recording processing.

The digital mobile phone 4 generates an electronic mail message for timer-recording a program and sends the generated electronic mail message to the personal computer 1 or the HDD recorder 2 via the network 5 to make it timer record the program, which will be described later with reference to the flowchart shown in FIG. 30.

The network 5 may be any of a public line network, a mobile wireless communication network, a local area network, a network such as the Internet, and a digital satellite broadcasting network, regardless of wired or wireless.

In the example of the program search system shown in FIG. 1, there are shown only one unit of the personal computer 1, one unit of the HDD recorder 2, one unit of the television receiver 3, and one unit of the digital mobile phone 4 connected to the system as user terminals. It will be apparent that more than one unit may be connected to the system as each user terminal.

Figure 2:
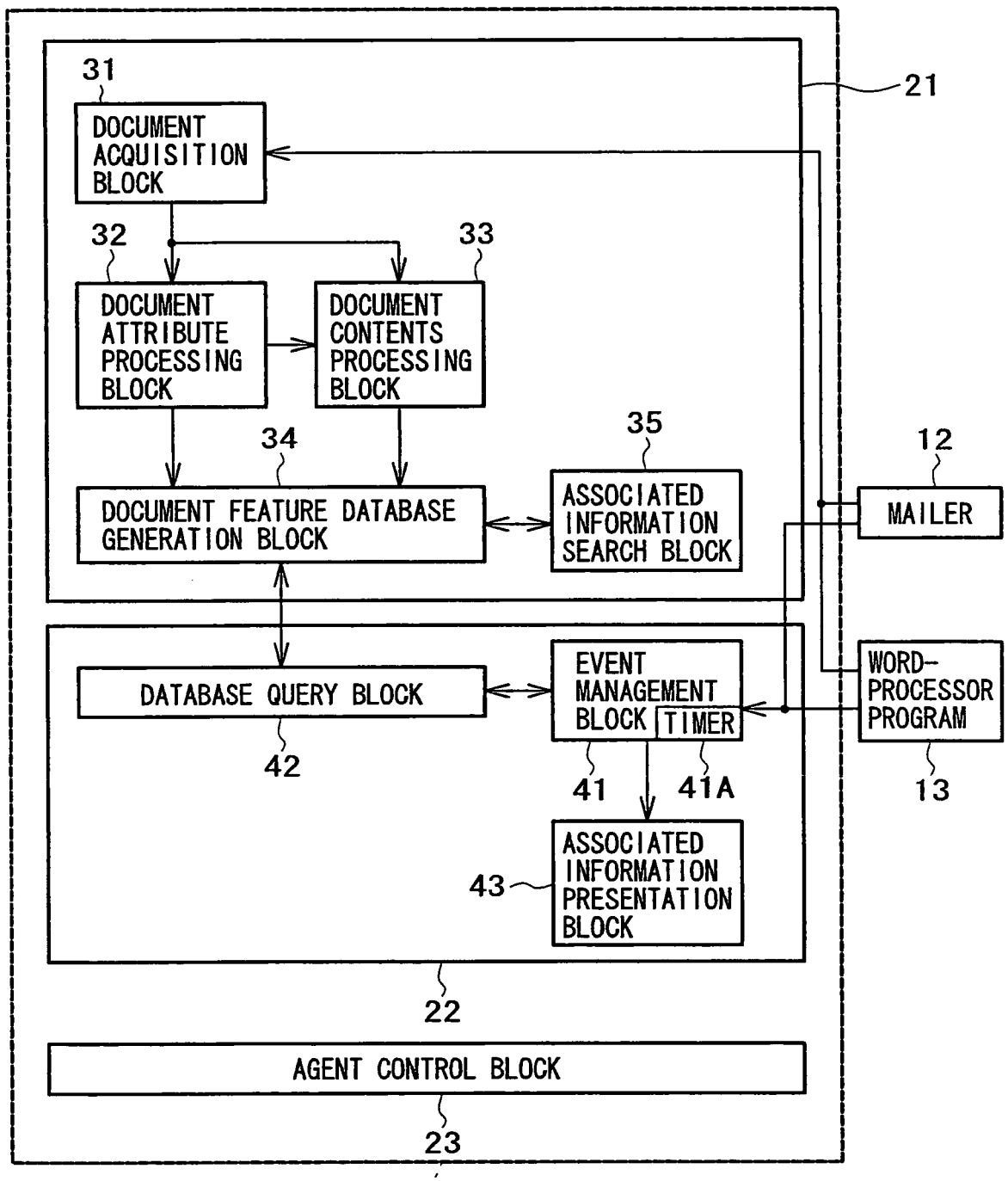
FIG. 2 is a block diagram illustrating the functions of an agent program running on a personal computer shown in FIG. 1.

FIG. 2 illustrates a relationship between an application program (hereafter referred to as an agent program) 11 for displaying a desktop mascot (hereafter referred to as an agent) on desktop, an application program (hereafter referred to as a mailer) 12 for transmitting and receiving electronic mail, and a wordprocessor program 13 for generating and editing documents, these programs being installed and executed on the personal computer 1.

Figure 28:
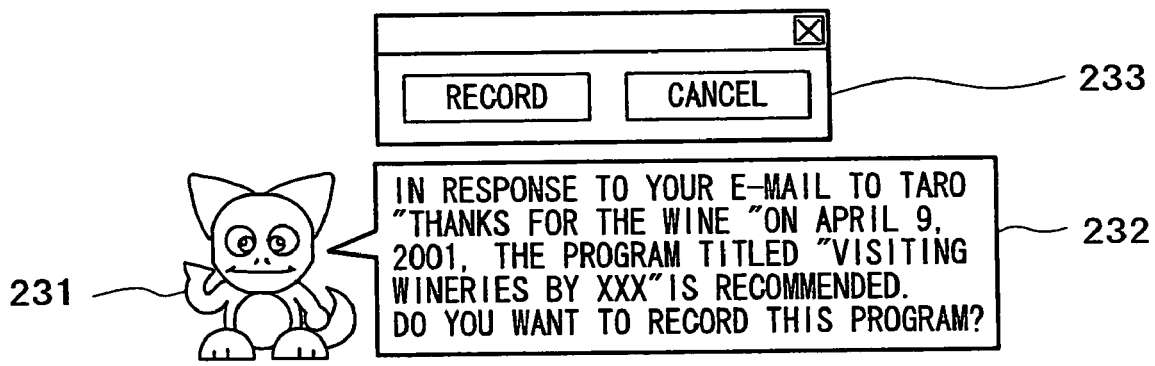
FIG. 28 shows an exemplary display of another recommendation reason.

The agent program 11 is composed of an accumulation block 21 which builds a database by extracting words corresponding to user interest from a document to be processed and storing the interest data by which program search is performed and the associated information of the document to be processed, a presentation block 22 for presenting the recommended information corresponding to the document to be processed to the user, and an agent control block 23 for controlling the displaying and so on of an agent 231 (refer to FIG. 28).

It should be noted that the accumulation block 21 and the presentation block 22 may be installed any server on the Internet.

A document acquisition block 31 of the accumulation block 21 acquires documents not yet processed thereby from among, the documents transmitted/received to/from the mailer 12 or edited by the wordprocessor program 13, and supplies the obtained documents to a document attribute processing block 32 and a document contents processing block 33. Also, the document acquisition block 31 acquires the preference information (such as the names of genre and cast of user preference) initially registered with the HDD recorder 2 by the user or a viewing log and supplies the obtained information and log to the document contents processing block 33.

It should be noted that, in what follows, mainly the processing of the electronic mail document transmitted/received to/from the mailer 12 will be used as the subject of processing by way of example.

The document attribute processing block 32 extracts the attribute information of documents supplied from the document acquisition block 31, and on the basis of the extracted attribute information, groups the documents, and supplies the grouped documents to the document contents processing block 33 and a document feature database generation block 34. In the case of electronic mail, the attribute information includes the information described in the header of each document such as a message ID for identifying the electronic mail message in question, a message ID of an electronic mail message under reference ("References" and "In-Reply-To"), destination ("To", "Cc", and "Bcc"), transmission source ("From"), date, and subject. On the basis of the extracted attribute information, one or more documents are grouped. In what follows, each document group (or an electronic mail group) formed on the basis of the attribute information will be referred to as a "topic".

The topic generally referred to herein also denotes a sequence of documents interrelated in a certain relationship with respect to all documents which are generated by wordprocessor programs, editors, schedulers, and other tools and application software programs.

The document contents processing block 33 extracts a body of each of the documents (topics) grouped by the document attribute processing block 32, performs morphological analysis on the extracted body, and classifies the analyzed body into words (or feature words). Further, the document contents processing block 33 performs morphological analysis on the preference information of the viewing log supplied from the document acquisition block 31 and classifies them into words (or interest words).

Words are classified into parts of speech (namely, noun, adjective, verb, adverb, conjunction, interjection, postpositional particle, and auxiliary verb). However, words distributed over wide ranges, those words seemed to be included in most documents, such as "Hello", "Thank you", and "Please" for example, namely the parts of speech other than noun cannot provide the keywords (hereafter also referred to as search words) by which search is performed for associated information. Therefore, these words are deleted from the keywords as unwanted words.

The document contents processing block 33 obtains, after deletion of unwanted words, the occurrence frequency of each word and its distribution over two or more documents, thereby computing the weight (the value indicative of the degree of relation to the main purport of the document, hereafter referred to as an evaluation value) of each word for each of grouped documents (or topics).

Further, the document contents processing block 33 determines, for each topic, a feature vector of which element is the evaluation value of each word. For example, let the total number of words (or feature words) included in each topic be n, then the feature vector of each topic is expressed by the following equation as an nth dimensional vector:

$$\text{Feature vector} = (\text{evaluation value } w1 \text{ of word } 1, \text{evaluation value } w2 \text{ of word } 2, \ldots, \text{evaluation value } wn \text{ of word } n) \quad (1)$$

For the computation of evaluation values, tf·idf technique disclosed in a document (Salton, G.: Automatic Text Processing: The Transformation, Analysis, and Retrieval of Information by Computer, Addison-Wesley, 1989) for example. According to tf·idf technique, of the nth dimensional feature vectors corresponding to topic A, a value other than 0 is computed as an evaluation value for the element corresponding to a word included in topic A, and 0 is computed as an evaluation value for the element corresponding to a word (having frequency 0) not included in topic A.

It should be noted that the evaluation value is modified in accordance with the frequency and count of the transmission/reception of electronic mail messages, the type (for example, a proper nouns indicative of particular place or name) of the part of speech of each word included in electronic mail messages, and the mate of the transmission/reception of electronic mail messages.

In the present embodiment, the description is made supposing the computation of a feature vector for each topic. But the computation is not restricted to this configuration. For example, a feature vector may be computed for each document or in other units (for example, for each document group accumulated at predetermined time intervals such as every week).

The document feature database generation block 34 makes, a time-dependent manner, a database of the attribute information of each document of the documents grouped by the document attribute processing block 32 and the feature vectors (namely, the evaluation values of words included in the topic) of each topic computed by the document contents processing block 33. At the same time, the document feature database generation block 34 generates the interest data (to be described later) from preference information or the viewing log, computed by the document contents processing block 33, makes a database of the generated interest data, and stores these databases in a storage block 59 constituted by a hard disk drive for example.

Also, by referencing word evaluation values, the document feature database generation block 34 selects a word satisfying a predetermined condition and record the selected word as a search keyword (or a search word or an interest word) for searching for associated information and program information. Further, the document feature database generation block 34 supplies the search word to an associated information search block 35 and records the associated information supplied from the associated information search block 35 by relating the supplied associated information with the search word.

The associated information search block 35 searches for the associated information corresponding to the search word supplied from the document feature database generation block 34 and supplies an index obtained by the search operation to the document feature database generation block 34. For a method of searching for the associated information corresponding to each search word, a method in which a search engine on the Internet is used is available, for example. If this method is applied, the URL (Uniform Resource Locator) and title of the Web page obtained as a search result are supplied to the document feature database generation block 34 as the associated information.

An event management block 41 of the presentation block 22 detects the activation of the mailer 12, the completion of the transmission/reception of electronic mail by the mailer 12, and the running of the text data amount of a document being entered over a predetermined threshold, and sends the detected information to a database query block 42. In what follows, the completion of the transmission/reception of electronic mail by the mailer 12 or the running of the text data amount of a document being entered over a predetermined threshold will be described as the event occurrence.

By referencing an incorporated timer 41A, the event management block 41 monitors the passing of time, and whenever a predetermined time has passed since a predetermined point of time, notifies the database query block 42 of the predetermined passing of time.

In response to the notification of an event occurrence from the event management block 41, the database query block 42 acquires a document corresponding to the event occurrence (for example, a received electronic mail message), performs morphological analysis on the obtained document as with the processing by the document contents processing block 33, performs word extraction, deletes unwanted words, and computes the evaluation value of each remaining word. Consequently, a feature vector of the document corresponding to an event occurrence is computed.

In addition, the database query block 42 searches the database generated by the document feature database generation block 34 and computes an inner product of the computed feature vector of the document corresponding to an event occurrence and the feature vector of each topic recorded to the database, as the similarity between both feature vectors. Further, the database query block 42 determines a topic of the highest similarity to the document corresponding to the event occurrence, selects a word whose evaluation value satisfies a predetermined condition (of which details will be described later) from among the words included in the determined topic, and supplies the associated information (or the recommendation information) about the selected words (important words) to an associated information presentation block 43 via the event management block 41 or directly.

Besides, the database query block 42 reads, from the database, the interest data corresponding to the user who logged in on the HDD recorder 2 and sends the read interest data to the HDD recorder 2 or reads, from the database, the interest data generated from the preference information or the viewing log in response to an event occurrence and sends the read interest data to the server 6 via the network 5, thereby requesting the search for the program information matching these interest data.

The associated information presentation block 43 displays, onto a display block 58 (or the desktop), the associated information (or the recommendation information) supplied from the database query block 42 via the event management block 41 or directly. Namely, every time an event occurrence is detected by the event management block 41, the presentation of the associated information by the presentation block 22 is updated.

It should be noted that the database updating by the accumulation block 21 is executed in a predetermined timed relation. The database update processing will be described later with reference to the flowchart shown in FIG. 21. when the database updating is executed by the accumulation block 21, the feature vector stored in the storage block 59 is modified in accordance with the frequency and count of electronic mail transmission/reception and the type (for example, a proper noun indicative of a particular place or name) of part of speech of each word included in electronic mail.

The agent program, not shown, which is installed and executed on the HDD recorder 2 has substantially the same functions as those of the above-mentioned agent program 11 shown in FIG. 2. It should be noted that the HDD recorder 2 may use (or share) the accumulation block 21 of the personal computer 1, thereby eliminating the installation and execution of the agent program of the HDD recorder 2.

Figure 3:
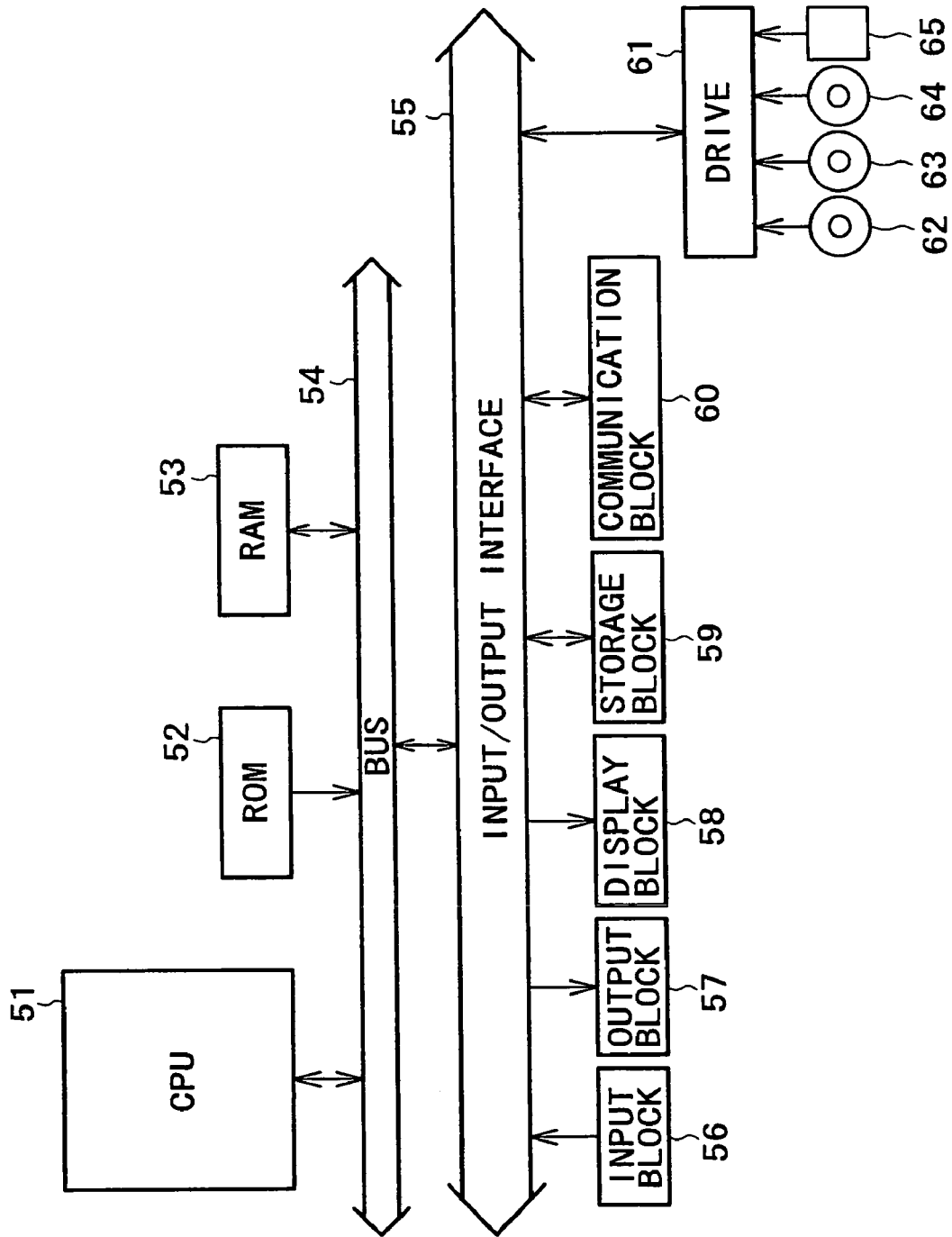
FIG. 3 is a block diagram illustrating an exemplary configuration of a personal computer on which the above-mentioned agent program is installed and executed.

FIG. 3 shows an exemplary configuration of the personal computer 1 on which the agent program 11 to the wordprocessor program 13 are installed and executed. Obviously, the present invention is practicable in not only personal computers but also home server systems, game machines, car navigation systems, PDAs (Personal Digital Assistants), and other information electronic devices.

The personal computer 1 incorporates a CPU (Central Processing Unit) 51. The CPU 51 is connected to an input/output interface 55 via a bus 54. The input/output interface 55 is connected to an input block 56 constituted by an input devices such as keyboard and mouse, an output block 57 for outputting audio signals for example obtained as a result of processing, the display block 58 constituted by a display device for displaying images obtained as a result of processing, the storage block 59 constituted by a hard disk drive for example for storing programs and structured databases, a communication block 60 constituted by a LAN (Local Area Network) card for example for communicating data via a network typified by the Internet, and a drive 61 writing/reading data to/from a recording medium such as a magnetic disk 62, an optical disk 63, a magneto-optical disk 64, or a semiconductor memory 65. The bus 54 is connected to a ROM (Read Only Memory) 52 and a RAM (Random Access Memory) 53.

The agent program 11 according to the present invention is supplied to the personal computer 1 as stored in a recording medium, the magnetic disk 62 to the semiconductor memory 65, read by the drive 61 therefrom or obtained by the communication block 60 via a network, and installed in the hard disk drive incorporated in the storage block 59. The agent program 11 stored in the storage block 59 is loaded, for execution, from the storage block 59 into the RAM 53 by an instruction issued by the CPU 51 in response to a command entered by the user through the input block 56. It should be noted that the system may be set such that the agent program 11 is automatically executed upon startup of the personal computer 1.

The hard disk drive of the storage block 59 also stores the mailer 12, the wordprocessor program 13, and other application programs including a WWW (World Wide Web) browser, in addition to the agent program 11. As with the agent program 11, these application programs are loaded, for execution, from the storage block 59 into the RAM 53 by an instruction issued by the CPU 51 in response to a command entered by the user through the input block 56.

Figure 4:
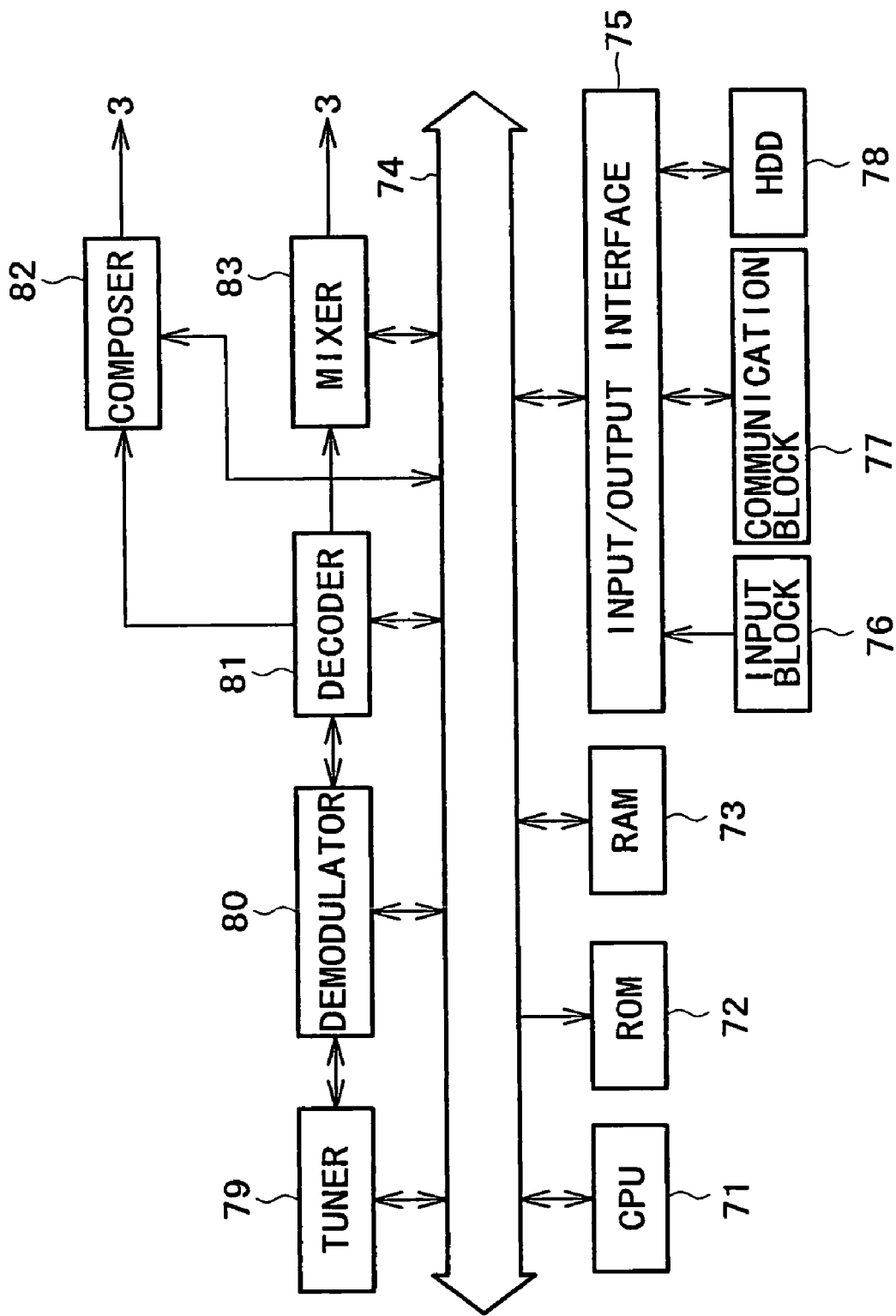
FIG. 4 is a block diagram illustrating an exemplary configuration of an HDD recorder.

FIG. 4 is a block diagram illustrating an exemplary configuration of the HDD recorder 2. This HDD recorder 2 can store a large amount of images in a mass-storage hard disk drive (HDD) 78 and reflect the management (viewing log and operation log for example) of the recorded images by properly understanding user intention. It should be noted that the HDD recorder 2 can be mounted as an AV device to be unitized with a television receiver like a set-top box (STB) for example.

A CPU 71, the main controller for controlling the HDD recorder 2 in its entirety, controls the tuner 79, a demodulator 80, a decoder 81, and the HDD 78 on the basis of input signals supplied from an input block 76, thereby recording and reproducing broadcast programs.

A RAM 73 is a writable volatile memory into which execution programs of the CPU 71 are loaded and to which the operation data of these execution programs are written. The ROM 72 is a read-only memory in which a self diagnosis and initialization program to be executed upon power-on sequence of the HDD recorder 2 and the control codes for hardware operation are stored.

The input block 76, constituted by a remote commander, buttons, switches, and a keyboard for example, outputs the input signals corresponding to operations done to the CPU 71 via an input/output interface 75 and a bus 74.

A communication block 77 communicates with the server 6 via the network 5 to receive recommended program metadata and communicates with the personal computer 1 to transmit/receive predetermined data (for example, interest data). The data inputted in the communication block 77 are recorded to the HDD 78 via the input/output interface 75 from time to time.

The HDD 78 is a random access storage unit which is capable of storing programs and data in a predetermined file format and has a mass storage capacity. The HDD 78 is connected to the bus 74 via the input/output interface 75, thereby receiving broadcast programs and broadcast data such as EPG (Electronic Program Guide) data from the decoder 81 or communication block 77 to record the received programs and data, and at the same time, output the recorded data as required.

Broadcast waves received at an antenna, not shown, are supplied to the tuner 79. The broadcast waves are based on a predetermined format and may include EPG data for example. The broadcast waves may be any of satellite broadcast waves, ground waves, wired waves, and wireless waves.

The tuner 79 is tuned to the broadcast wave of a predetermined channel under the control of the CPU 71 and outputs the received data to the demodulator 80. It should be noted that the configuration of the tuner 79 may be appropriately changed or extended depending on whether the received broadcast waves are analog or digital. The demodulator 80 demodulates the digitally modulated received data and outputs the demodulated data to the decoder 81.

In the case of digital satellite broadcasting, the digital data received by the tuner 79 and demodulated by the demodulator 80 are a transport stream in which the AV data compressed by MPEG2 (Moving Picture Experts Group 2) and the data for data broadcasting are multiplexed. The AV data is composed of video data and audio data constituting a broadcast program body and the data for data broadcasting includes the data (for example, EPG data) which accompanies this broadcast program body.

The decoder 81 separates the transport stream supplied from the demodulator 80 into the MPEG-compressed AV data and the data for data broadcasting (for example, the EPG data). The resultant data for data broadcasting is supplied to the HDD 78 via the bus 74 and the input/output interface 75 to be recorded therein.

If an instruction is given to output the received program as it is, the decoder 81 separates the AV data further into the compressed video data and the compressed audio data. The resultant audio data is decoded to be outputted to a speaker of the television receiver 3 via a mixer 83. The resultant video data is decompressed to be outputted to a monitor of the television receiver 3 via a composer 82.

If an instruction is given to record the recorded program to the HDD 78, the decoder 81 outputs the AV data before separation to the HDD 78 via the bus 74 and the input/output interface 75. If an instruction is given to reproduce the program stored in the HDD 78, the decoder 81 receives the input of the AV data from the HDD 78 via the input/output interface 75 and the bus 74 and separates the received AV data into the compressed video data and the compressed audio data, outputting them to the composer 82 and the mixer 83 respectively.

The composer 82 composes the video data inputted from the decoder 81 with a GUI (Graphical User Interface) as required and outputs the resultant data to the monitor of the television receiver 3.

Figure 5:
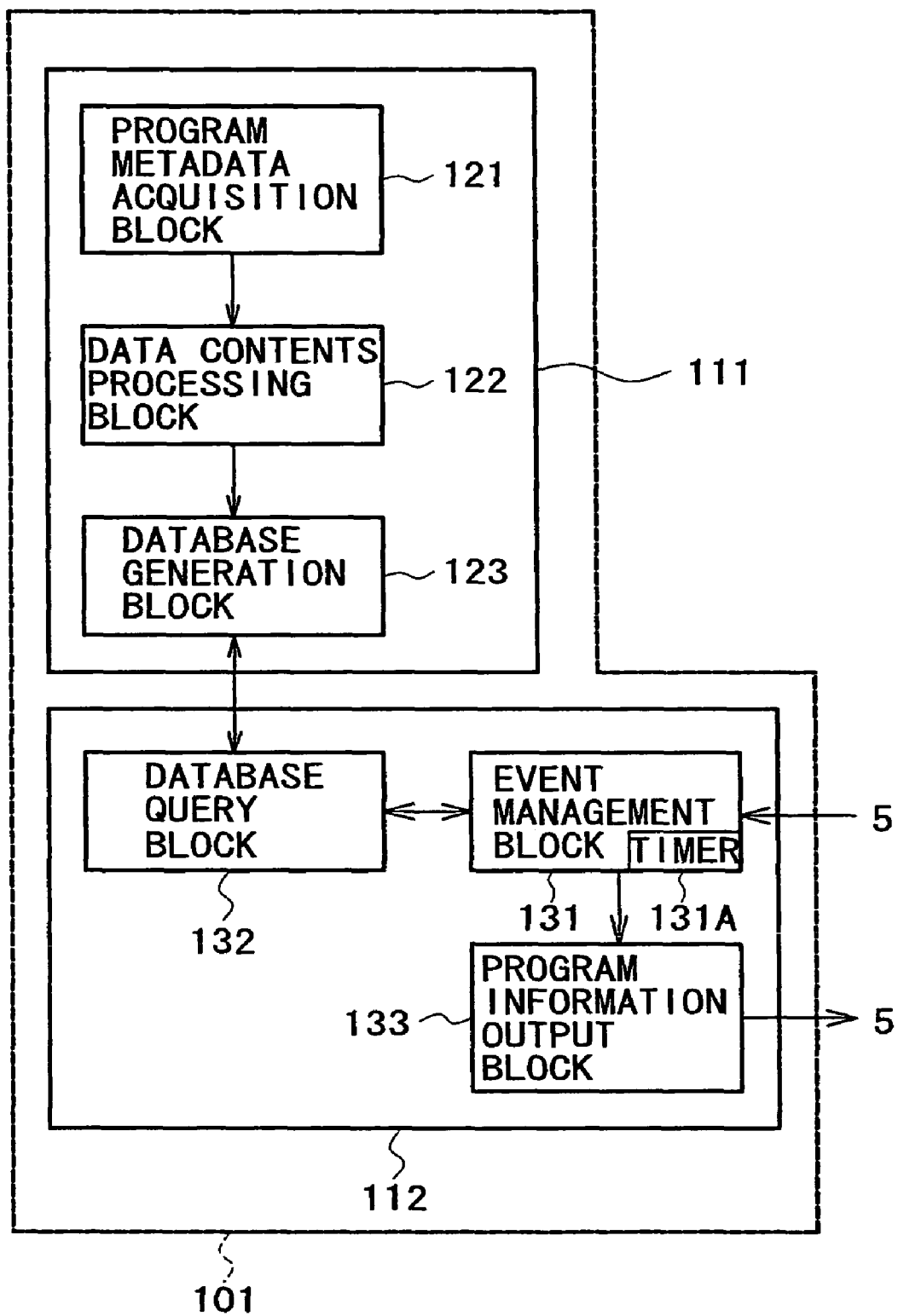
FIG. 5 is a schematic diagram illustrating the functions of a server program of a server shown in FIG. 1.

FIG. 5 shows the function of a server program 101 which is installed and executed on the server 6.

The server program 101 is composed of an accumulation block 111 for analyzing the program metadata such as EPG data to be processed and builds a database for recommended programs on the basis of the analysis, and a search block 112 for searching the recommended program database stored in the accumulation block 111 for the program information matching user's interest data.

A program metadata acquisition block 121 of the accumulation block 111 acquires the program metadata not yet processed thereby from among, the program metadata such as EPG data from an EPG data providing apparatus, not shown, and supplies the acquired program metadata to a data contents processing block 122.

The data contents processing block 122 performs morphological analysis on the program metadata received from the program metadata acquisition block 121 to extract program information (program name, genre name, broadcasting station, time zone, cast, and keyword, for example). The extracted program information is supplied to a database generation block 123.

The database generation block 123 makes a database of the program information extracted by the data contents processing block 122, for each program and records the generated database into a storage block 147 (FIG. 6) including a hard disk drive.

An event management block 131 of the search block 112 detects the input of interest data from the user terminal (the personal computer 1 or the HDD recorder 2) via the network 5 and notifies a database query block 132 thereof. In what follows, the detection of the input of interest data will be referred to as a search request. At the same time, the event management block 131 monitors the passing of time by referencing an incorporated timer 131A, and whenever a predetermined time has passed since a predetermined point of time, notifies the database query block 132 of the predetermined passing of time.

On the basis of search request from the event management block 131, the database query block 132 acquires the interest data corresponding to the search request. By use of a search engine, the database query block 132 searches the recommended program database generated by the database generation block 123 for the program information matching the obtained interest data and selects it as a recommended program.

Also, the database query block 132 acquires the preference information (such as names of preference genre and cast) initially registered by the user terminal apparatus or a viewing log, performs morphological analysis on the obtained preference information or viewing log in the same manner as the processing by the data contents processing block 122 to extract interest data, searches the recommended program database of the database generation block 123 for the program information matching the extracted interest data, and selects it as a recommended program.

The recommended program selected as described above is supplied to a program information output block 133 via the event management block 131 or directly.

The program information output block 133 outputs the recommended program (or recommended program information) supplied from the database query block 132 via the event management block 131 or directly to the user terminal apparatus (the personal computer 1 or the HDD recorder 2) via the network 5.

It should be noted that the updating of the recommended program database by the accumulation block 111 is executed every time EPG data is updated or at predetermined time intervals.

Figure 6:
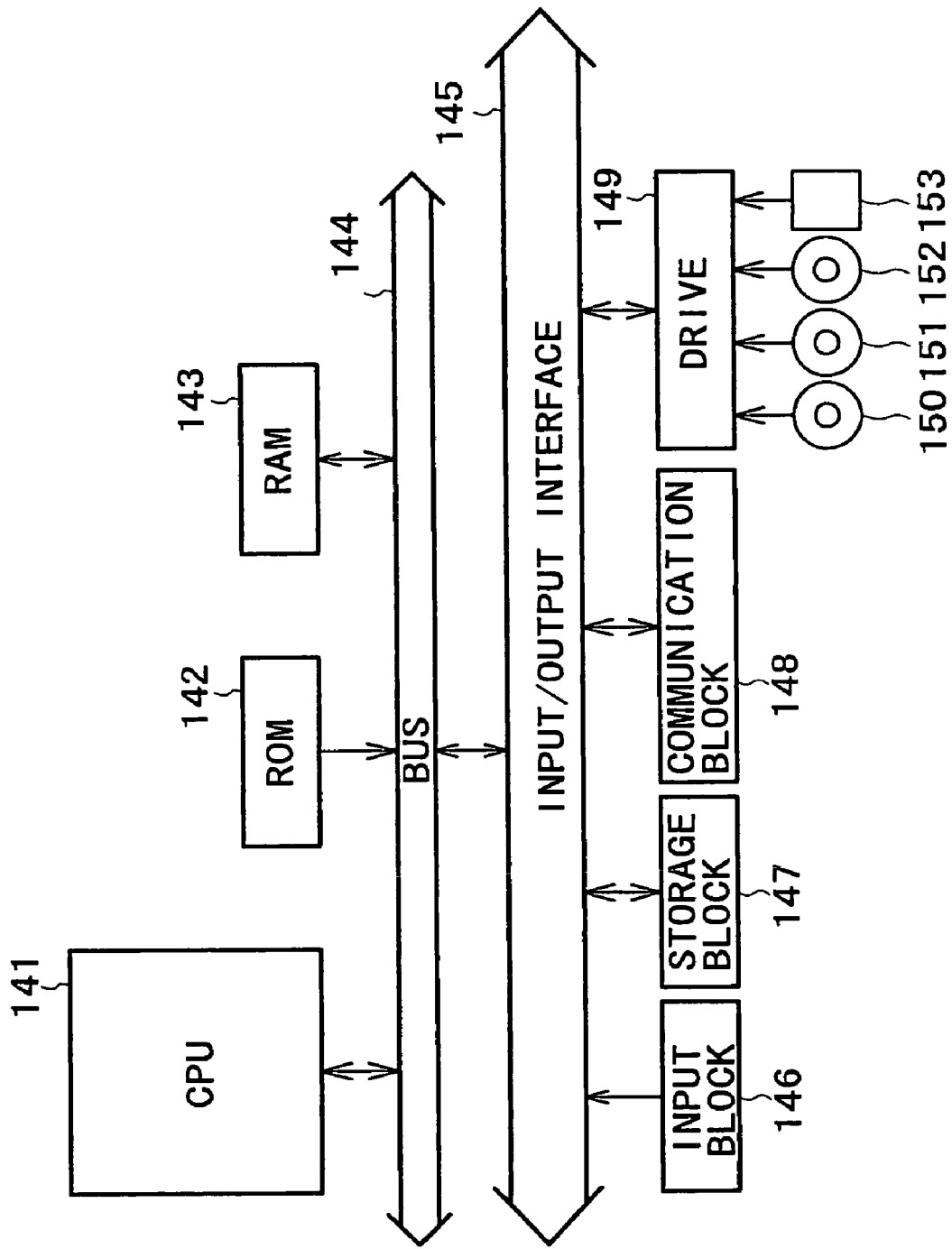
FIG. 6 is a block diagram illustrating an exemplary configuration of the server on which the server program is installed and executed.

FIG. 6 shows an exemplary configuration of the server 6 on which the server program 101 is installed and executed. The components, a CPU 141 to a semiconductor memory 153 shown in the figure have basically the same configurations as those of the CPU 51 to the input block 56 of the personal computer 1 shown in FIG. 3, so that their descriptions will be skipped.

Figure 7:
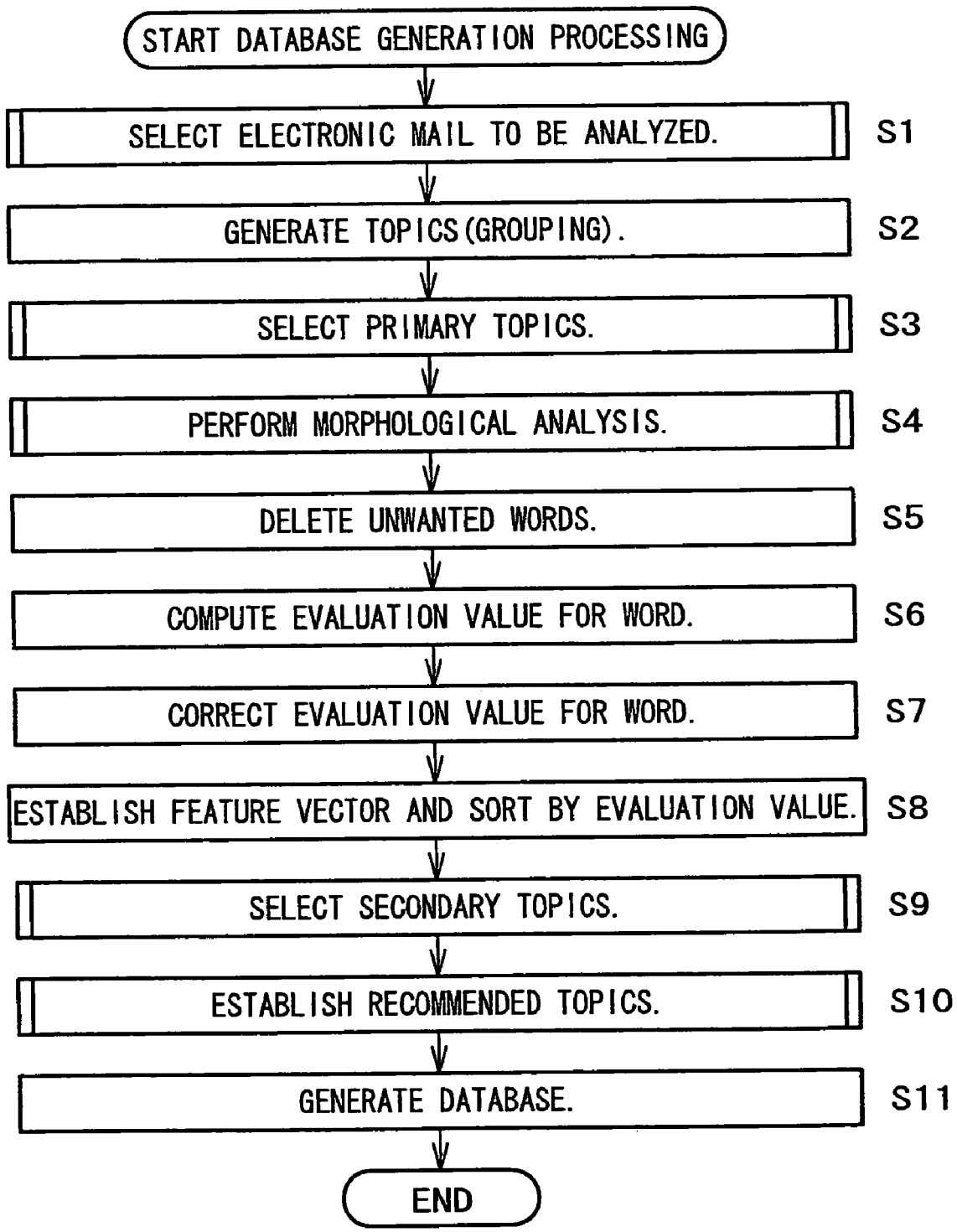
FIG. 7 is a flowchart indicative of database generation processing by the agent program.

The following describes the database generation processing by the agent program 11 of the personal computer 1 with reference to the flowchart shown in FIG. 7. This database generation processing is one of the processing operations which are executed by the agent program 11 and starts when no database has been generated with the agent program 11 having started up.

In step S1, the document acquisition block 31 selectively acquires a document to be analyzed for database generation (for example, the electronic mail transmitted/received before the agent program 11 is executed, hereafter referred to as the electronic mail subject to analysis) from the hard disk drive of the storage block 59 and supplies the obtained document to the document attribute processing block 32 and the document contents processing block 33.

Figure 8:
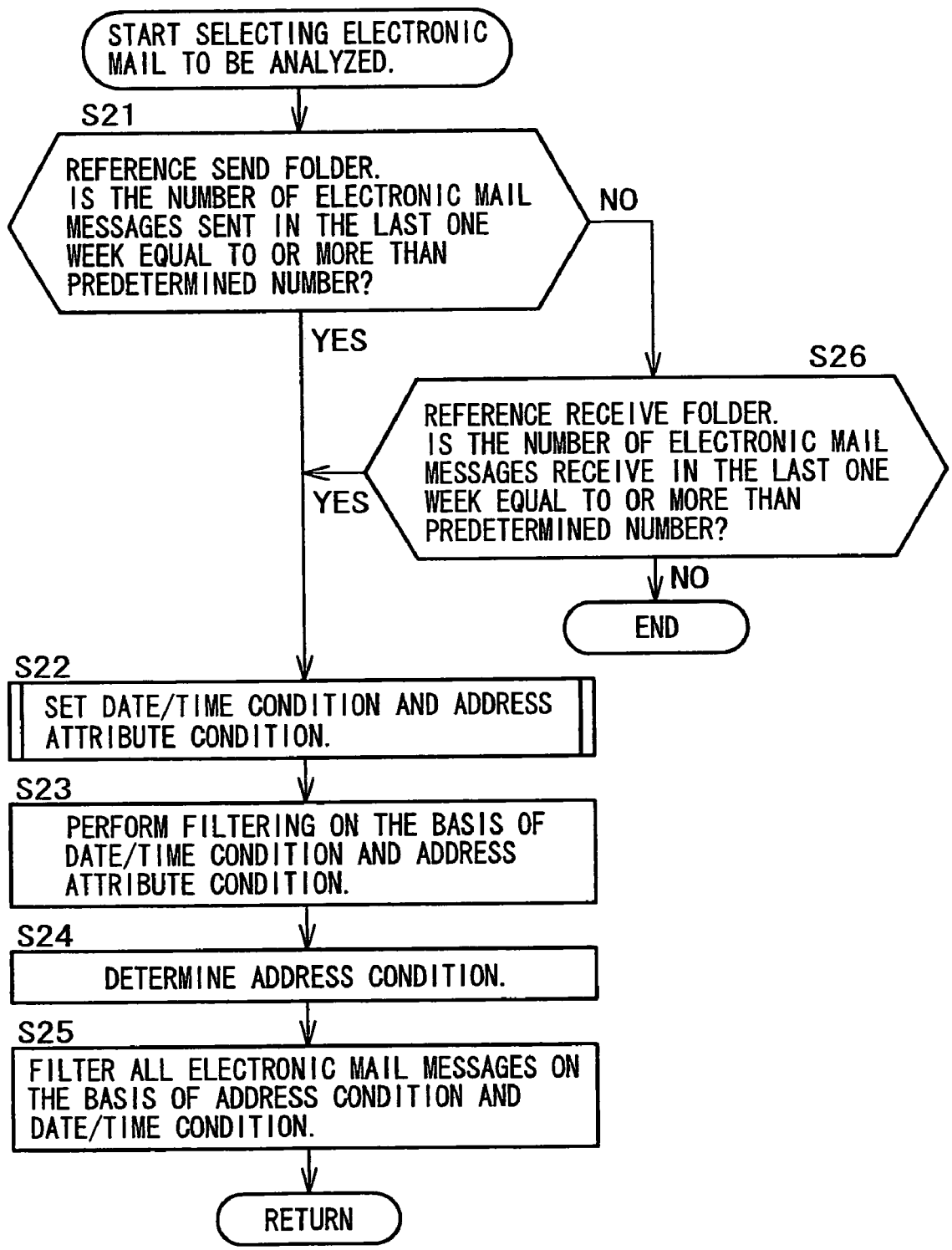
FIG. 8 is a flowchart indicative of a process of step S1 shown in FIG. 7.

The following describes the details of the processing of step S1, namely the selection of the electronic mail subject to analysis, with reference to FIG. 8.

In step S21, the document acquisition block 31 references a send folder in which the electronic mail sent by the user is stored to determine whether the number of electronic mail messages sent in a most recent predetermined period of time (for example, in the last one week) is equal to or higher than a predetermined number (for example, 100 messages). If the number of electronic mail messages sent in the most recent predetermined period of time is found to be equal to or higher than a predetermined number, then the procedure goes to step S22. In step S22, the document acquisition block 31 sets a date/time condition and an address attribute condition.

Figure 9:
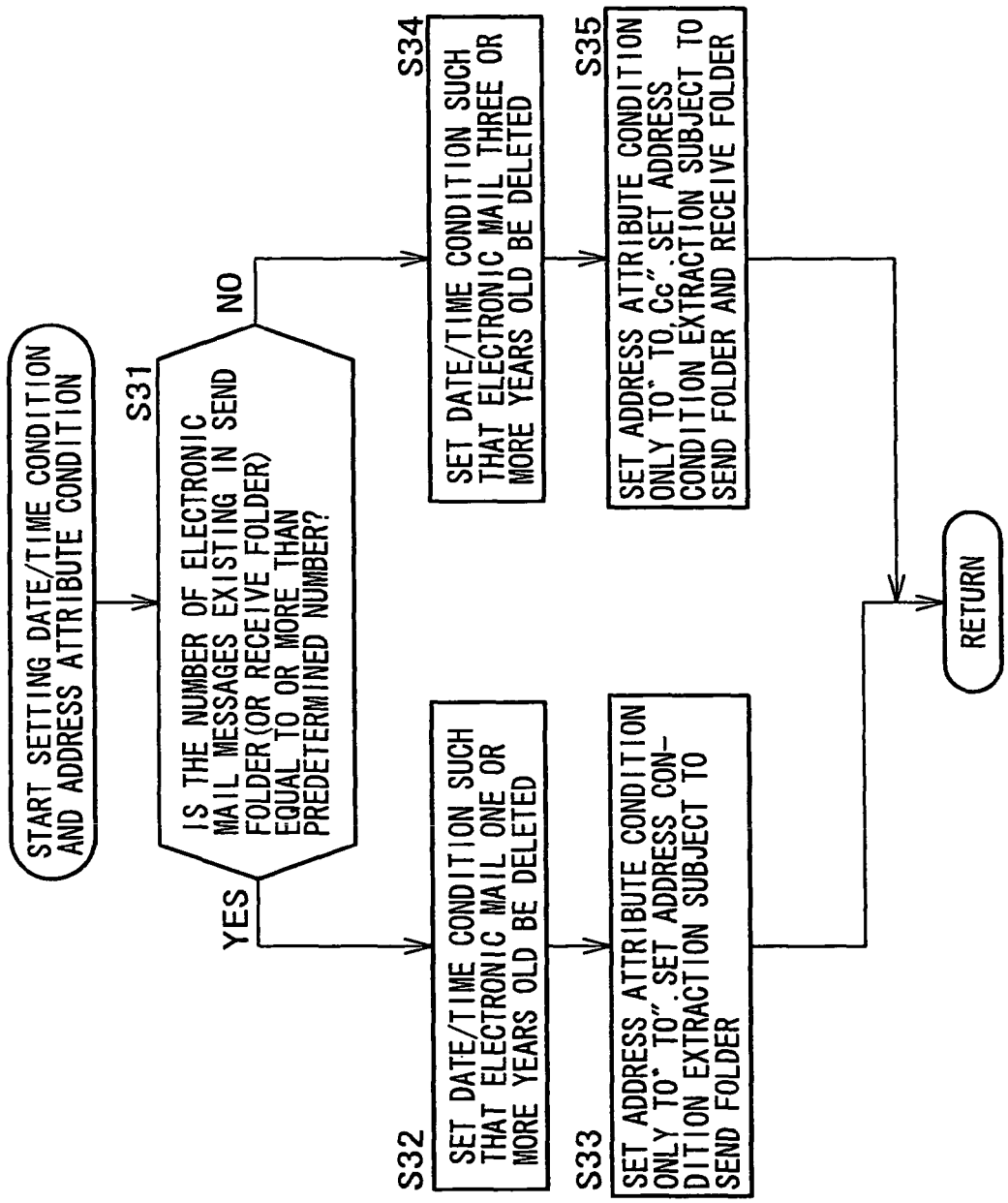
FIG. 9 is a flowchart indicative of a process of step S22 shown in FIG. 8.

The following describes the details of the processing of step S22, namely the setting of a date/time condition and an address attribute condition, with reference to FIG. 9. In step S31, the document acquisition block 31 determines whether the number of electronic mail messages in the send folder is equal to or higher than a predetermined number (for example, 10,000).

If, in step S31, the number of electronic mail messages in the send folder is found to be equal to or higher than a predetermined number, then the procedure goes to step S32. In step S32, the document acquisition block 31 sets the date/time condition for selecting the electronic mail subject to analysis to "One or more years be deleted." In step S33, the document acquisition block 31 sets the address attribute condition for selecting the electronic mail subject to analysis to "delete other than "To"". At the same time, the document acquisition block 31 sets the subject of extracting an address condition (or an address list) to the send folder.

On the contrary, if the number of electronic mail messages in the send folder is found in step S31 to be lower than a predetermined number, the procedure goes to step S34. In step S34, the document acquisition block 31 sets the date/time condition to "delete the electronic mail received three or more years ago". In step S35, the document acquisition block 31 sets the address attribute condition to "delete the electronic mail other than "To, Cc"". At the same time, the document acquisition block 31 sets the subject of extracting an address condition to the send folder and the receive folder.

The above-mentioned setting of the date/time condition and the address attribute condition returns the procedure to step S23 after the date/time condition and address attribute condition of the electronic mail subject to analysis have been set in accordance with the number of sent electronic mail messages.

It should be noted that, in the setting of a date/time condition and an address attribute condition, several sections may be provided in accordance with the number of mail messages in the send folder and the date/time condition may be divided by a given number of years in accordance with these sections. Further, "From" and "Reply to" may be added to the address attribute condition for a mail received register, in addition to the above-mentioned selection of two types.

In step S23, the document acquisition block 31 filters the electronic mail messages in the send folder (or the receive folder) on the basis of the date/time condition and the address attribute condition set in step S22, thereby narrowing the number of electronic mail messages. In step S24, the document acquisition block 31 makes a list of the destination addresses (or the source addresses) of the electronic mail messages obtained by filtering of step S23, counts the number of times each address appears, determines upper n addresses which are high in occurrence, and sets the address condition to "extract the electronic mail messages transmitted/received with upper n addresses".

In step S25, the document acquisition block 31 filters all electronic mail messages, namely those existing in the send folder, the receive folder, and other folders on the basis of the date/time condition set in step S22 and the address condition set in step S24, thereby selecting the electronic mail subject to analysis.

It should be noted that, if the number of electronic mail messages sent in the most recent predetermined period is found in step S21 to be lower than a predetermined number by referencing the send folder in which the electronic mail messages sent by the user are stored, then the procedure goes to step S26. In step S26, the document acquisition block 31 references the receive folder in which the electronic mail messages received by the user are stored to determine whether the number of electronic mail messages received in the most recent predetermined period (for example, in the last one week) is equal to or higher than a predetermined number (for example, 100). If the number of electronic mail messages received in the most recent predetermined period is found to be equal to or higher than a predetermined number, then the procedure goes to step S22 to repeat the above-mentioned processing therefrom.

On the contrary, if the number of electronic mail messages received in the most recent predetermined period is found to be lower than a predetermined number, the database generation processing ends at this point of time.

When the electronic mail subject to analysis has been selected as described above, the procedure returns to step S2 shown in FIG. 7.

In step S2, the document attribute processing block 32 extracts the attribute information (the header information such as message ID for example) from the electronic mail subject to analysis supplied from the document acquisition block 31 in the processing of step S1, and on the basis of the extracted attribute information, classifies the received electronic mail subject to analysis by topic (or divides the received electronic mail subject to analysis into groups by topic), thereby generating a topic file for each topic, which is then supplied to the document contents processing block 33 and the document feature database generation block 34.

Figure 10:
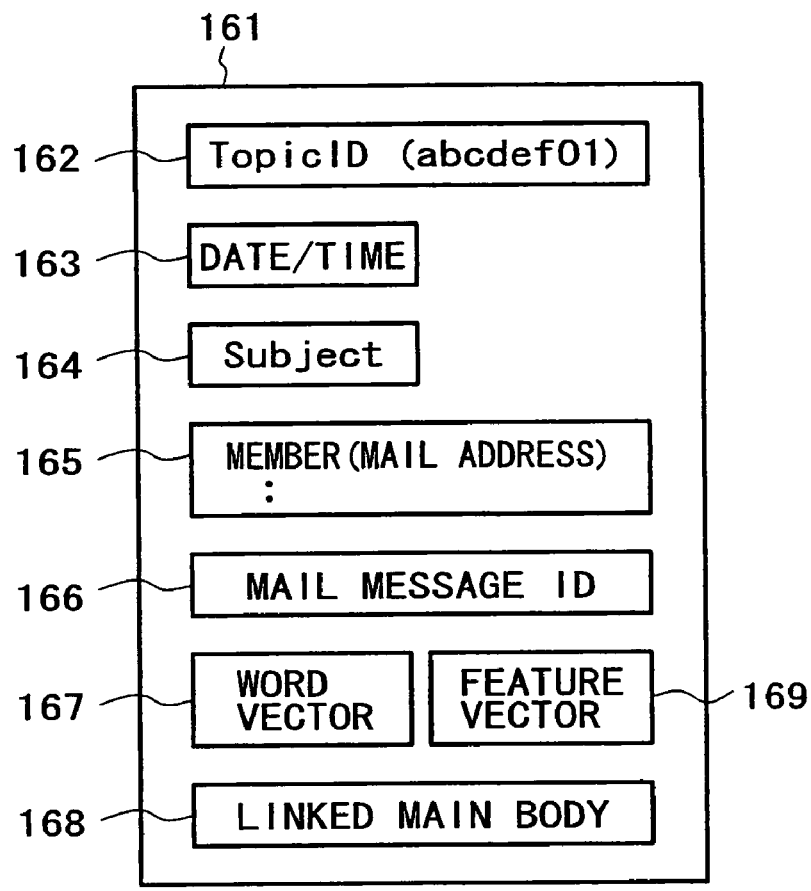
FIG. 10 is a schematic diagram illustrating one example of a topic file.

FIG. 10 shows one example of a topic file 161 which is generated in step S2. The topic file 161 is configured by a topic ID 162 for identifying each topic file, date/time information 163 indicative of the communication time of the least recent electronic mail message belonging to that topic, subject information 164 indicative of the title of the least recent electronic mail message, member information 165 consisting of the electronic mail address of the sender or receiver of the electronic mail message belonging to that topic, mail message ID 166 for identifying each electronic mail message belonging to that topic, a word vector 167 consisting of a word included in the body of the electronic mail message belonging to that topic, a linked body 168 linking the bodies of the electronic mail messages belonging to that topic, and a feature vector 169 consisting of the evaluation values of all words included in each topic.

For the topic ID 162, the communication time of the least recent electronic mail message belonging to that topic may be used for example.

It should be noted that the linked body 168 is obtained by linking, of the electronic mail messages belonging to that topic, the bodies of the electronic mail messages in the send folder and then by inserting a predetermined character string (for example, "soshin-shuryo") to link the bodies of the electronic mail messages in the receive folder and other folders.

Figure 11:
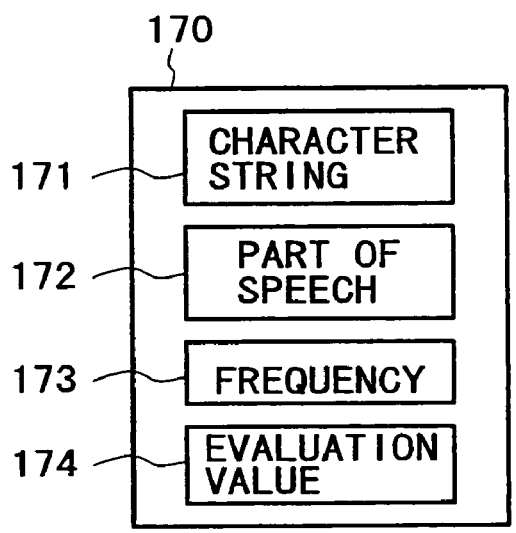
FIG. 11 is a schematic diagram illustrating elements included in a plurality of words constituting a word vector.

FIG. 11 shows elements included in a plurality of words 170 which constitute the word vector 167. To be more specific, the word 170 has a configuration for recording a character string 171 of that word itself, a part of speech (or type of noun) 172 of that word, a frequency 173 of that word in that topic, and an evaluation value 174 of that word in that topic. It should be noted that the contents of each element of the word 170 are not generated in step S2 but is generated in the subsequent processing.

The feature vector 169 is not generated in step S2 either, but is generated in the subsequent processing.

Figure 12:
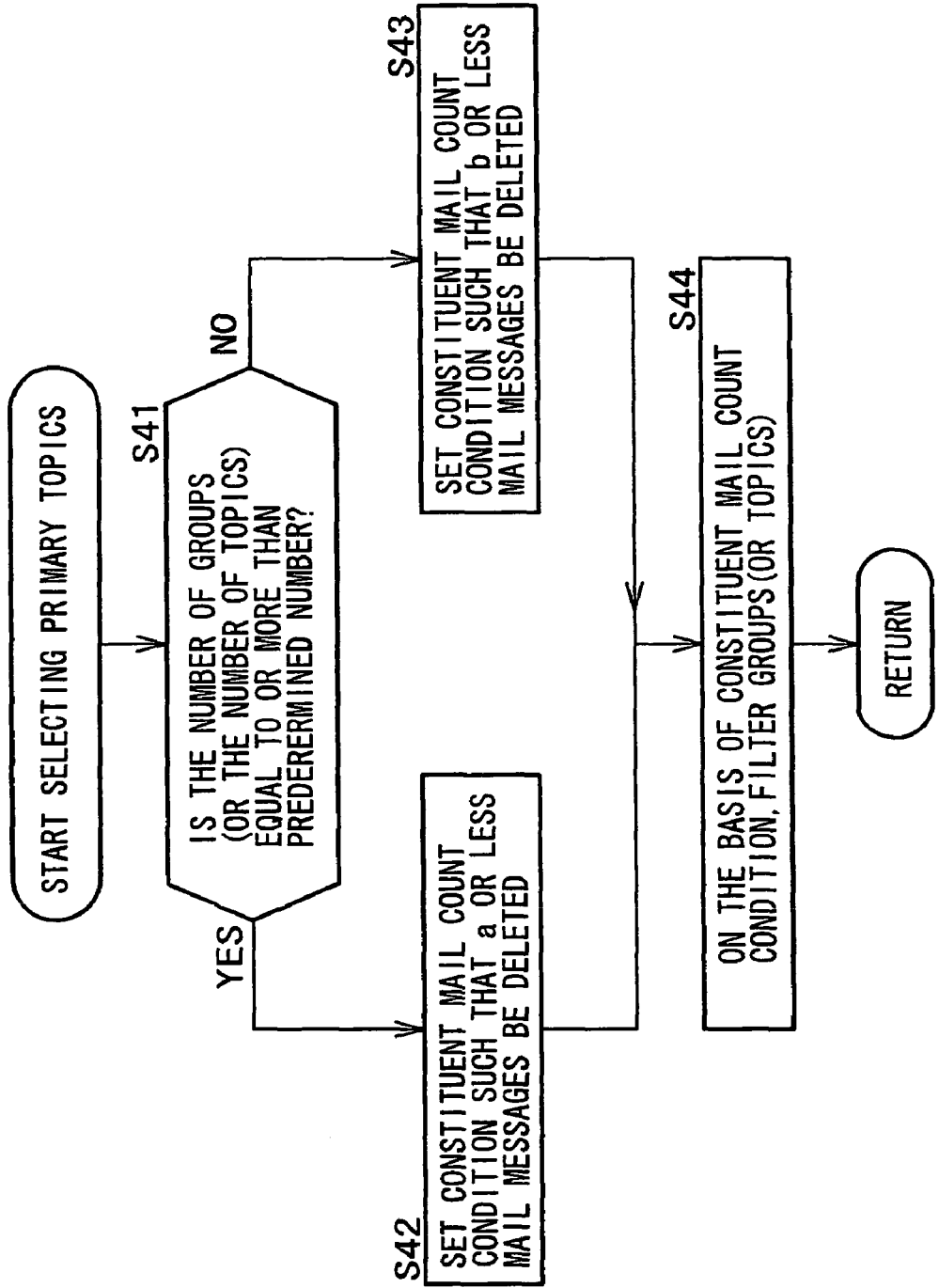
FIG. 12 is a flowchart indicative of a process of step S3 shown in FIG. 7.

Referring to FIG. 7 again, in step S3, the document attribute processing block 32 selects a topic generated in step S2. The following describes the processing of step S3, namely, the primary topic selection processing, with reference to the flowchart shown in FIG. 12.

In step S41, the document attribute processing block 32 determines whether the number of topics generated in step S2 is equal to or higher than a predetermined number. If the number of generated topics is found to be equal to or higher than a predetermined number, the procedure goes to step S42. In step S42, the document attribute processing block 32 sets a constituent mail count condition for selecting a generated topic to "delete the electronic mail messages at or below count "a" (4 for example)".

If the number of generated topics is found to be lower than a predetermined number in step S41, then the procedure goes to step S43. In step S43, the document attribute processing block 32 sets the constituent mail count condition for selecting a generated topic to "delete the electronic mail messages at or below count "b" (2 for example)".

In step S44, on the basis of the constituent mail count condition set in step S42 or S43, the document attribute processing block 32 filters the topics generated in step S2. To be more specific, if the constituent mail count condition is set to "delete the electronic mail messages at or below count "a" (4 for example)", any topic that is constituted by four electronic mail messages or less is deleted, thereby selecting only the topics each of which is constituted by 5 or more electronic mail messages.

Besides, any topic that does not include those electronic mail messages communicated in the most recent predetermined period (for example, the last one week) may be deleted.

When the primary topic selection processing has been completed as described above, the procedure returns to step S4 shown in FIG. 7.

It should be noted that the setting of the constituent mail count condition used in the primary topic selection processing is not restricted to the above-mentioned two types of selection. For example, several sections may be arranged in accordance with the number of topics to set a constituent mail count condition to each of these sections.

Figure 13:
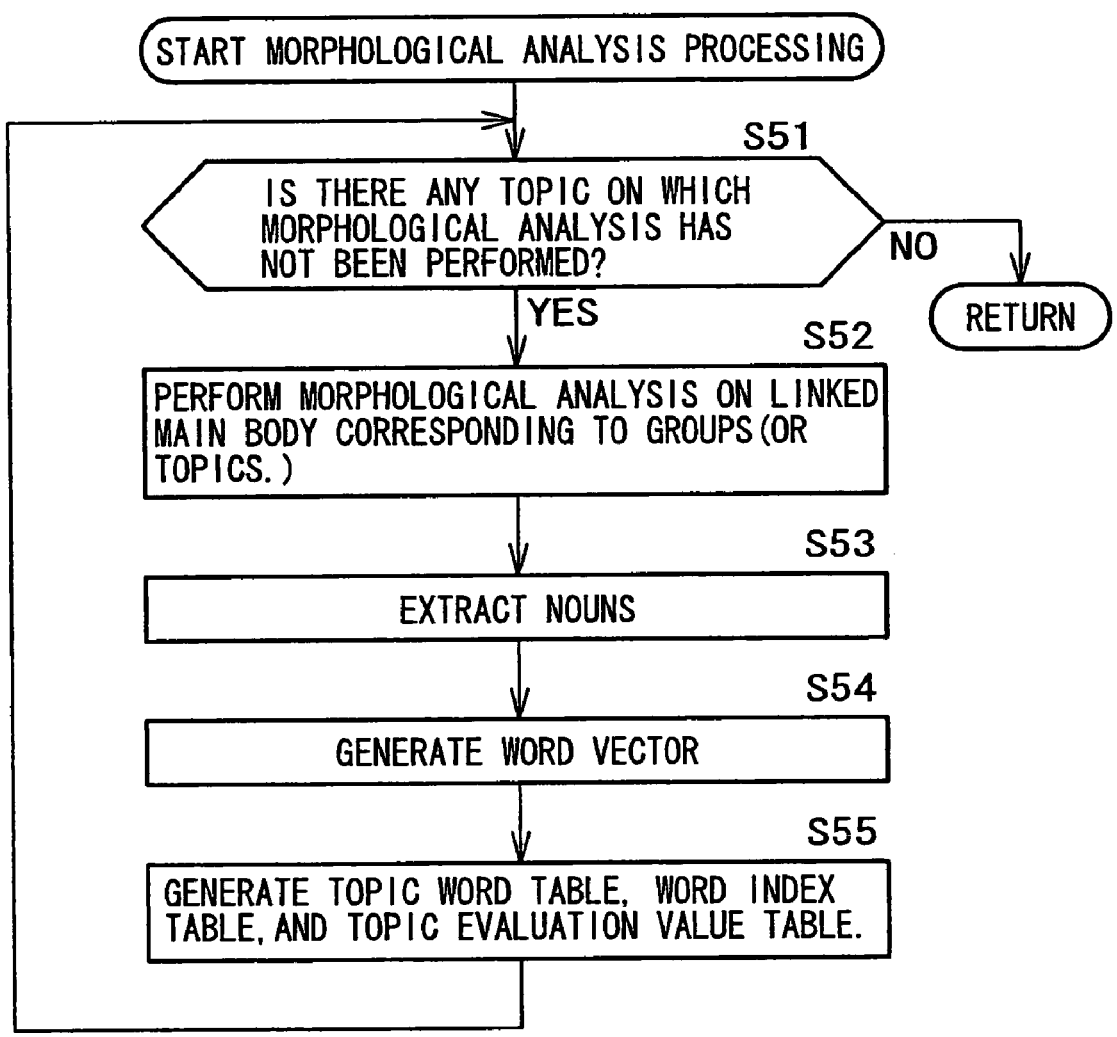
FIG. 13 is a flowchart indicative of a process of step S4 shown in FIG. 7.

In step S4, the document contents processing block 33 performs morphological analysis on the linked body 168 of the topic file 161 corresponding to each selected topic. The following describes the details of the morphological analysis processing of step S4 with reference to the flowchart shown in FIG. 13.

In step S51, the document contents processing block 33 determines whether there is any selected topic that has not yet been morphologically analyzed. If there is found one, the procedure goes to step S52. In step S52, the document contents processing block 33 selects one of the topics not yet morphologically analyzed, reads the linked body 168 of the corresponding topic file 161, and performs morphological analysis thereon, thereby extracting words included in the linked body 168.

Thus, as compared with the processing of morphological analysis on each body of each electronic mail message constituting the topic file 161, the processing of morphological analysis on the linked body 168 of the topic file 161 can be done by a single session although each text to be processed is longer, thereby preventing the resources necessary for the morphological analysis processing from being wasted.

In step S53, the document contents processing block 33 extracts, from the words extracted in step S52, those words whose part of speech is noun (including general noun, conjunctive noun, geographical name, personal name, and term of interest). In step S54, the document contents processing block 33 arranges the extracted words, which are nouns, to generate a word vector 167 corresponding to the topic in question.

In step S55, the document contents processing block 33 adds a record corresponding to the word vector 167 generated in step S54 to a topic word table 181 (refer to FIG. 14) and adds a record of words constituting the word vector 167 generated in step S54 to a word index table 191 (see FIG. 15) which includes a topic evaluation value table 193. It should be noted that the topic word table 181, the word index table 191, and the topic evaluation value table 193 are each a hash table.

Figure 14:
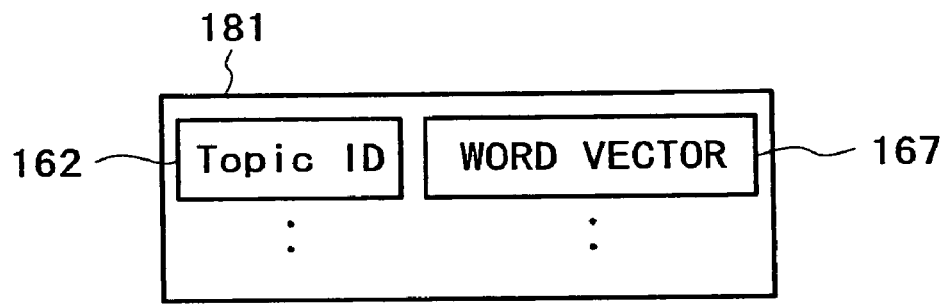
FIG. 14 is a schematic diagram illustrating an exemplary configuration of a topic word table.

FIG. 14 shows an exemplary configuration of the topic word table 181. The topic word table 181 lists topic IDs 162 for identifying each topic and word vectors 167 corresponding to the topics. When the topic ID 162 is inputted, the corresponding word vector 167 is outputted.

Figure 15:
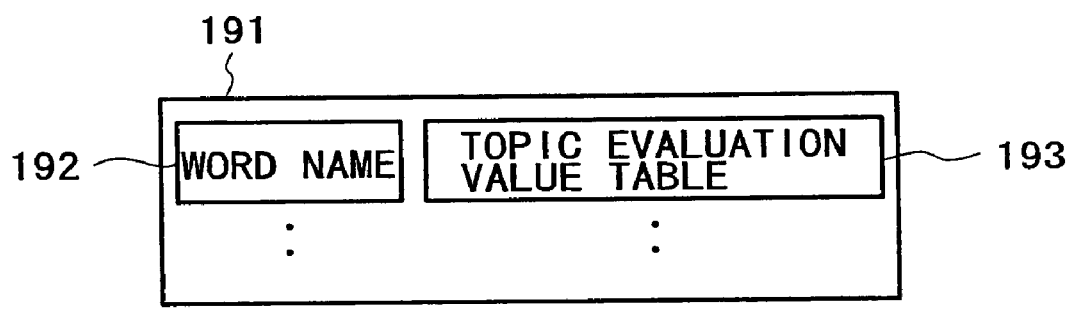
FIG. 15 is a schematic diagram illustrating an exemplary configuration of a word index table.

FIG. 15 shows an exemplary configuration of the word index table 191. The word index table 191 lists plural pairs of a word name 192 constituting each word vector 167 and a corresponding topic evaluation value table 193. When the word name 192 is inputted, the topic evaluation value table 193 is outputted.

Figure 16:
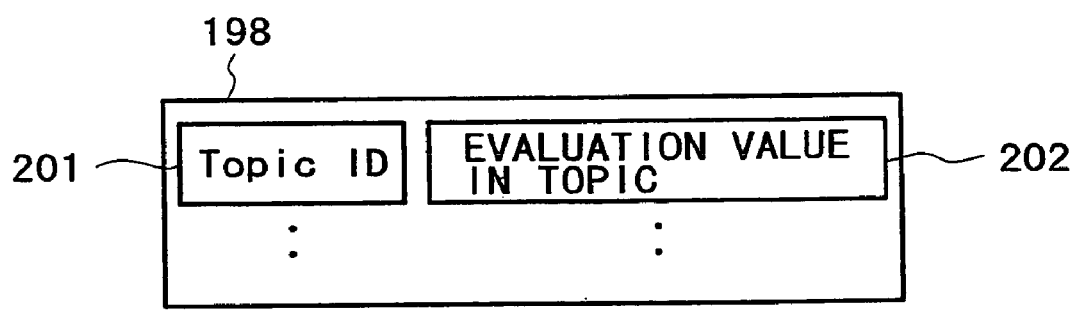
FIG. 16 is a schematic diagram illustrating an exemplary configuration of a topic evaluation value table.

FIG. 16 shows an exemplary configuration of the topic evaluation value table 193. The topic evaluation value table 193 lists topic IDs 201 each for identifying a topic including the word corresponding to the word name 192 and evaluation values 202 each for the word in question in the topic in question. When the topic ID 201 is inputted, the evaluation value 202 of the word in question in the topic in question is outputted.

Generating the topic word table 181, word index table 191, and the topic evaluation value table 193 having the above-mentioned configurations facilitates the search for one of the topics ID 162 and the word name 192 by inputting either of them.

Then, the procedure returns to step S51 to repeat the above-mentioned processing therefrom. In step S51, if there is found no more selected topic that has not been morphologically analyzed, then the morphological analysis processing comes to an end, upon which the procedure returns to step S5 shown in FIG. 7.

In step S5, in order to mitigate the load of the processing to be subsequently executed, the document contents processing block 33 deletes, the words extracted in the processing executed so far, namely the words included in the word vector corresponding to each topic, those words which are thought to be less related with the contents of the topic and the daily words such as salutations (hereafter referred to as unwanted words).

Figure 17:
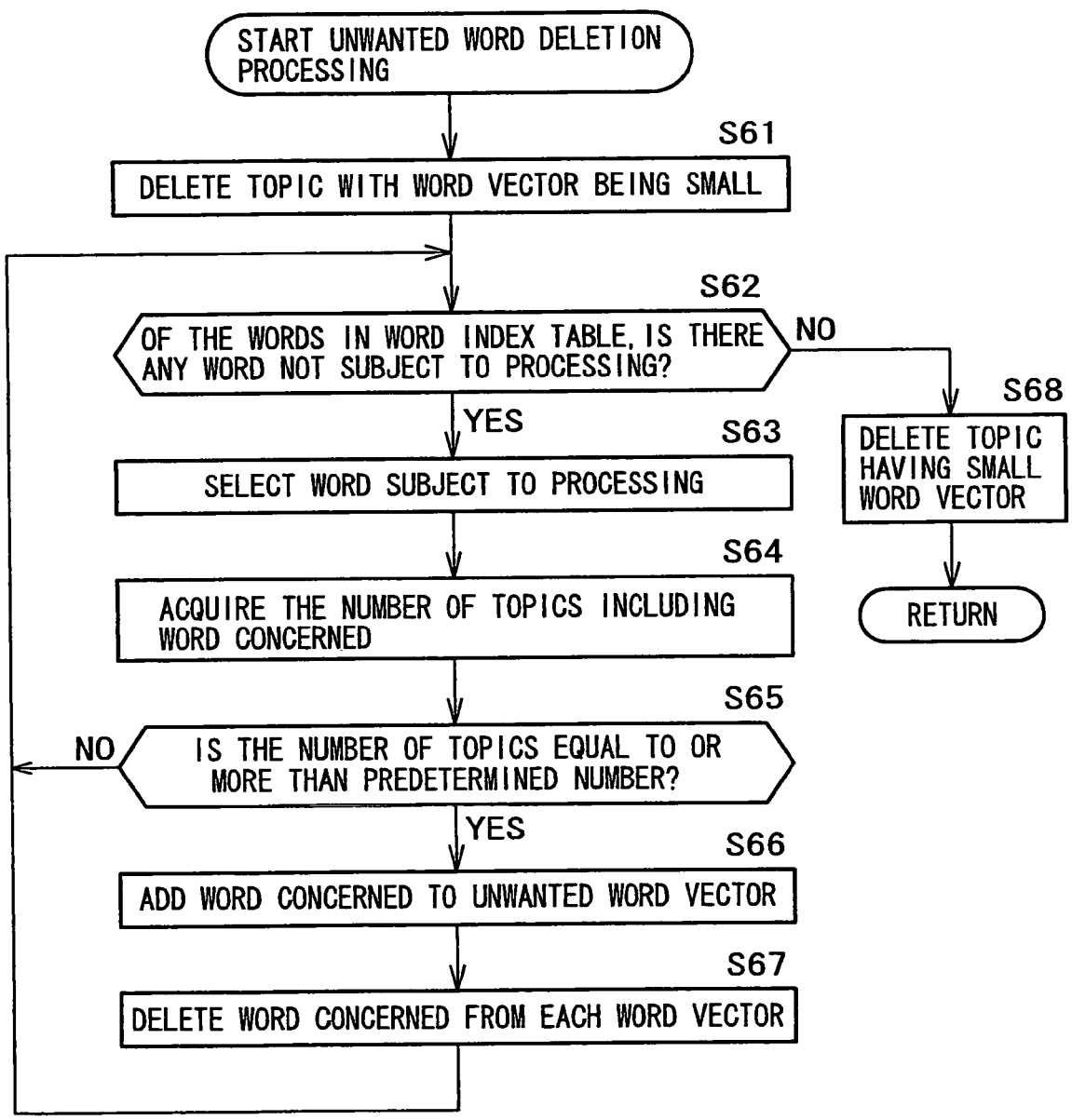
FIG. 17 is a flowchart indicative of a process of step S5 shown in FIG. 7.

The following describes the unwanted word deletion processing of step S5 with reference to the flowchart shown in FIG. 17. In step S61, the document contents processing block 33 deletes any topic of small word vector, namely, any topic in which the number of words constituting a corresponding word vector is equal to or lower than a predetermined number (for example, 5).

In step S62, the document contents processing block 33 determines whether of the words recorded to the word index table 191 generated in step S4, there is any word that is not subject to the subsequent processing. If any word not subject to the subsequent processing is found, the procedure goes to step S63. In step S63, the document contents processing block 33 selects one of the words not subject to the subsequent processing and recorded to the word index table 191, as a word to be processed.

In step S64, by referencing the word index table 191 with inputting the above-mentioned word to be processed, the document contents processing block 33 obtains the corresponding topic evaluation value table 193, and by counting the number of topic IDs 201 recorded to the obtained topic evaluation value table 193, acquires the number of topics which include the word to be processed.

In step S65, the document contents processing block 33 determines whether the number of topics including the word subject to processing is equal to or higher than a predetermined number. If the number of topics including the word subject to processing is found to be equal to or higher than a predetermined number, the procedure goes to step S66. In step S66, the document contents processing block 33 adds the word subject to processing to the unwanted word vector (made up of unwanted words). Consequently, the words which are thought to be included commonly in many topics, such as daily salutations, are added to the unwanted word vector.

In step S67, in order to delete the record corresponding to the word subject to processing which is an unwanted word, the document contents processing block 33 updates the topic file 161, topic word table 181, word index table 191, and topic evaluation value table 193, which correspond to each topic. Then, the procedure returns to step S62 to repeat the above-mentioned processing therefrom.

It should be noted that, if the number of topics including the word subject to processing found to be lower than a predetermined number in step S65, step S66 and step S67 are skipped and the procedure returns to step S62.

Then, in step S62, if there is found no more words subject to processing among the words recorded to the word index table 191 generated in step S4, the procedure goes to step S68. In step S68, as with the processing of step S61, the document contents processing block 33 deletes any topic whose word vector is small, namely, whose number of words constituting the corresponding word vector 167 is lower than a predetermined number (for example, 5). Consequently, the topics regarded as constituted by only daily words are deleted. At this point of time, each topic is symbolized by the word vector 167 constituted by discriminative words. The procedure returns to step S6 shown in FIG. 7.

In step S6, the document contents processing block 33 obtains the frequency of occurrence of all words constituting each word vector 67 with the unwanted words deleted and the distribution of these words over two or more documents, thereby computing the evaluation value in each topic. For the computation of the evaluation value, the tf·idf technique is used for example. In step S7, the document feature database generation block 34 corrects the evaluation value of each word computed in step S6 under the condition shown below.

For example, the document feature database generation block 34 corrects the evaluation value of the words included in a transmitted electronic mail such that the value becomes higher. In order to identify the words included in a transmitted electronic mail message, a predetermined character string (for example, "soshin-shuryo") inserted in the linked body 168 of the topic file 161 corresponding to each topic generated in step S2 may be detected to identify the words before this. predetermined character string as the words included in the transmitted electronic mail message.

Also, the document feature database generation block 34 corrects the evaluation value of the words included in a topic to which many electronic mail messages belong such that this evaluation value increases in correspondence with the number of these electronic mail messages, for example. For example, let the number of these electronic mail messages be m and multiply the evaluation value before correction by linear function values such as linear function value a·m (a being a constant) and a logarithmic function value log(m). This correction is made in consideration that, in temporally continuous communication such as electronic mail, words appearing in earlier documents are often replaced by demonstrative pronouns in later documents, so that as the number of electronic mail messages belonging to a topic increases, the word evaluation value becomes relatively smaller.

In addition, the document feature database generation block 34 corrects the evaluation values of words included in electronic mail messages communicated with mates high in the frequency of communication and particular nouns (defined words of interest, general names, geographical names, and organization names, for example) such that they become greater. It should be noted that, for a method of correcting the evaluation values of particular nouns, the technique disclosed in Japanese Patent Application No. 2001-379511 may be applied.

In step S8, the document feature database generation block 34 records the evaluation value of each word computed in step S6 and corrected in step S7 to the topic file 161, the word vector 167 of the topic word table 181, and the topic evaluation value table 193 in the word index table 191. Consequently, all elements of the word 170 which constitutes the each word vector 167 have been established. At the same time, the document feature database generation block 134 establishes the feature vector 169 corresponding to each topic and records the established feature vector 169. Further, document feature database generation block 34 re-arranges the words constituting each word vector 167 in the descending order of these words' evaluation values.

Figure 18:
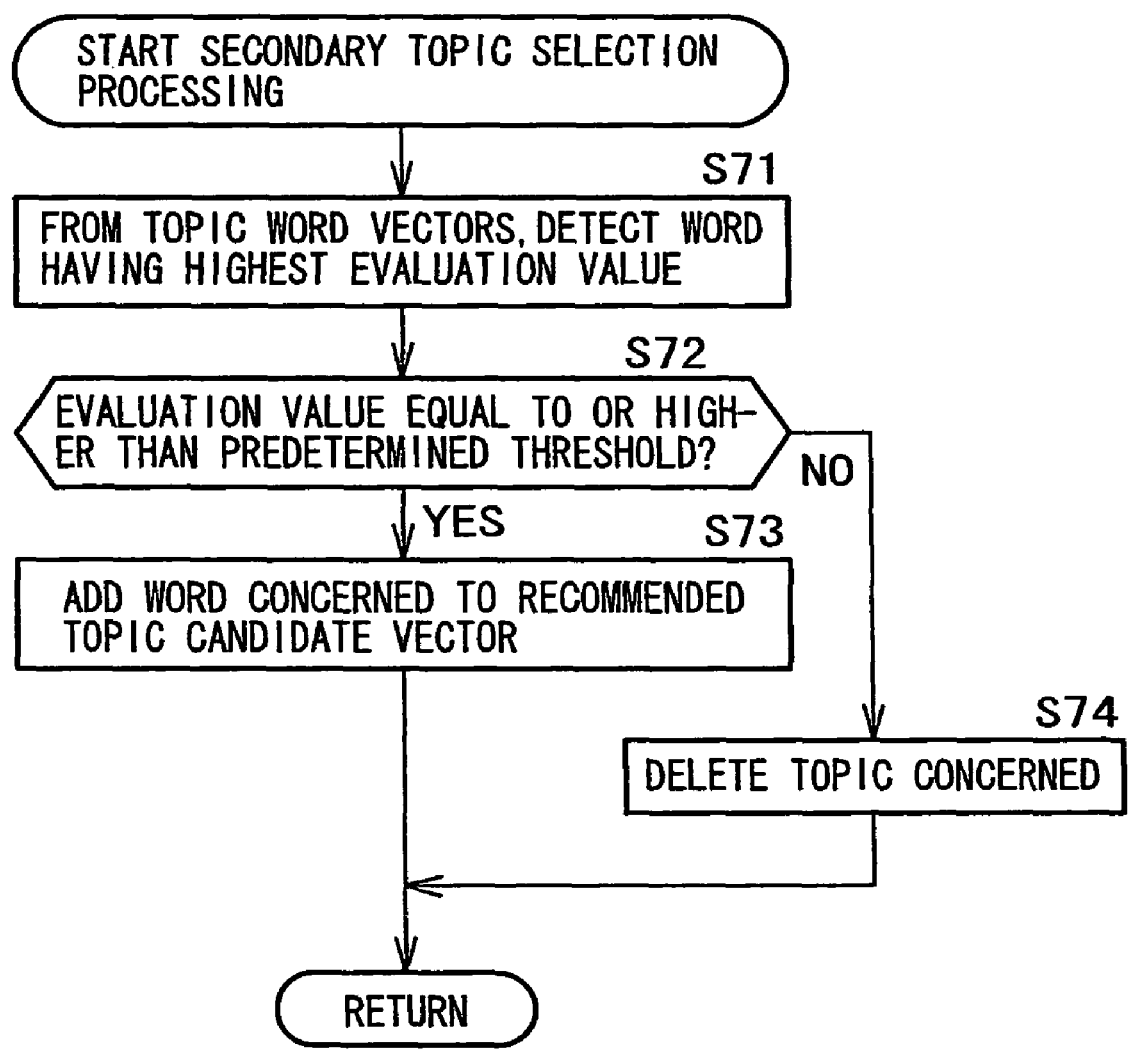
FIG. 18 is a flowchart indicative of a process of step S9 shown in FIG. 7.

In step S9, the document feature database generation block 34 further selects the topics remaining at this point of time. The following describes the processing of step S9, namely, the secondary topic selection processing, with reference to the flowchart shown in FIG. 18. It should be noted that this secondary topic selection processing is executed on each topic.

In step S71, the document feature database generation block 34 detects the word constituting the word vector 167 corresponding to each topic which has the greatest evaluation value (or the top two or three words). In step S72, the document feature database generation block 34 determined whether the evaluation value of the word detected in step S71 is equal to or higher than a predetermined value. If the detected word is found to have an evaluation value equal to or higher than a predetermined value, the procedure goes to step S73.

In step S73, the document feature database generation block 34 adds the word having an evaluation value equal to or higher than a predetermined value to a recommended topic candidate vector. If the evaluation value of the word detected in step S71 is found to be lower than a predetermined value in step S72, then the procedure goes to step S74, in which the document feature database generation block 34 deletes the topic in question. Namely, any word having an evaluation value lower than a predetermined value is determined to be less interesting and therefore is deleted from the subject of search.

After the processing of step S73 or step S74, namely, after the completion of the secondary topic selection processing for the topic in question, the secondary topic selection processing for a next topic starts. When the secondary topic selection processing for all topics has been completed, the procedure returns to step S10 shown in FIG. 7.

Figure 19:
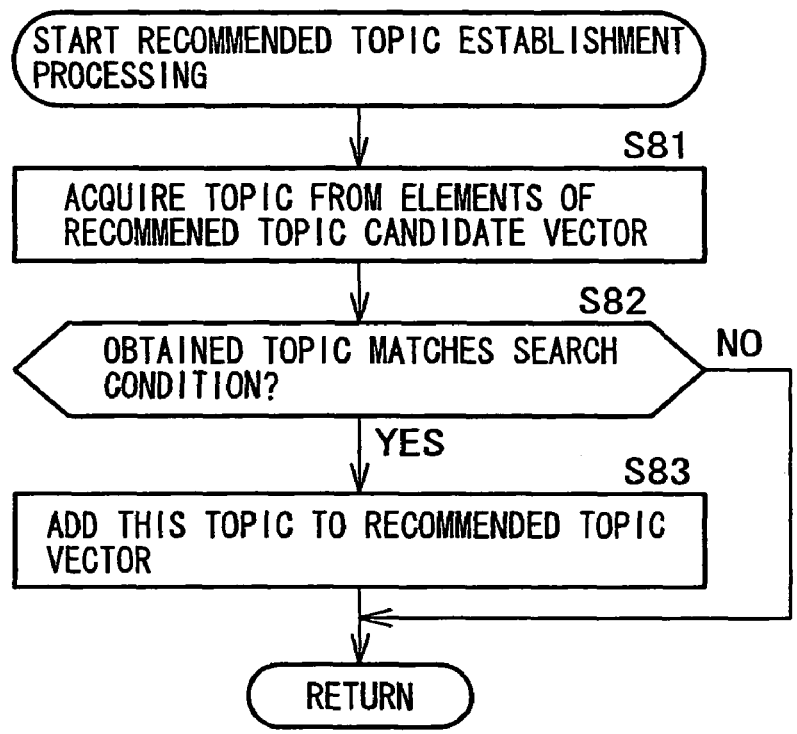
FIG. 19 is a flowchart indicative of a process of step S10 shown in FIG. 7.

In step S10, on the basis of the topics added to the recommended topic candidate vector in step S9, the document feature database generation block 34 establishes the recommended topics. The following describes the recommended topic establishment processing in step S10 with reference to the flowchart shown in FIG. 19.

In step S81, on the basis of the elements (or word vectors 167) added to the recommended topic candidate vector in step S9, the document feature database generation block 34 pays attention to the maximum value among the evaluation values of the constituting words and detects a predetermined number of word vectors 167 (for example, 200) in the descending order of the maximum values of the evaluation values, thereby obtaining each corresponding topic in a predetermined number.

In step S82, the document feature database generation block 34 determines whether the topic obtained in step S81 matches a search condition. If the topic is found matching the search condition, then the procedure goes to step S83. The search condition herein denotes whether the topic in question is that of a particular period of time, that exchanged with a particular mate of communication, that includes a particular word, that extracted from a viewing log (for example, program name, genre name, or cast name), or that includes the initially registered preference information (for example, preferred genre name or cast name).

In step S83, the document feature database generation block 34 adds the topic found matching the search condition to the recommended topic vector. If the obtained topic is found not matching the search condition in step S82, then the processing of step S83 is skipped. Then, the procedure returns to step S11 shown in FIG. 7.

In step S11, the document feature database generation block 34 generates a database on the basis of the recommended topic vector established in step S10.

To be more specific, the document feature database generation block 34 filters the topic file 161 (refer to FIG. 10) added to the recommended topic vector to extract a topic ID 162, date/time information 163, subject information 164, member information 165, and the word vector 167 (or an interest word vector 212) which become necessary in the program information search processing to be described later. On the basis of the extracted information, the document feature database generation block 34 generates interest data 211 shown in FIG. 20. Then, the document feature database generation block 34 generates a database with the interest data 211 related with the user ID, mail account, login account, or password of the user in question and stores the generated database into the storage block 59. It should be noted that the processing of step S11 is executed continuously from the sequence of processing operations up to step S10 or at predetermined time intervals without continuation.

It should be noted that, because the interest data 211 provides a keyword for searching for program information, the word vector 167 is newly defined as an interest word vector 212. Alternatively, of the words (or interest words) which constitute the word vector 167, only the word having the maximum evaluation value (or top two or three words) may be used as the interest word vector 212. Further, the interest data 211 may include one document which includes the important words of the electronic mail of the topic in question.

It should also be noted that words often used in the EPG data of television programs, such as "music", "news", and undefined words including nicknames of cast, notational differences, abbreviations for example, are defined as "noun-television word" for example different from general nouns, in advance. Then, as a result of morphological analysis, each word classified as "noun-television word" is weighted in a predetermined manner as the computation of evaluation value in step S6 shown in FIG. 7, thereby making correction such that the evaluation value of the word of "noun-television word" becomes greater. Consequently, of the words included in electronic mail, the probability gets higher that words of "noun-television word" are included in the words constituting the interest word vector 212 (namely, words of "noun-television word" become interest words).

Further, if two or more users share one mailer 12, morphological analysis is performed on electronic mail for each mail account and the interest data 211 is generated for each user. The database records the interest data 211 for each user with each mail account being the key.

The execution of the above-mentioned database generation processing accumulates, in the database, the interest data 211 configured by the interest words extracted from the electronic mail documents sent and received.

Also, in order for the user to be able to forcibly discontinue the database generation processing, a processed document may be recorded at the time of discontinuation on demand for discontinuation, resuming the processing with an unprocessed document on demand for restart.

It should be noted that, in the above-mentioned configuration according to the invention, the database generation processing is started when the agent program 11 is executed. Alternatively, the database generation processing may be started at predetermined time intervals. Further, each database generated as described above is updated when a predetermined condition is satisfied.

The following describes the timing of updating a database by the accumulation block 21. Each database is generated by the above-mentioned database generation processing and it is updated if any of the following first, second, and third situations is encountered.

In the first situation, a predetermined period of time has passed since the database generation or update, so that the associated information stored in the database is updated before the information becomes out of date.

In the second situation, a predetermined part of the associated information stored in the database has already been presented, so that the associated information in the database is updated because the same associated information may be repetitively presented or the associated information to be presented runs short.

In the third situation, if a document used for feature extraction is electronic mail, the repetition of the transmission/reception of electronic mail alters the contents of that document, thereby the database is updated.

It should be noted that, if the database update becomes necessary (when a predetermined time period has passed as indicated by the timer 41A monitored by the event management block 41, for example), an instruction may be given to the user to update the database, or the database may be automatically updated without giving such an instruction. Obviously, the database may also be updated at a predetermined time intervals defined by the user.

Figure 21:
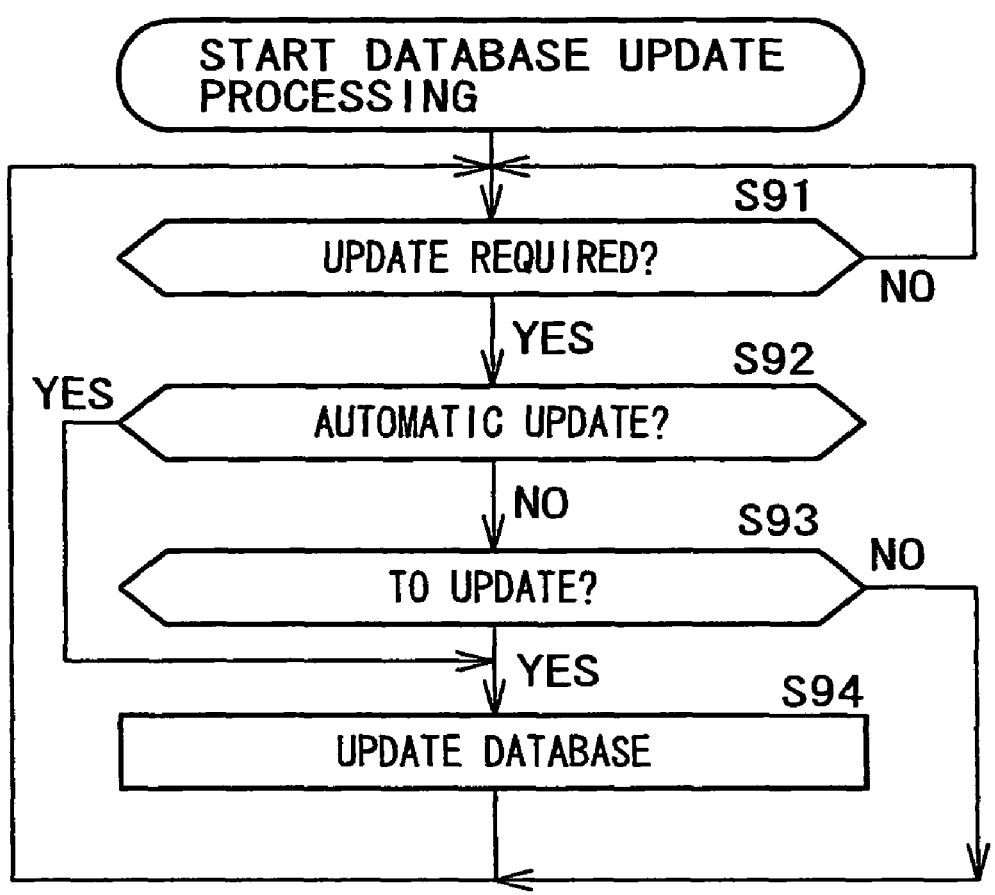
FIG. 21 is a flowchart indicative of database update processing.

The following describes the database update processing with the first, second and third situations taken into consideration, with reference to the flowchart shown in FIG. 21. This database update processing is one of the processing operations which are executed by the agent program 11 and is started when the agent program 11 is started, the execution being repeated until the agent program 11 exits. It is assumed that the above-mentioned database generation processing has already been executed before the database update processing is started and therefore there exists a database.

In step S91, the accumulation block 21 of the agent program 11 determines whether it is necessary to update the generated database and waits until it is determined necessary. The criteria of this determination are set by the user in advance by use of a user interface screen as shown in FIG. 22 for example. In the example of FIG. 22, four conditions are presented. If the user checks the check box shown to the left side of each condition, the checked condition is set. It should be noted that, in the first condition, counts may be set. In the third condition, the number of days may be set.

If the database update is found necessary in step S91, the procedure goes to step S92. In step S92, the accumulation block 21 determines whether the update is automatic or not. If the update is not automatic, then procedure goes to step S93. If the update is automatic, step S93 is skipped.

In step S93, the presentation block 22 of the agent program 11 notifies the user that the database must be updated and determines whether the user has given an instruction for the update in response. If such an instruction is found given, the procedure goes to step S94. If such an instruction is found not given, the procedure returns to step S91 to repeat the above-mentioned processing therefrom.

In step S94, the accumulation block 21 of the agent program 11 updates the database. To be more specific, the document acquisition block 31, the document attribute processing block 32, and document contents processing block 33 detect an electronic mail box file (often suffixed with particular extension mbx for example) of electronic mail, obtains its update date, and compares the obtained date/time with the previously obtained update date/time. If the electronic mail box file is found to have a different date/time and a different file size from those of the previously obtained update date/time, then the file is determined to have been updated and the added or updated portion is extracted. In this case, the grouping of electronic mail messages, the analysis of headers, morphological analysis, the computation of feature vectors, and other analysis are executed in the file and the important words obtained as a result of these operations are supplied to the associated information search block 35.

However, if the mail group (or topics) remains unchanged (namely, there is no new mail added to a particular topic), and if, as a result of the analysis, the important word (or the search keyword) before update is the same as the important word after update, only the computation value such as the evaluation value may be changed, thereby not making the associated information search block 35 execute the search for associated information.

Alternatively, if a certain period of time has passed with all electronic mail groups remaining unchanged, the search may be performed by use of, of the feature vectors of groups, search words which are the words having the third and fourth evaluation values for example instead of the search words which were the words having the first and second evaluation values in the last search, thereby obtaining a result of the search.

As described above, in the database update processing, only the added or changed documents are updated, so that the processing time can be shortened as compared with the repetitive execution of the database generation processing.

Figure 23:
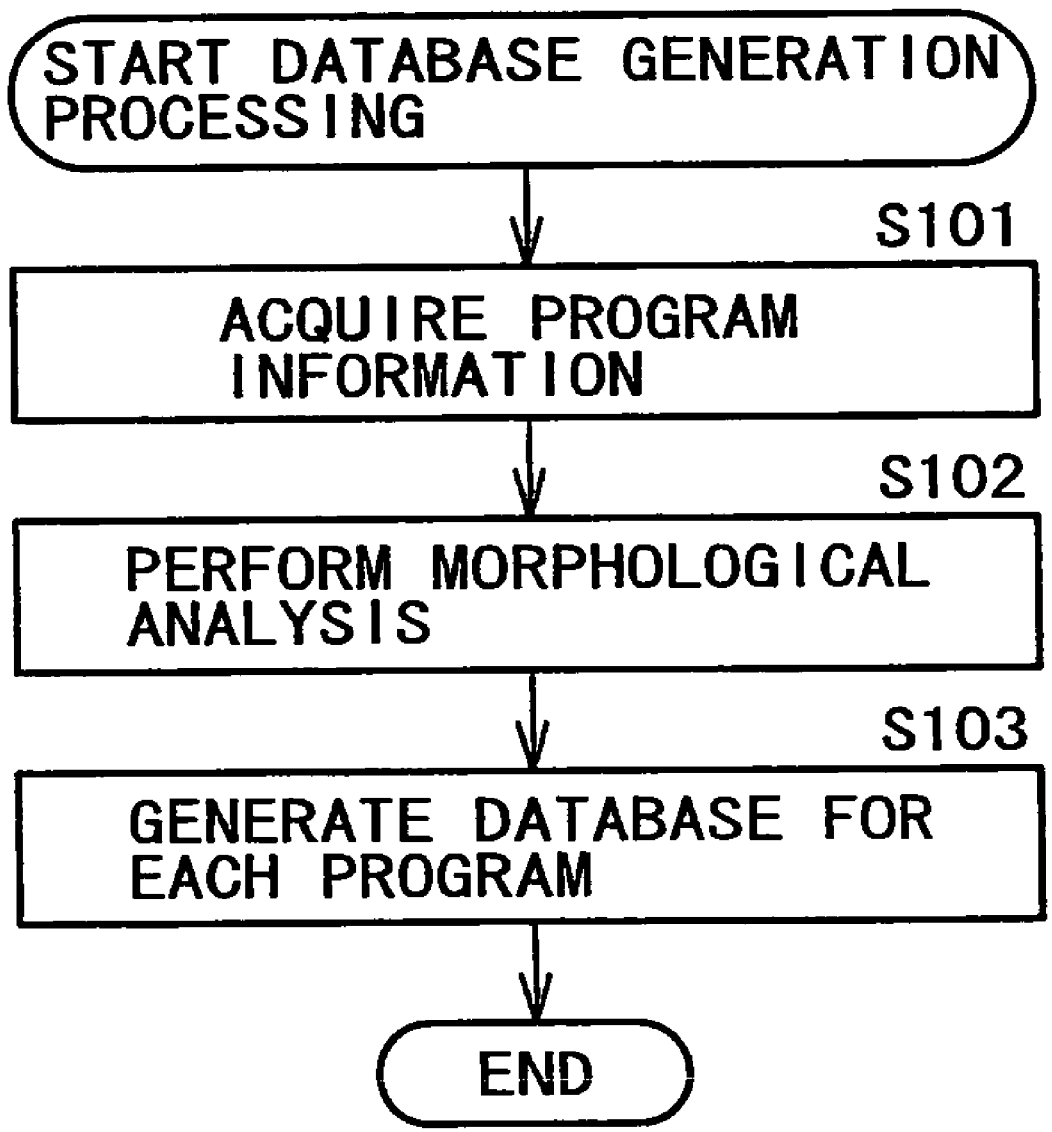
FIG. 23 is a flowchart indicative of database generation processing by the server program.

The following describes the database generation processing by the server program 101 of the server 6 with reference to the flowchart shown in FIG. 23. This database generation processing is one of the processing operations which are executed by the server program 101 and is started when there is generated no database with the server program 101 started.

In step S101, the program metadata acquisition block 121 acquires the program information (or program metadata) such as EPG data which is analyzed as the base for database generation and supplies the obtained program information to the data contents processing block 122.

Figure 24:
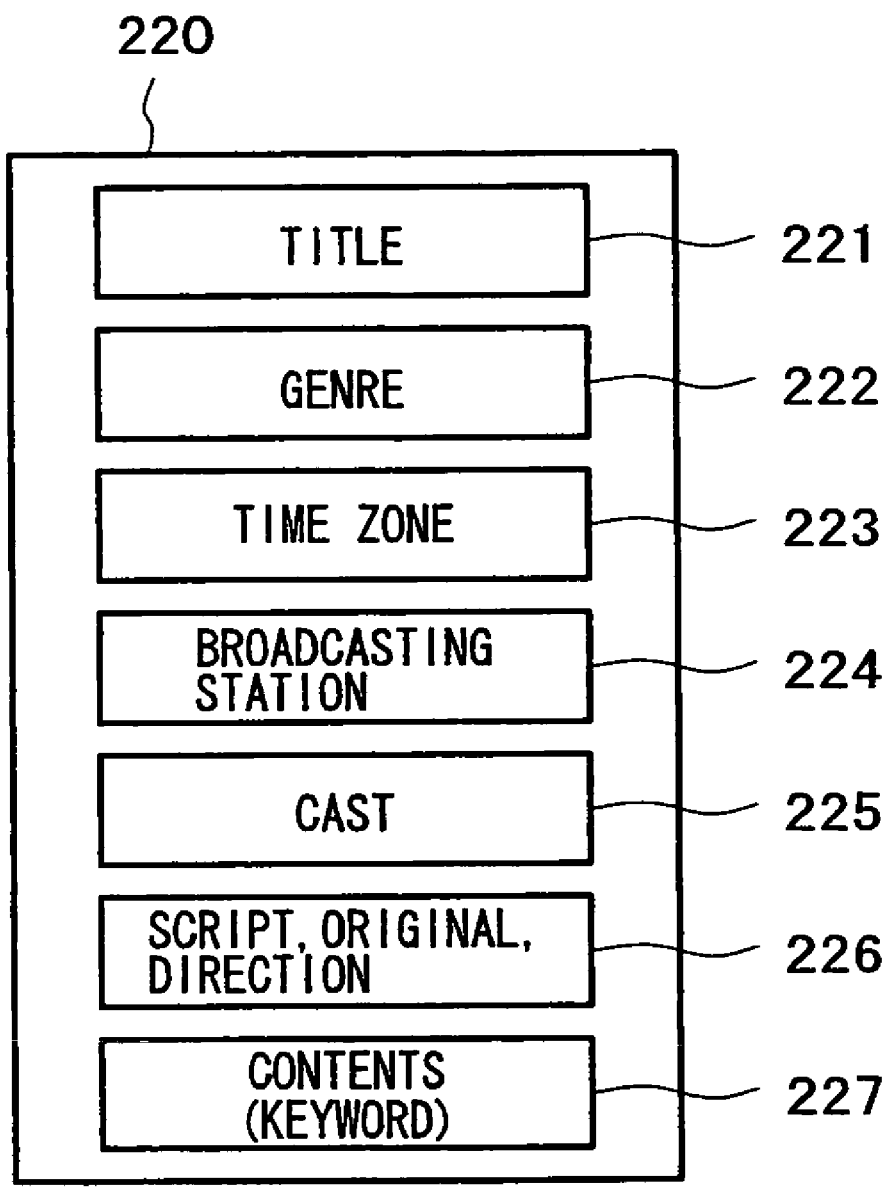
FIG. 24 is a schematic diagram illustrating one example of program metadata.

FIG. 24 shows one example of program metadata 220 which is obtained in step S101. The program metadata 220 is configured by a title 221 indicative of the name of a program in question, a genre 222 indicative of the classification of the program in question (for example, drama, movie, news, sport, or music), time zone information 223 indicative of a time zone in which the program in question is broadcast (for example, morning, noon, evening, golden hour, or night), a broadcast station 224 indicative of a channel in which the program in question is broadcast (for example, NHK General, Nihon TV, or TBS (each trademark), cast information 225 indicative of the cast of the program in question, script, original, and direction information 226 indicative of the script, original, and director of the program in question, and contents (or keyword) information 227 indicative of the story and highlight of the program in question.

Referring to FIG. 23 again, in step S102, the data contents processing block 122 performs morphological analysis on the program metadata 220 obtained in step S101 to extract the program information (program name, genre name, broadcasting station name, time zone information, cast name, and keyword). In step S103, the database generation block 123 makes, for each program, a database of the program information extracted by the data contents processing block 122 and stores the generated database into the storage block 147.

When the above-mentioned database generation processing has been executed, the program information extracted from the program metadata 220 is stored in the recommended program database. Also, in order for the user to forcibly discontinue the database generation processing, if a request for discontinuation is made, a processed document may be recorded at the time of discontinuation to resume the processing with an unprocessed document when a request for restart is made.

It should be noted that, in the above-mentioned configuration according to the invention, the database generation processing starts when the server program 101 is executed. Alternatively, the database generation processing may be started any other times and updated at predetermined time intervals (for example, every time EPG data is updated).

Figure 25:
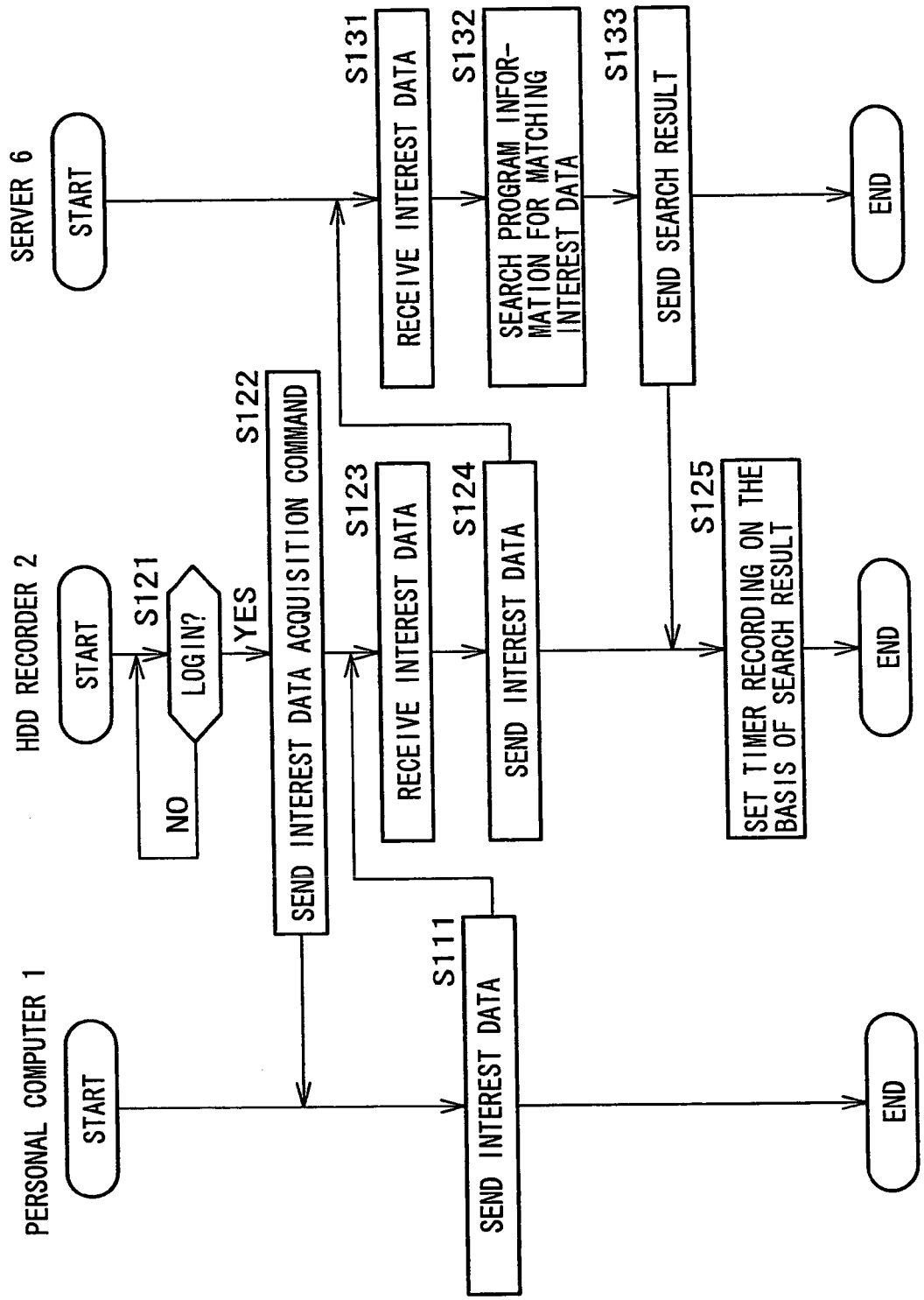
FIG. 25 is a flowchart indicative of program information search processing.

The following describes the processing of searching the recommended program database in the server 6 generated by the processing shown in FIG. 23 for the program information that matches the interest data 211 recorded to the database of the personal computer 1 by the processing of FIG. 7, with reference to the flowchart shown in FIG. 25.

In step S121, the CPU 71 of the HDD recorder 2 determines whether the input block 76 has been operated by the user for a login operation and waits until a login operation has been performed. If the HDD recorder 2 is found to have been logged in by the user in step S121, then the procedure goes to step S122, in which the CPU 71 sends a command for obtaining interest data and the user login information to the personal computer 1 via the communication block 77.

In step S111, the database query block 42 of the personal computer 1 receives the interest data acquisition command from the HDD recorder 2 and searches the database generated by the document feature database generation block 34 for the interest data 211 (FIG. 20) corresponding to the login information (login account and password) and sends the retrieved interest data 211 to the HDD recorder 2 via the communication block 60.

In step S123, the CPU 71 of the HDD recorder 2 receives the interest data 211 corresponding to the login user from the personal computer 1 and records the received interest data 211 to the RAM 73. In step S124, the CPU 71 sends the received interest data 211 to the server 6 via the communication block 77 and the network 5, thereby requesting the search for the program information that matches the interest data 211.

In step S131, the event management block 131 of the server 6 receives the interest data 211 sent from the HDD recorder 2 via the network 5. Then, the event management block 131 supplies the interest data 211 to the database query block 132, notifying of the search request. In step S132, in response to the notification of the search request from the event management block 131, the database query block 132 searches the recommended program database generated by the database generation block 123 for the program information that matches the interest data 211 included in the search request, selecting the retrieved program information as a recommended program.

It should be noted that the interest word vector 212 constituting the interest data 211 may include undefined words such as nicknames of the cast, notational differences, abbreviations, or words slightly differing from each other, for example. Therefore, in order to be able to search for the program information that matches these words, it is desired for the server 6 to have a dictionary that stores these words.

In step S133, the program information output block 133 sends the recommended program (or program information) selected by the database query block 132 to the HDD recorder 2 via a communication block 148 and the network 5 as a search result.

In step S125, the CPU 71 of the HDD recorder 2 sets the timer recording of the program to the RAM 73 on the basis of the recording start time, recording end time, and channel included in the program information received from the server 6 via the network 5, and at the same time, controls the tuner 79, the demodulator 80, the decoder 81, and the HDD 78. Consequently, when the timer recording start time comes, the program information is read from the RAM 73 and the timer recording is executed.

Thus, the program information matching the user's interest is retrieved and the timer recording is automatically set to the HDD recorder 2. Namely, program information is retrieved on the basis of the interest words extracted from the electronic mail exchanged by the user, so that timely program recommendation reflecting user's daily interests can be made.

It is also practicable, in reading the interest data 211 from the database and sending the interest data 211 in the processing of step S111, to pay attention to the time-dependent transition of evaluation values among the words satisfying a predetermined condition (or important words) included in the interest word vector 212 of the interest data 211 and select only the words satisfying the predetermined condition. The predetermined condition may be (1) "in a predetermined period Y (for example, five weeks) before the current point of time, the evaluation value of the word in question should be equal to or higher than threshold B in two or more different topics" or (2) "among two or more different topics in condition (1), the least recent topic and the most recent topic should be separated away from each other longer than predetermined period of time Z", for example.

Use of these conditions allows the recommendation of the program information matching those words in which the user is highly interested (namely, the important words) or those words which are unexpected to the user at the current moment.

It should be noted that, in the above-mentioned configuration according to the invention, the morphological analysis of electronic mail and the generation of the interest data 211 extracted from the analysis result are executed by the personal computer 1 and only the interest data 211 is sent to the HDD recorder 2. It is also practicable that a program similar in function to the agent program 11 of the personal computer 1 is installed on the HDD recorder 2, thereby making the HDD recorder 2 execute the morphological analysis of electronic mail and the generation of the interest data 211.

The processing is distributed as the following: the personal computer 1 executes morphological analysis on electronic mail and generates the interest data 211 on the basis of an analysis result; the HDD recorder 2 acquires the interest data 211 generated by the personal computer 1, sends the obtained interest data 211 to the server 6, and receives the recommendation of the program information matching the interest data 211; and the server 6 searches for the program information matching the interest data 211 and sends a search result to the HDD recorder 2.

However, the present invention is not restricted to the above-mentioned configuration. For example, the personal computer 1 may be provided, in one lump, with the program information in the recommended program database generated by the server 6 to execute the program information search. In this case, the HDD recorder 2 acquires the timer recording start time, timer recording end time, and channel included in the program information supplied from the personal computer 1, thereby executing timer recording.

Further, if the server 6 is an Internet service provider, executing the services of distributing the above-mentioned recommended programs and electronic mail, for example, the server 6 may directly access the mail server of the user to execute morphological analysis on electronic mail and generate the interest data 211 on the basis of an analysis result.

Figure 26:
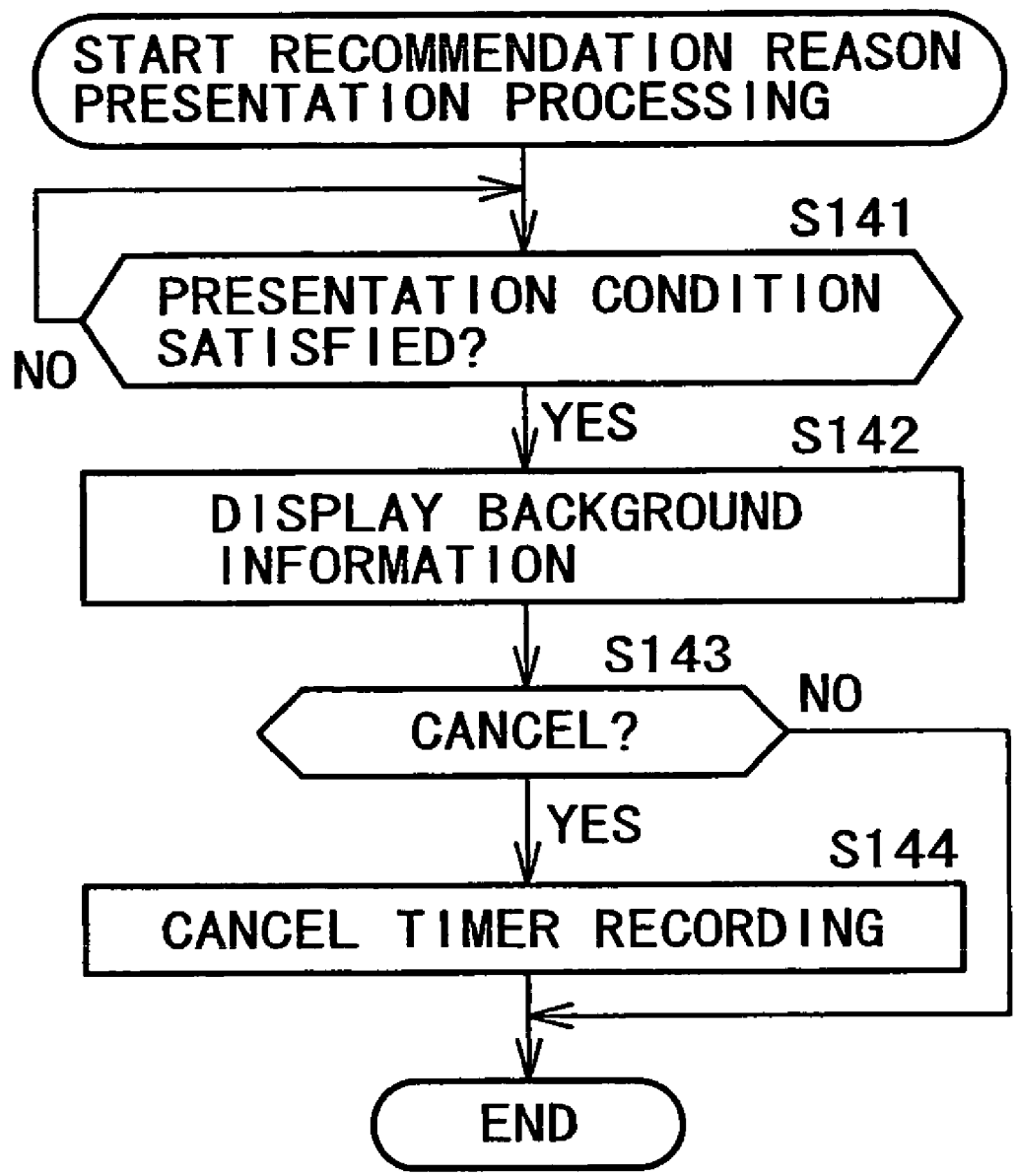
FIG. 26 is a flowchart indicative of program recommendation reason presentation processing.

It should be noted that, in the above-mentioned processing, programs matching user's interests are retrieved without his/her being aware thereof and the timer recording of these programs is automatically executed. So, the reason of the recommendation of each program to be timer recorded is presented to the user at time of powering on the HDD recorder 2, the confirmation of timer recording, or the reproduction of each timer-recorded program, for example. The following describes the processing of this presentation of the reason with reference to the flowchart shown in FIG. 26.

In step S141, the CPU 71 of the HDD recorder 2 determines whether a presentation condition is satisfied and waits until the presentation condition is found satisfied. The presentation condition here denotes that the timer recording of a program is set to the HDD recorder 2 and the television receiver 3 is powered on, or the timer recording of a program is set to the HDD recorder 2 and GUI screen of the HDD recorder 2 is in the display enabled state, for example.

If the presentation condition is found satisfied in step S141, then the procedure goes to step S142, in which the CPU 71 outputs the reason of recommendation (or the background information) to the television receiver 3 on the basis of the information, topic ID 162 to member information 165 (refer to FIG. 20), included in the interest data 211 recorded to the RAM 73 in step S123 shown in FIG. 25.

Figure 27:
FIG. 27 shows an exemplary display of recommendation reason.

FIG. 27 shows an exemplary display of the reason of recommendation. As shown, the agent 231 is appearing, accompanied by a balloon 232 containing lines of the agent 231 and an input window 233 which can be operated by the user. Inside the balloon 232, lines "You e-mailed Taro "Thanks for the wine" on Apr. 9, 2001, right? Do you want to record this without change?" for example.

In synchronization with the display of the balloon 232, the lines in the balloon 232 may be converted into a voice signal by a voice synthesizer, not shown, to be sounded in a desired language (Japanese or English for example). It should be noted that the display of the balloon 232 and the voice output may be set by the agent program 11 from time to time or by the user at desired times.

The input window 233 displays "Record" button which is operated to timer-record a program and "Cancel" button which is operated to cancel the timer recording.

From the contents of the electronic mail exchanged with "Taro" (in this example, "Thanks for the wine") in the lines contained in the balloon 232, the user knows that program "Visiting Wineries with XXX" was recommended by the server 6 and its timer recording has been set to the HDD recorder 2. If the user wants to record the program, he/she clicks "Record" button. If he/she wants to cancel the recording, he/she-clicks "Cancel" button. Assuming that neither of these buttons be operated, either may be automatically selected with the time-out used as a trigger.

Referring to FIG. 26 again, in step S143, the CPU 71 determines whether "Cancel" button has been selected to the input block 76. If "Cancel" button is found selected, then the procedure goes to step S144, in which the CPU 71 cancels the timer recording set to the RAM 73.

If "Cancel" button is found not selected, or "Record" button is found selected in step S143, the processing of step S144 is skipped.

Thus, the reason of recommendation of each program automatically set for timer recording can be displayed and the user can be made determine whether to record the program or not.

In the above-mentioned configuration according to the invention, the reason of recommendation is displayed by the HDD recorder 2 onto the television receiver 3. Alternatively, the search result may also be sent to the personal computer 1 when the server 6 sends the search result to the HDD recorder 2 in step S133 shown in FIG. 25, thereby displaying the reason of recommendation when the personal computer 1 is powered on or the agent program 11 is started. An exemplary display in which the reason of recommendation is displayed in this case is shown in FIG. 28.

In the example of FIG. 28, lines "In response to your e-mail to Taro "Thanks for the wine" on Apr. 9, 2001, the program titled "Visiting Wineries with XXX" is recommended. Do you want to record this program?" are displayed in the balloon 232.

Therefore, by the lines displayed in the balloon 232, the user knows that program "Visiting Wineries with XXX" has been recommended by the server 6 from the contents of the electronic mail exchanged with Taro (in this example, "Thanks for the wine") and the timer recording of this program is set to the HDD recorder 2. Then, to start the recording as it is, the user clicks "Record" button or, to cancel the recording, clicks "Cancel" button. If "Cancel" button is selected, the CPU 41 of the personal computer 1 sends a command for clearing the setting of timer recording to the HDD recorder 2, making the HDD recorder 2 cancel the timer recording.

Thus, the reason of recommendation of each program that has been automatically set for timer recording can be displayed onto the television receiver 3 via the HDD recorder 2 or the personal computer 1. Because the reason of recommendation includes the topic, date/time, mate, and subject for example of electronic mail exchanged, the reason of recommendation according to the invention is more appealing than a simple reason of recommendation such as "program XX has been recommended".

Figure 29:
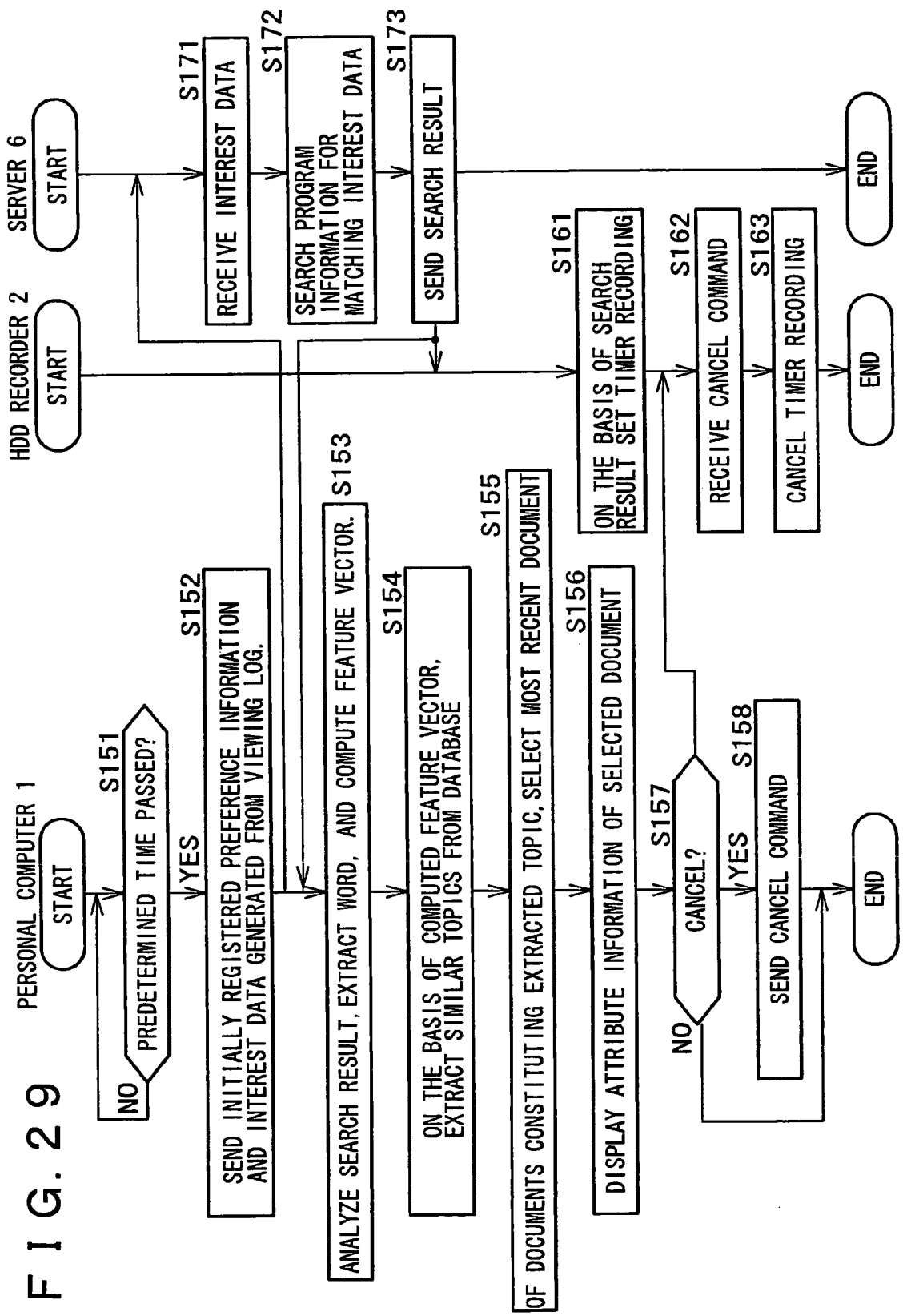
FIG. 29 is a flowchart indicative of program information search processing.

In the above-mentioned configuration according to the invention, the program information matching words (or interest words) included in electronic mail exchanged by the user or documents generated by the user is retrieved for recommendation. However, the recommendation of programs is not restricted to this configuration. For example, the preference information (preference genre name and cast name for example) initially registered by the user or the viewing log of programs viewed by the user may be analyzed to extract words of interest on the basis of analysis results, thereby searching for matching program information. The following describes the processing of this case with reference to the flowchart shown in FIG. 29.

In step S151, the event management block 41 of the personal computer 1 monitors the elapsed time by referencing the incorporated timer 41A to determine whether a predetermined period of time has passed and waits until it passes. If the predetermined period of time is found passing, the event management block 41 notifies the database query block 42 of the occurrence of an event, upon which the procedure goes to step S152.

In step S152, the database query block 42 reads the initially registered preference information or the interest data 211 obtained by performing morphological analysis on the viewing log from the database generated by the document feature database generation block 34 and sends the preference information or the interest data 211 to the server 6 via the network 5.

In step S171, the event management block 131 of the server 6 receives the interest data 211 from the personal computer 1 via the network 5. Then, the event management block 131 supplies the interest data 211 to the database query block 132, notifying it of a search request. In step S172, in response to the notification of a search request from the event management block 131, the database query block 132 searches the recommended program database generated by the database generation block 123 and selects, as a recommended program, the program information matching the interest data included in the search request.

In step S173, the program information output block 133 sends the recommended program (or program information) selected by the database query block 132 to the personal computer 1 and the HDD recorder 2 via the communication block 148 and the network 5 as a search result.

In step S161, the CPU 71 of the HDD recorder 2 sets the timer recording of the program to the RAM 73 on the basis of the recording start time, recording end time, and channel included in the program information received from the server 6 via the network 5 and controls the tuner 79, the demodulator 80, the decoder 81, and the HDD 78. Consequently, when the start time of timer recording comes, the program information is read from the RAM 73 to execute the timer recording.

In step S153, the event management block 41 receives the search result and notifies the database query block 32 of the occurrence of an event. In response to this notification from the event management block 41, the database query block 42 acquires the search result (or program information) corresponding to the occurrence of an event, executes morphological analysis on the obtained search result to extract words (or feature words), and computes the evaluation value of each word. Consequently, the feature vector of the search result (or program information) is computed.

In step S154, the database query block 42 searches the database generated by the document feature database generation block 34, computes an inner product between the feature vector obtained in step S153 and the feature vector of each topic recorded to the database, and extracts a topic which satisfies a predetermined condition (for example, a topic whose similarity is the maximum or equal to or higher than a predetermined threshold).

At this moment, topics having particular genre names (the genre names of programs initially registered by the user) may be selected in advance to efficiently extract a similar topic. Alternatively, topics having the genre names of general programs may be selected in advance to efficiently extract a similar topic.

In step S155, the database query block 42 selects a most recent document from among the documents constituting the topic extracted in step S154 and supplies the selected document to the associated information presentation block 43 via the event management block 41 or directly. In step S156, the agent control block 23 displays, on the desktop, the attribute information of the document selected in step S155, as the reason of the selection (or recommendation) (refer to FIG. 28).

In step S157, the agent program 11 determines whether "Cancel" button has been operated through the input block 56. If "Cancel" button is found clicked, then the procedure goes to step S158 and sends a timer recording cancel command to the HDD recorder 2. If "Cancel" button is found not selected, or "Record" button is found selected in step S157, then the processing of step S158 is skipped.

In step S162, the CPU 71 of the HDD recorder 2 receives the timer recording cancel command from the personal computer 1 and cancels the timer recording set to the RAM 73 in step S163.

Thus, the significant interest data 211 is generated by performing morphological analysis on the preference information initially registered by the user, the viewing log, and other information, so that the program information which matches the interest data 211 and is high in unexpectedness to the user can be recommended. In addition, by reversely referencing the topics (or documents) similar to a recommended program from the database generated by the document feature database generation block 34, the reason of recommendation associated with the recommended program can be obtained. Consequently, this configuration makes the user feel like programs are recommended to him/her from his/her personal association.

In the above-mentioned configuration according to the invention, the interest data 211 is generated from the electronic mail exchanged by the user, the documents generated by the user, or the user's preference information and viewing log, the program information matching the interest data 211 is retrieved, and the recommendation is made accordingly. Namely, the personal computer 1 or the HDD recorder 2 reads the interest data 211 generated in advance from the database and sends the retrieved interest data 211 to the server 6 via the network 5, thereby receiving the recommendation of programs matching the interest data 211. Therefore, in the novel configuration, those programs which seem to be interesting to the user are automatically retrieved, thereby recommending the programs regardless of the user's intention.

Obviously, the timer recording of programs may be done by the user's intention. The following describes the processing of program timer recording by the user by use of his/her digital mobile phone 4 away from home for example, with reference to the flowchart shown in FIG. 30.

The user operates the digital mobile phone 4 to prepare an electronic mail message for timer recording of a program (hereafter referred to as a timer recording mail) 241 as shown in FIG. 31. As shown in the figure, the body of the timer recording mail 241 has a message like "Record a music program today. Especially classical. If there is any jazz program, record it too. Lastly, record the World Cup information" for example.

Namely, in preparing the timer recording mail 241, the user need not be aware of a description format and therefore can write as he/she likes. The user may only write the name of a program to be timer recorded, a part of cast names, or the genre name to the timer recording mail 241. In order for the reception side of the timer recording mail 241 to be able to recognize that this electronic mail is for the timer recording of a program (namely, the timer recording mail 241), a formatted text such as "timer recording mail" or "timer recording" (in the example of FIG. 31, "timer recording mail") is written to "Subject" (the title of the mail).

The user operates the digital mobile phone 4 to send the prepared timer recording mail (FIG. 31) to the personal computer 1 at home. Consequently, in step S181, the digital mobile phone 4 receives an input signal corresponding to the operation done by the user and sends the prepared timer recording mail 241 to the personal computer 1 via the network 5.

In step S191, the event management block 41 of the personal computer 1 detects the reception of the timer recording mail 241 via the network 5 and notifies the database query block 42 thereof. In step S192, the database query block 42 acquires the timer recording mail 241 corresponding to the occurrence of an event from-the event management block 41. At this moment, the database query block 42 recognizes that this is the electronic mail for timer recording a program because "timer recording mail" is written to "Subject" of the timer recording mail 241. Then, the database query block 42 performs morphological analysis on the received timer recording mail 241 to extract words and deletes the unwanted words from them to generate (or compute) an interest word vector (or a feature vector).

In this example, from message "Record a music program today. Especially classical. If there is any jazz program, record it too. Lastly, record the World Cup information", "Today, music, classical, jazz, World Cup" are extracted by morphological analysis as interest words. "Today" is converted into data information (for example, Apr. 9, 2001) at this moment.

It should be noted that defining a tree structure for the categories enhances the accuracy of morphological analysis. For example, for the music category, "classical, jazz, pops, rock, Japanese ballad, . . . " may be defined in advance to apply this definition to the interest word vector extracted by the morphological analysis. Then, the interest word vector is configured by three words (or three interest words) "classical, jazz, World Cup".

In step S193, the database query block 42 sends the interest word vector generated in step S193 to the server 6 via the network 5.

In step S211, the event management block 131 of the server 6 receives the interest word vector from the personal computer 1 via the network 5. Then, the event management block 131 supplies the received interest word vector to the database query block 132 to notify it of a search request. In step S212, in response to the notification of a search request from the event management block 131, the database query block 132 searches the recommended program database generated by the database generation block 123 for the program information matching the interest word vector included in the search request, the retrieved program information being selected as the program to be timer recorded.

In step S213, the program information output block 133 sends the program to be timer recorded selected by the database query block 132 to the HDD recorder 2 via the network 5 as a search result.

In step S201, the CPU 71 of the HDD recorder 2 sets the timer recording of the program to the RAM 73 on the basis of the recording start time, recording end time, and channel included in the program information sent from the server 6 via the network 5, and at the same time, controls the tuner 79, demodulator 80, the decoder 81, the and HDD 78. Consequently, when the start time of timer recording comes, the program information is read from the RAM 73 to execute the timer recording.

In step S202, when the setting of timer recording has been completed, the CPU 71 prepares an electronic mail message (hereafter referred to as timer recording setting completion mail) 251 for telling the completion of the setting of timer recording of the program as shown in FIG. 32. As shown in the figure, the body of the timer recording setting completion mail 251 carries message "The following programs have been recorded:", "World Cup Highlights" in 4CH, 19:00-20:00, in the first entry, and "XXX "Classical" in 3CH, 21:00-21:54, in the second entry.

Then, the prepared timer recording setting completion mail 251 is sent to the digital mobile phone 4 via the network 5.

In step S182, the digital mobile phone 4 receives the timer recording setting completion mail 251 from the HDD recorder 2 via the network 5. Then, when the user operates the digital mobile phone 4 to display the received electronic mail, the digital mobile phone 4 displays the timer recording setting completion mail 251 onto its display device in step S183 on the basis of the input signal corresponding to the user operation.

Thus, the agent program 11 of the personal computer 1 performs morphological analysis on the received timer recording mail 241 and generates an interest word vector (or the information necessary for timer recording), sending it to the server 6. The server 6 searches predetermined program information matching the interest word vector received from the personal computer 1 and sends the retrieved program information to the HDD recorder 2. Consequently, the timer recording of program is automatically set to the HDD recorder 2.

Consequently, the user can easily timer record programs and easily know the completion of the setting of timer recording when he/she is away from home by simply sending the timer recording mail 241 prepared in a free text form to the personal computer 1 at home.

In the configuration described so far, the interest data 211 is prepared by performing morphological analysis on the contents of the electronic mail exchanged by the user, the preference information initially registered by the user, and the viewing log of the user, and the recommendation of the program information matching the interest data 211 is made or an interest word vector is generated by performing morphological analysis on the timer recording mail 241 (the electronic mail for timer recording programs) prepared by the user and the program information matching this interest word vector is recorded. Consequently, the user is provided with a variety of program recommendations suitable for scenes and purposes like programs of daily interest or programs of potential interest.

Also, the server 6 can recommend programs on the basis of the interest data 211 of other users by use of emphasis filtering. In this case, the personal computer 1 or the HDD recorder 2 filters the information included in the interest data 211 into the data that presents no privacy problem (for example, by selecting only genre names instead of program names) and sends the resultant data to the server 6. The level of this filtering may be set by the user as desired.

Further, as described with reference to FIG. 27, in order to make the user determine whether to timer record a recommended program at the time of presenting the reason of recommendation, the HDD recorder 2 may store the access log of recommended programs by classifying them into programs for which timer recording has been executed and programs for which timer recording has been canceled. Therefore, the HDD recorder 2 can generate preference data 260 shown in FIG. 33 by counting the frequency at which recommended programs are timer recorded or extracting new interests by performing morphological analysis on the access log.

Figure 33:
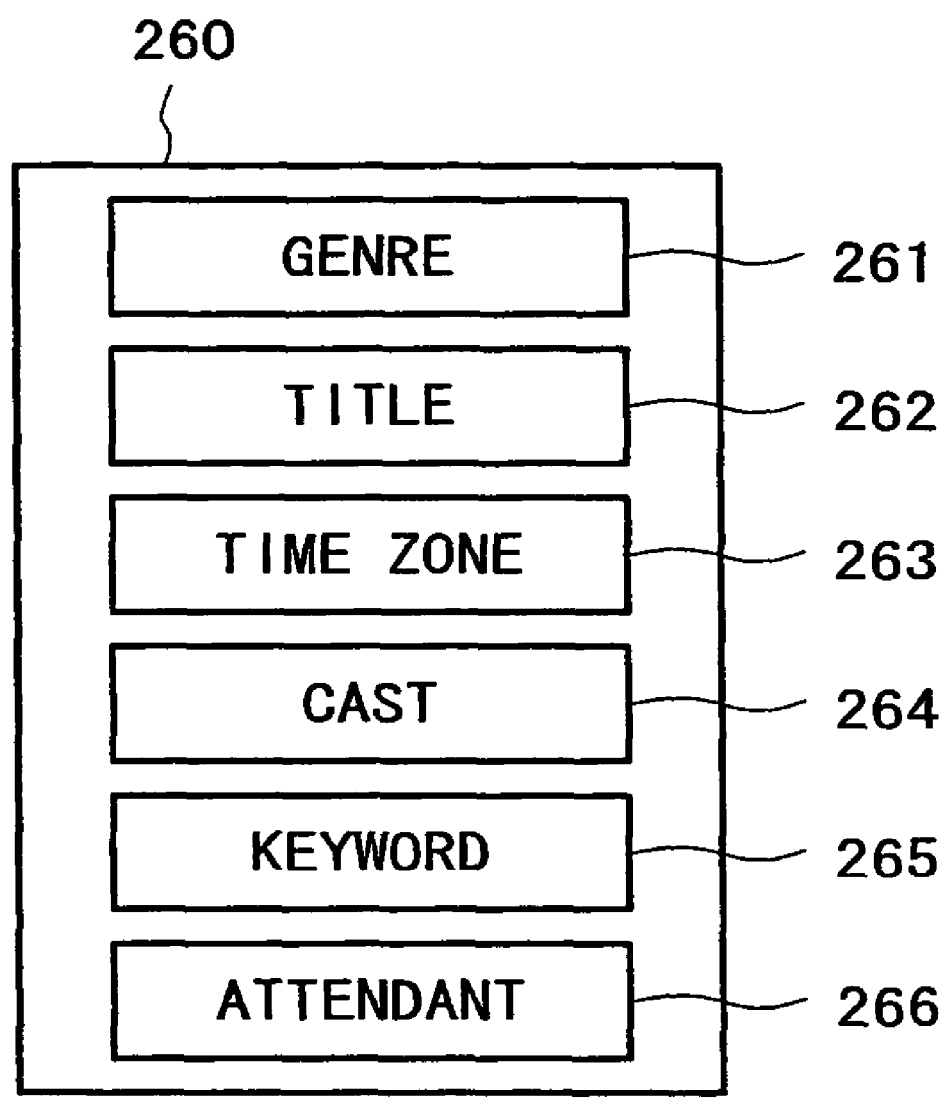
FIG. 33 is a schematic diagram illustrating one example of preference data.

In the example of FIG. 33, the preference data 260 is configured by a genre 261 indicative of the classification of recommended program (for example, drama, movie, news, sport, or music), a title 262 indicative of the name of a recommended program in question, time zone information 263 indicative of the broadcasting time zone of the recommended program in question (for example, morning, noon, evening, golden hour, or night), cast information 264 indicative of persons performing in the recommended program in question, contents (or keyword) information 265 indicative of the story or highlight of the recommended program in question, and attendant information 266 associated with a user who viewed the recommended program in question together with the user in question.

It should be noted that the attendant information 266 may be entered by the user through the output block 57, may be entered by detecting by the CPU 41 the device ID always originated from the user's digital mobile phone or clock and by identifying the user from the detected device ID, or may be entered recognizing the voice of conversation of each user and identifying the user from the recognition.

The preference data 260 thus generated is filtered into the data having no privacy problem and the resultant preference data is sent to the server 6. Receiving the preference data 260, the server 6 can search for the program information matching the preference data 260 and recommend programs which newly interest the user.

Figure 20:
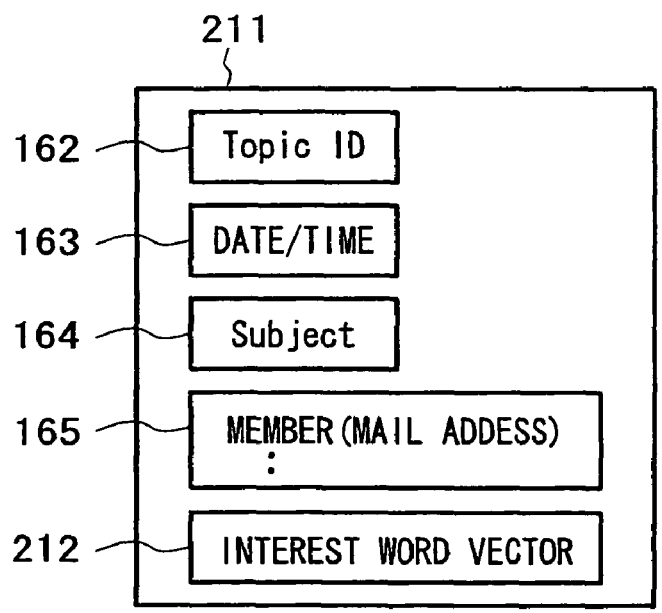
FIG. 20 is a schematic diagram illustrating one example of interest data.

It should be noted that the interest data 211 shown in FIG. 20 and the preference data 260 shown in FIG. 33 may also be easily accessed from any place and any device by defining a predetermined schema, and describing these data in extensible XML (eXtensible Markup Language) for example, and by use of HTTP (HyperText Transport Protocol).

In the above-mentioned configuration according to the invention, the personal computer 1 and HDD recorder 2 transmits/receives data via Ethernet (trademark). Alternatively, the personal computer 1 and the HDD recorder 2 may transmit/receive data via any of wireless LANs such as i.Link (trademark), IEEE (Institute of Electrical and Electronics-Engineers) 802.11a, IEEE 802.11b, and Bluetooth (trademark). Besides, the personal computer 1 and HDD recorder 2 may move data by use of any of removable media such as magnetic disk, optical disk, magneto-optical disk, and semiconductor memory.

In the present embodiment, those programs which match the interest data extracted from electronic mail are recommended. Obviously, it is also practicable to recommend radio programs or Web site information on the Internet.

Further, according to the invention, the agent 231 presents the reason of recommendation in the recommendation of programs, so that the user becomes to feel reliability and familiarity with the agent 231.

The display of the agent 231, the display of lines in the balloon 232, and the output of a voice signal representative of the displayed lines are applicable to not only the agent program 11 of the present invention, but also other applications, such as game and wordprocessor program help screens for example. In addition, these displays and output are obviously applicable to the characters which are shown on the display devices of video cameras and car navigation systems for example.

Figure 34:
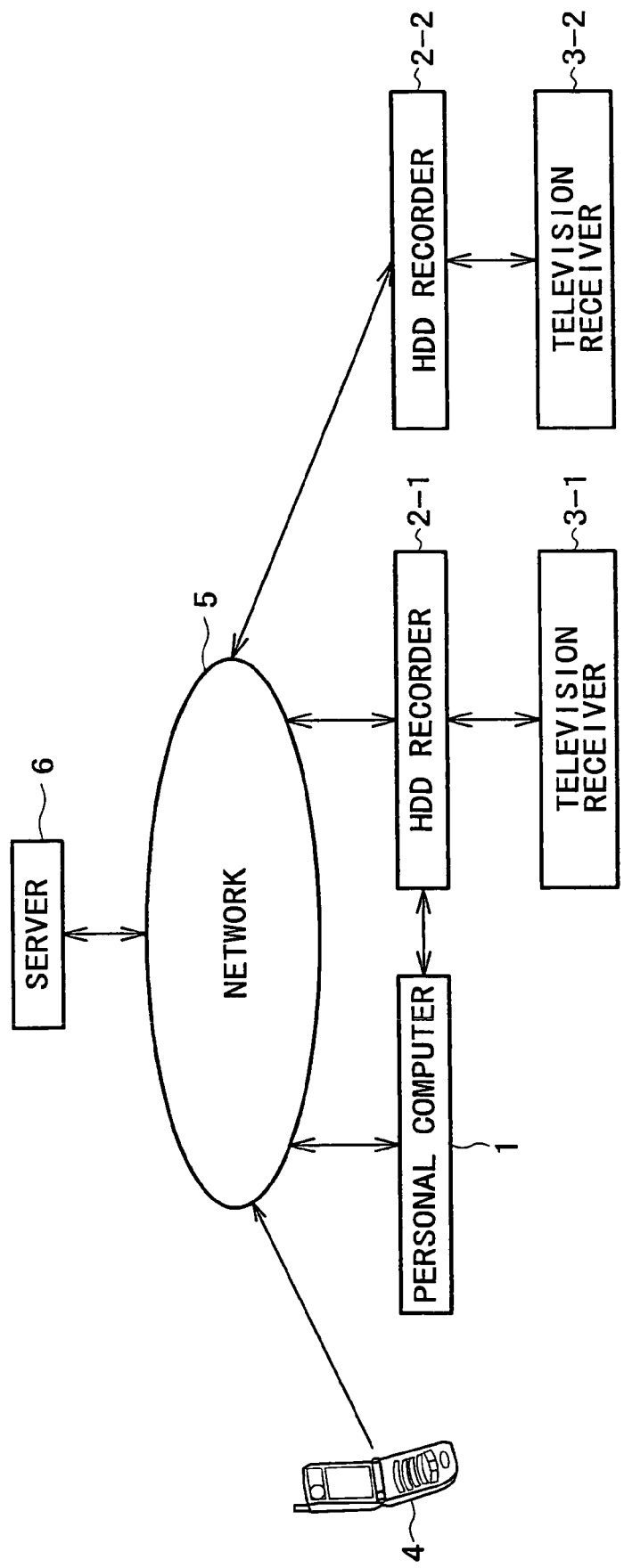
FIG. 34 is a schematic diagram illustrating an exemplary configuration of a program search system to which the present invention is applied.

It is also practicable to acquire the recommendation of programs on the currently used device by use of the preference data 260 accumulated on devices which are different from the currently used device. For example, as shown in FIG. 34, if a television receiver 3-1 is connected to an HDD recorder 2-1 which is connected to the network 5 and a television receiver 3-2 is connected to an HDD recorder 2-2 which is connected to the network 5, the user can acquire, on the HDD recorder 2-1, the recommendation of programs on the basis of the preference data 260 accumulated on the HDD recorder 2-2.

Figure 35:
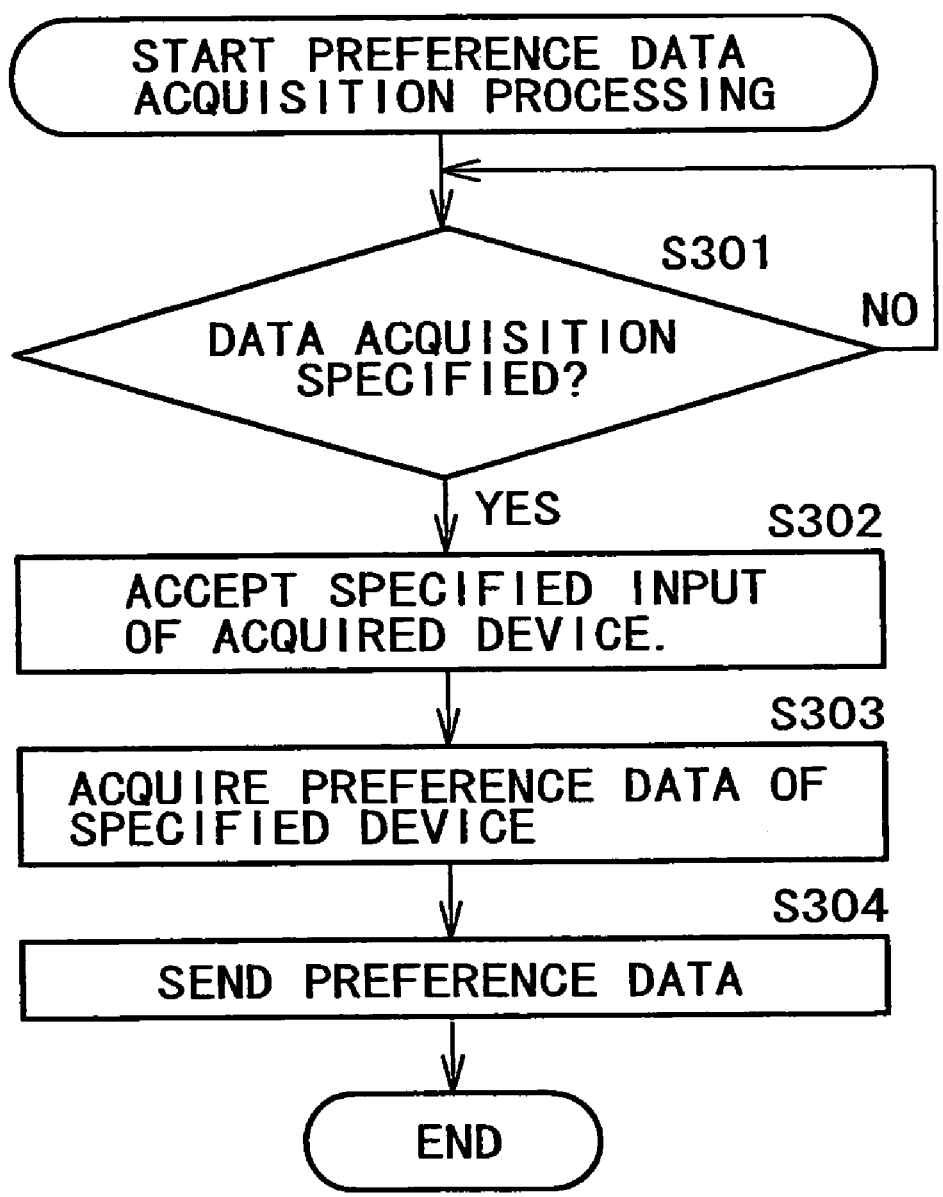
FIG. 35 is a flowchart indicative of preference data acquisition processing.

The following describes the processing of acquiring the preference data on the HDD recorder 2-1 with reference to the flowchart shown in FIG. 35. In step S301, the HDD recorder 2-1 determines whether an instruction for data acquisition has been issued and waits until the instruction is issued. The instruction is issued by the user through the input block 76 by use of the GUI screen shown on the monitor of the television receiver 3 for example.

In step S302, the HDD recorder 2-1 receives the input of the specification of an acquired device. At this moment, the device ID for identifying the HDD recorder 2-2 for example is entered by the user. In step S303, the HDD recorder 2-1 acquires the preference data of the specified device. At this moment, the HDD recorder 2-1 accesses the HDD recorder 2-2 via the network 5 to acquire the preference data 260 accumulated on the HDD recorder 2-2.

In step S304, the HDD recorder 2-1 sends the preference data 260 obtained in step S303 to the server 6.

Thus, the preference data of another device is obtained to be sent to the server 6.

Figure 36:
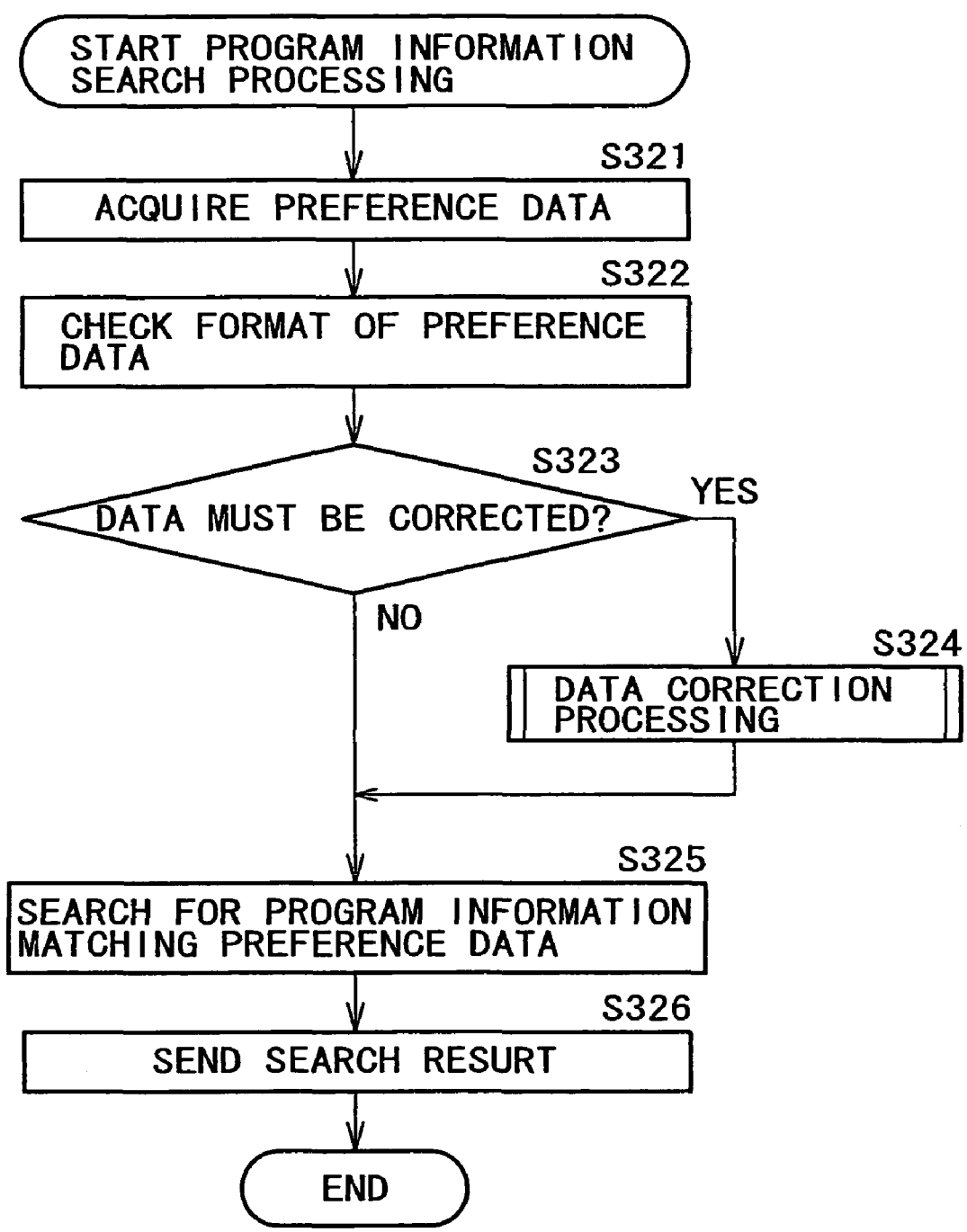
FIG. 36 is a flowchart indicative of program information search processing.

The following describes the processing of searching for program information in the server 6 on the basis of the preference data supplied in step S304, with reference to the flowchart shown in FIG. 36. In step S321, the event management block 131 of the server 6 receives the preference data 260 supplied via the network 5. Then, the event management block 131 sends the received preference data 260 to the database query block 132.

In step S322, the database query block 132 checks the format of the preference data 260. At this moment, the database query block 132 checks the preference data for any information (for example, genre) necessary for program information search.

Figure 38:
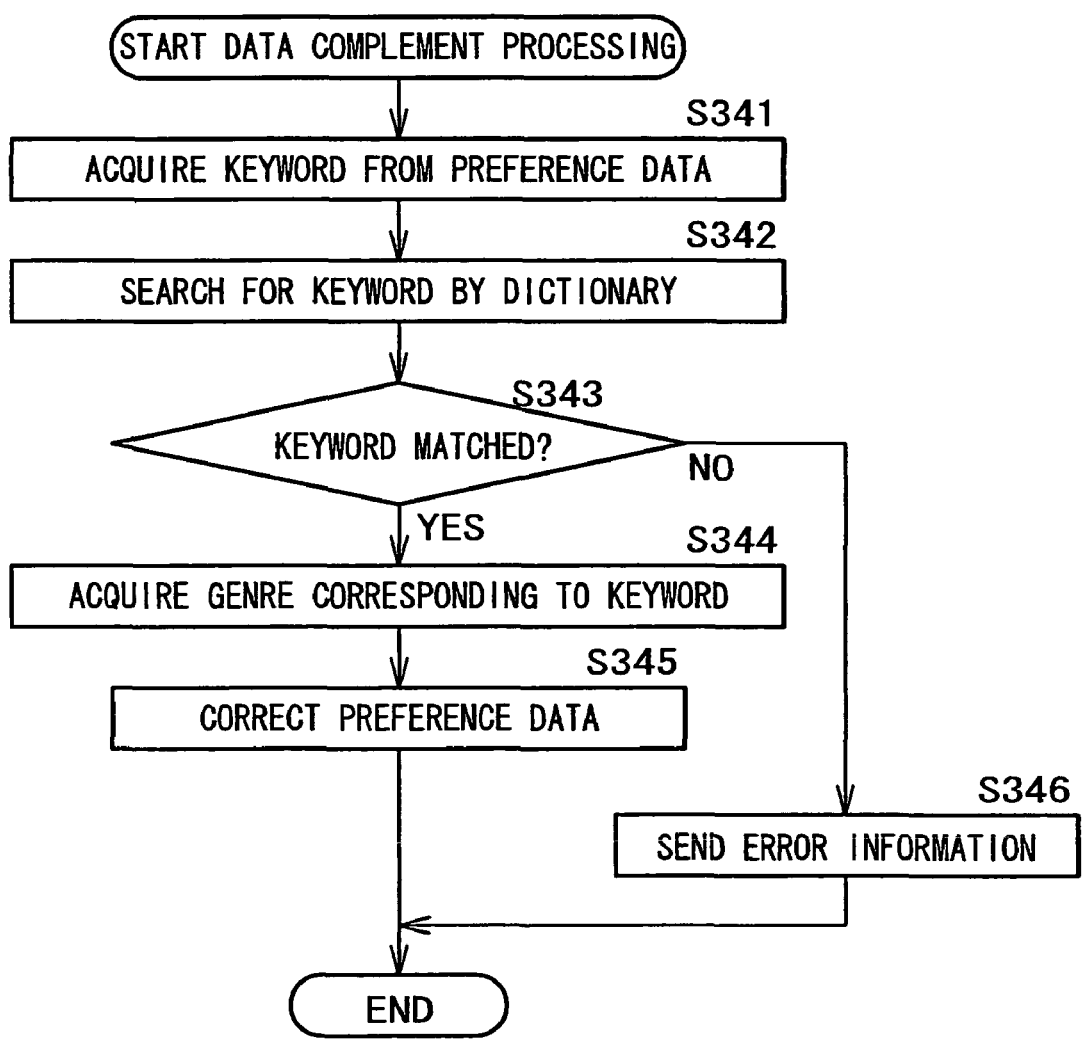
FIG. 38 is a flowchart indicative of a process of step S324 shown in FIG. 36.

In step S323, the database query block 132 determines whether the data must be corrected. If the preference data contains the information necessary for program information search, it is determined that the data need not be corrected, upon which the procedure goes to step S325. On the other hand, if the information necessary for program information search is not contained, it is determined that the data must be corrected. Then, the procedure goes to step S324, in which the database query block 132 references the flowchart shown in FIG. 38 to execute the data correction processing to be described later. Consequently, the information necessary for program information search is added to correct the preference data.

In step S325, the database query block 132 searches the recommended program database for the program information which matches the preference data 260. In step S326, the program information output block 133 sends the retrieved program information to the HDD recorder 2-1.

Thus, the recommendation of programs is executed on the basis of the preference data of a device (the HDD recorder 2-2 in this case) which is different from the device (HDD recorder 2-1) currently in use by the user in question. This configuration allows the user to widen his/her range of interests.

Figure 37:
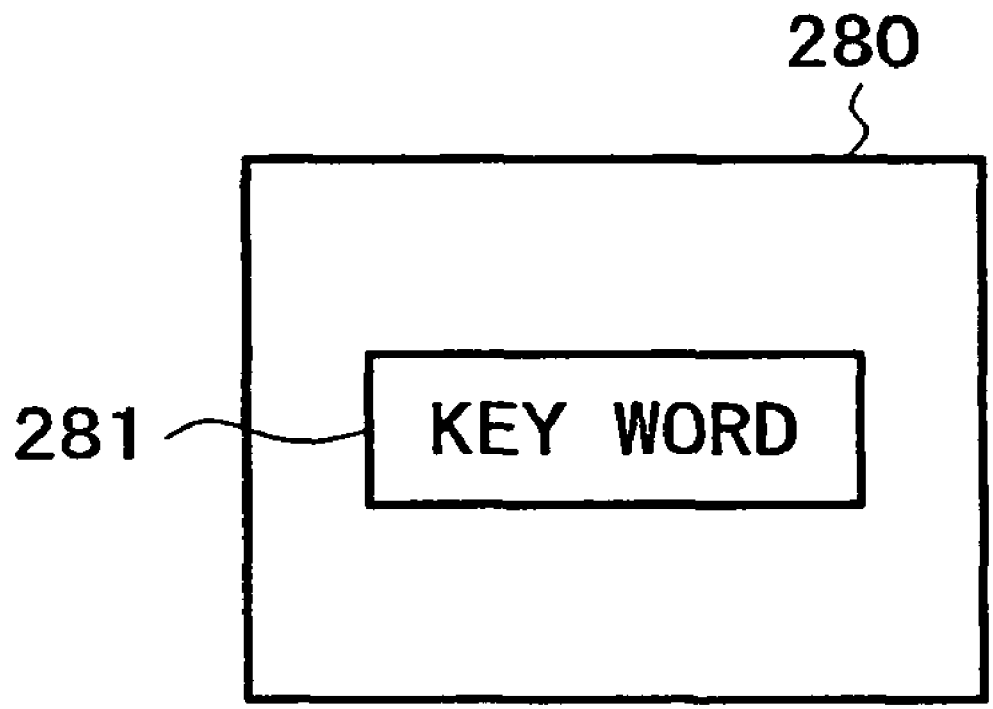
FIG. 37 is a schematic diagram illustrating one example of preference data.

It should be noted that the above-mentioned preference data is not restricted to that accumulated on the HDD recorder 2-1 or the HDD recorder 2-2; for example, the preference data accumulated on the personal computer 1 may also be used. FIG. 37 shows an exemplary configuration of preference data 280 accumulated on the personal computer 1. Unlike the preference data 260, the preference data 280 does not contain the information (refer to FIG. 33) such as the genre 261, the title 262, the broadcast time zone 263, and the cast information 264 and is constituted only by a keyword 281.

Since the preference data 280 does not contain the information (for example, genre) necessary for program information search, it is determined in step S323 that the data correction processing is required. In step S324, the data correction processing is executed. The following describes this data correction processing in step S324 of FIG. 36 with reference to the flowchart shown in FIG. 38.

In step S341, the database query block 132 extracts a keyword from the preference data 280. In step S342, the database query block 132 searches a dictionary for a keyword. This dictionary is a database in which keywords and genres are correlated, for example, and is stored beforehand in the storage block 59 of the server 6 by the dictionary generation processing to be described later with reference to FIG. 39.

In step S343, the database query block 132 determines whether there is match between the keywords. If a match is found, then the database query block 132 acquires the genre corresponding to the keyword in step S344. In step S345, the database query block 132 adds the obtained genre to the preference data 280, thereby correcting the data.

If there is no match between the keywords in step S343, then the procedure goes to step S346, in which error information is sent. Consequently, the HDD recorder 2-1 is notified that the search on the basis of the preference data in question failed.

This setup allows the recommendation of programs on the basis of the preference data which does not contain the information necessary for program information search. Especially, the recommendation of programs becomes practical on the basis of the preference data accumulated on the personal computer and mobile terminals for example on which programs are not viewed in general, thereby widening user's interests.

Figure 39:
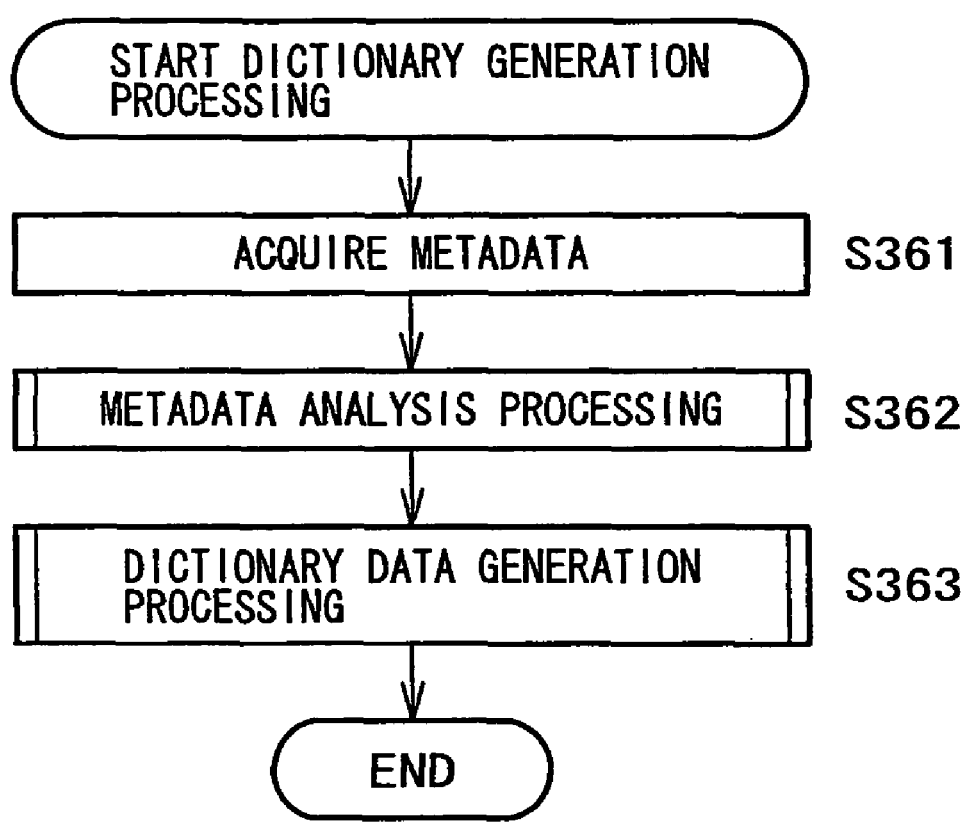
FIG. 39 is a flowchart indicative of dictionary generation processing.
Figure 40:
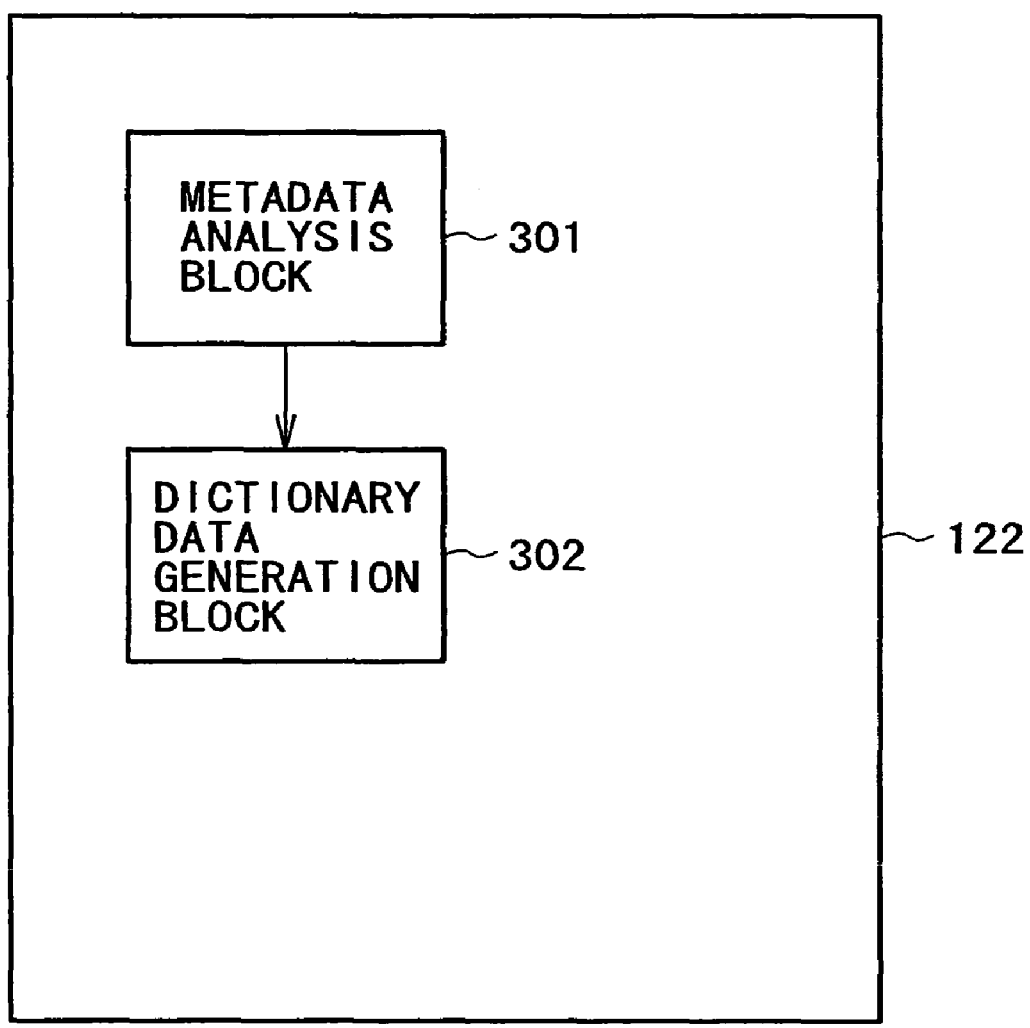
FIG. 40 is a schematic diagram illustrating an exemplary functional configuration of a data contents processing block shown in FIG. 5.

The following describes the dictionary generation processing with reference to the flowchart shown in FIG. 39. In step S361, the program-metadata acquisition block 121 acquires metadata. At this moment, the metadata to be acquired may be the program information such as EPG data or the metadata of content which is acquired via the network 5. The acquired metadata is transmitted/received to/from the data contents processing block 122. FIG. 40 shows an exemplary functional configuration of the data contents processing block 122. In this example, a metadata analysis block 301 for analyzing metadata and a dictionary data generation block 302 for generating dictionary data on the basis of results of the analysis by the metadata analysis block 301 are arranged.

In step S362, the metadata analysis block 301 executes metadata analysis processing to be described later with reference to the flowchart shown in FIG. 41. Consequently, the components of metadata are extracted and related with the genre of the metadata, the related data being stored. In step S363, the dictionary data generation block 302 executes the dictionary data generation processing to be described with reference to the flowchart shown in FIG. 44. Consequently, the dictionary data in which keywords and their genres are described are generated.

Figure 41:
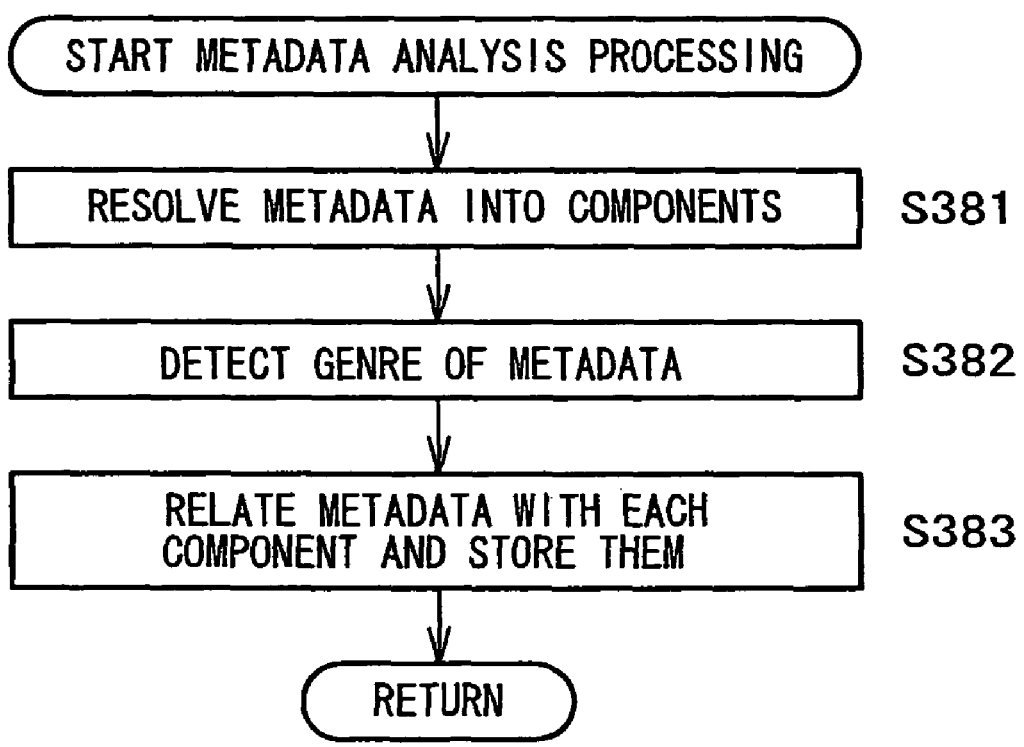
FIG. 41 is a flowchart indicative of a process of step S362 shown in FIG. 39.

The following describes the metadata analysis processing of step S362 shown in FIG. 40, with reference to the flowchart shown in FIG. 41. In step S381, the metadata analysis block 301 resolves the acquired metadata into components. The metadata is resolved as shown in FIG. 42.

FIG. 42 shows an example of resolved metadata. In this example, metadata is resolved into components "genre", "broadcasting station", "broadcast time zone", "cast", and "keyword". Component "genre" is indicative of the genre of the content corresponding to the metadata. Component "broadcasting station" is indicative of the broadcasting station which broadcasts the content corresponding to the metadata. Component "broadcast time zone" is indicative of the time zone in which the content corresponding to the metadata is broadcast. Component "cast" is indicative of the main cast appearing in the content corresponding to the metadata. Component "keyword" is indicative of predetermined words (for example, nouns) extracted from the character information for example which introduces the content corresponding to the metadata.

The first metadata component "genre" is described as "cooking". The first metadata component "broadcasting station" is described as "TAS". The first metadata component "broadcast time zone" is described as "noon". The first metadata component "cast" is described as "AAA". The first metadata component "keyword" is described as "recipe, ingredients, steps, teletext broadcast, stereo, . . . ".

The second metadata component "genre" is described as "daily life information". The second metadata component "broadcasting station" is described as "MHK". The second metadata component "broadcast time zone" is described as "night". The second metadata component "cast" is described as "BBB". The second metadata component "keyword" is described as "leisure, resort, children, teletext broadcast, stereo, . . . ".

The third metadata component "genre" is described as "children". The third metadata component "broadcasting station" is described as "MHK". The third metadata component "broadcast time zone" is described as "morning". The third metadata component "cast" is described as "CCC". The third metadata component "keyword" is described as "leisure, children, teletext broadcast, stereo, . . . ".

Thus, metadata is resolved into its components.

In step S382, the metadata analysis block 301 detects the genre of metadata. In step S383, the metadata analysis block 301 relates the detected genre with each component and stores the result into a temporary storage unit such as the RAM 73. At this moment, the metadata is gathered for each genre and arranged as shown in FIG. 43 before being stored. FIG. 43 shows an example of the data to be stored at this moment. In this example, the metadata with "cooking"

described in component "genre" are gathered, which are resolved into components "genre", "broadcasting station", "broadcast time zone", "cast", and "keyword" as described above. Likewise, the metadata with "daily life" described in "genre" and the metadata with "children" described in "genre" are gathered and stored.

Thus, the components of metadata are gathered for each metadata genre and stored.

Figure 44:
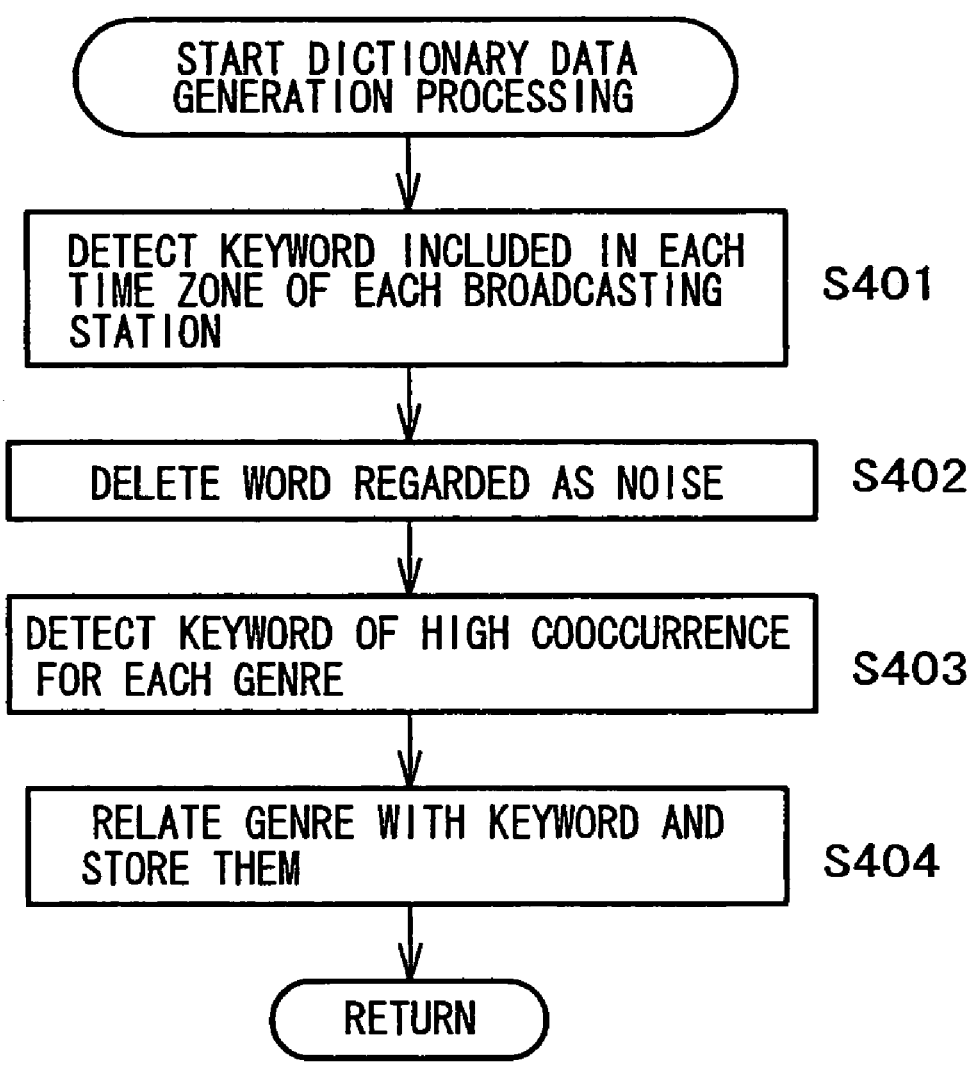
FIG. 44 is a flowchart indicative of a process of step S363 shown in FIG. 39.

The following describes the dictionary data generation processing of step S363 shown in FIG. 39 with reference to the flowchart of FIG. 44. In step S401, the dictionary data generation block 302 detects keywords contained in each time zone of each broadcasting station from the metadata stored in step S383. For example, "teletext broadcast" and "stereo" contained in component "keyword" in FIG. 42 are detected in each time zone of each broadcasting station. These words (or keywords) are regarded as words not important in understanding the contents of content, namely, these words are regarded as noise. So, in step S402, the dictionary data generation block 302 deletes these noise words.

In step S403, the dictionary data generation block 302 detects keywords which are high in cooccurrence for each genre. For example, "recipe", "ingredients", and "step" contained in component "keyword" shown in FIG. 43 are commonly contained in the first, second, and third metadata with "genre" classified as "cooking". These words (or keywords) are detected as the keywords high in cooccurrence in the metadata with "genre" classified as "cooking".

In step S404, the dictionary data generation block 302 relates genres with keywords and stores them as dictionary data. FIG. 45 shows an example of the dictionary data to be stored at this moment. In this example, the dictionary data is constituted by "keyword", "frequency/month", "genre", and "other components". "Keyword" contains the keywords having the cooccurrence detected in step S403. In this example, "recipe", "ingredients", and "steps" and so on are described. "Frequency/month" contains the number of times each keyword was detected in one month. The keywords having greater values in "frequency/month" are considered to be currently prevalent.

"Genre" contains the genres to which these keywords belong. For example, for each of the first keyword "recipe", the second keyword "ingredients", and the third keyword "steps", "genre" is described as "cooking". For the fifth keyword "resort", "genre" is described as "daily life information". For each of the fourth keyword "leisure" and the sixth keyword "children", "genre" is described as "daily life information, children". This indicates that, keyword "leisure" (or "children") is high in cooccurrence with the metadata with their genre classified as "daily life information" and is also high in cooccurrence with the metadata with their genre classified as "children".

"Other components" contains those components which are determined high in cooccurrence in their genres as well as their keywords.

Thus, the dictionary data is generated, formed into a database, and stored as a dictionary. Use of the dictionary generated as described above allows the recommendation of programs on the basis of the preference data which does not contain the information necessary for program information search as described above. Also, in generating a database of metadata such as program information, referencing the dictionary allows to assign genres to the metadata which is not assigned with genres, thereby generating program information as well as generating the program information about current prevalent programs.

The following describes the database generation processing for generating a metadata-database by use of the above-mentioned dictionary. In step S421, the program metadata acquisition block 121 acquires the transmitted/received metadata. Then, the acquired metadata is transmitted/received to/from the data contents processing block 122.

In step S422, the data contents processing block 122 determines whether a genre is assigned to the acquired metadata. If no genre is assigned, then the procedure goes to step S423 to detect a keyword of the metadata. In step S424, the data contents processing block 122 determines whether there is a keyword (or a keyword is found acquired). If a keyword is found, then the procedure goes to step S425 to search the dictionary data by the acquired keyword.

In step S426, the data contents processing block 122 determines whether a matching keyword is found in the dictionary data. If no matching keyword is found, then the procedure goes to step S428 to detect another keyword, upon which the procedure returns to step S424.

If no keyword is found (or acquired) in step S424, then the processing comes to an end.

If a matching keyword is found in step S426, then the procedure goes to step S427, in which the data contents processing block 122 acquires the genre corresponding to the detected keyword. For example, if keyword "recipe" is found in step S423 or step S428, it is determined that the genre corresponding to this keyword is "cooking" as described above with reference to FIG. 45, thereby acquiring "cooking" as the genre corresponding to these metadata.

In step S429, the data contents processing block 122 executes the data description processing to be described later with reference to FIG. 47. Consequently, the database of the program information (or the metadata) is stored.

On the other hand, if genre is found assigned to the metadata in question in step S422, then the procedure goes to step S430, in which the data contents processing block 122 acquires that genre. Then, the procedure goes to step S429 to execute data description processing.

Thus, on the basis of the acquired metadata, a database of the program information (or metadata) is generated. The metadata having no genre is also assigned with its genre and the resultant metadata is stored in the database.

Figure 46:
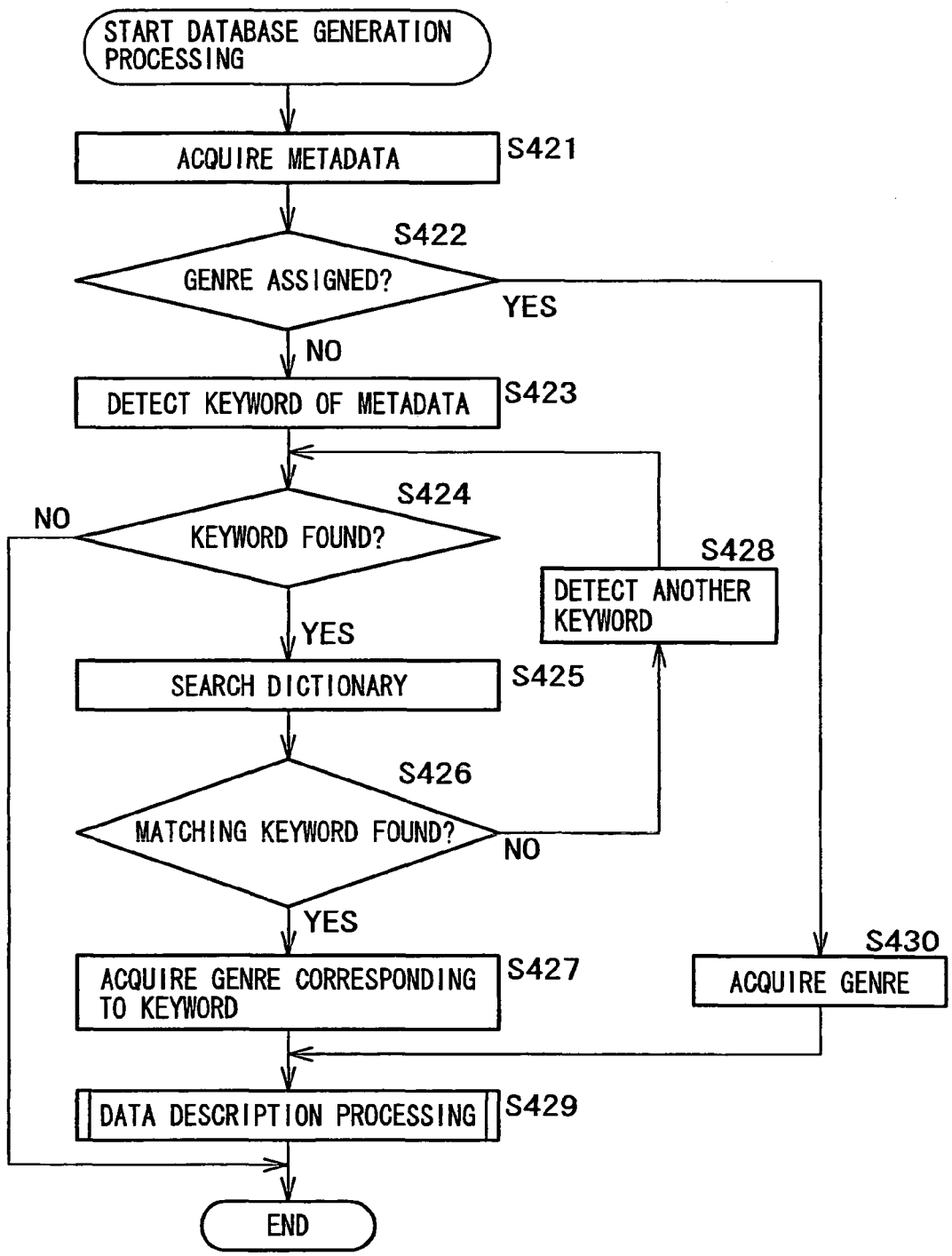
FIG. 46 is a flowchart indicative of database generation processing.
Figure 47:
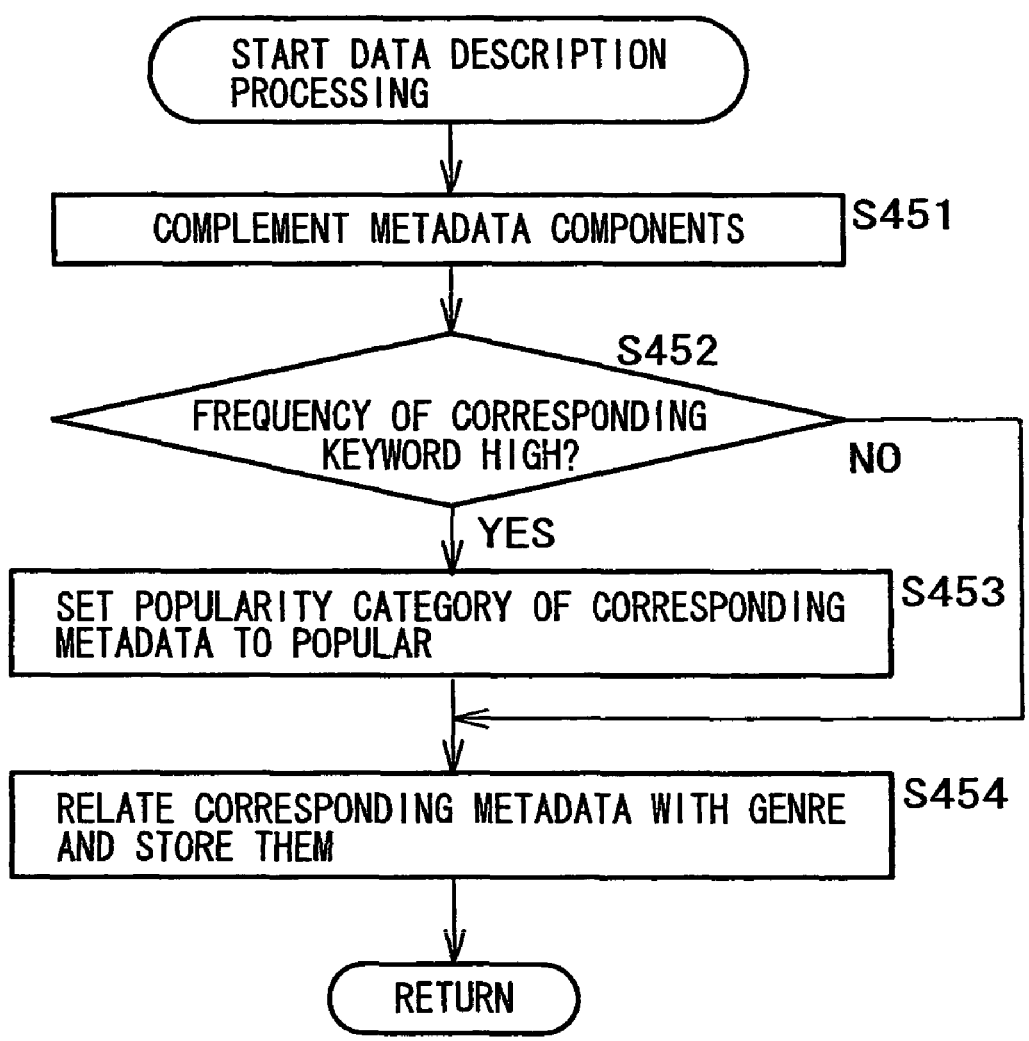
FIG. 47 is a flowchart indicative of a process of step S429 shown in FIG. 46.

The following describes the data description processing of step S429 shown in FIG. 46, with reference to the flowchart shown in FIG. 47. In step S451, the data contents processing block 122 complements metadata components.

For example, if there are two or more metadata components, a combination of components in which the correlation between particular components is extremely high and the correlation between other components is extremely low is extracted. By use of this combination, partially lacking components can be complemented. For example, suppose that there be A, B, C, D, ... X as metadata components and the attribute values for component A be A1, A2, A3, those for component B be B1, B2, B3, and B4, those for component C be C1 and C2, and those for component D be D1, D2, D3, and so on.

For the metadata already acquired may be checked for the correlation between components by referencing "other components" in the dictionary data shown in FIG. 45. From this checking, suppose that there be a strong correlation only between components A1 and B3 and between components C2 and D2 and there be no correlation between others. At this moment, if the metadata of a certain new piece of content are acquired, components A and D of these metadata are not assigned, and component B is B3 and component C is C2, then it can be predicted with high probability that the components constituting these metadata are A1, B3, C2, and D2. Thus, components A and D not yet assigned can be assigned to the metadata, thereby complimenting metadata components.

In step S452, the data contents processing block 122 determines whether the keyword in question detected in step S423 or step S428 is high in frequency. At this moment, the value of "frequency/month" corresponding to the keyword in question is detected from the dictionary data. If the detected value is higher than a predetermined value (for example, 10), then the keyword in question is determined to be high in frequency.

In step S452, if the keyword in question is found to be high in frequency, then the procedure goes to step S453, in which the popularity category of the metadata in question is set to popular. Thus, providing metadata with their popularity category and storing the resultant metadata as associated information can recommend popular content to the user by use of this associated information.

On the other hand, if the keyword in question is fount not to be high in frequency in step S452, then the processing of step S453 is skipped.

In step S454, the data contents processing block 122 relates the metadata in question with genre and stores the result as a database.

Thus, the components constituting the metadata are complemented and a popularity category is set to the metadata to be described to the database.

The agent program 11 or the server program 101 which executes the above-mentioned sequence of processing operations is built in the personal computer in advance or installed thereon from a recording medium later.

The above-mentioned sequence of processing operations can be executed also by hardware; however, generally, they are executed by software. When the above-mentioned sequence of processing operations are executed by software, the agent program 1 constituting this software is installed, from a recording medium, into computers which are each assembled in a dedicated hardware apparatus or in general-purpose personal computers for example which can execute various functions by installing various software programs.

The recording medium storing software programs which are installed in computers to be executed may be a package medium based on magnetic disk (including flexible disk) 62, 150, optical disk (including CD-ROM (Compact Disk Read-Only Memory) and DVD (Digital Versatile Disk)) 63, 151, magneto-optical disk (including MD (Mini-Disk)) 64, 152, or semiconductor memory 65, 153 or the hardware based on ROM 52, 142 or storage block 59, 147 in which programs are stored temporarily or permanently. The recording of programs to any of the above-mentioned recording media is executed by use of wired or wireless communication media such as public line network, local area network, the Internet, and digital satellite broadcasting via the interface such as a router and a modem, as required.

It should be noted herein that the steps for describing each program recorded in recording media include not only the processing operations which are sequentially executed in a time-dependent manner but also the processing operations which are executed concurrently or discretely.

The term "system" as used herein denotes an entire apparatus composed by a plurality of component units.

INDUSTRIAL APPLICABILITY

As described and according to the first aspect of the invention, television programs can be recommended.

Namely, according to the first aspect of the invention, the interests of each user are extracted from his/her electronic mail both sent and received, and the television programs matching the extracted interests are recommended.

According to a second aspect of the invention, the search for television programs can be requested with ease.

Namely, according to the second aspect of the invention, the interests of each user are extracted from his/her electronic mail both sent and received, and the search for the television programs matching the extracted interests can be requested.

According to a third aspect of the invention, a program information database can be searched for television programs.

Namely, according to the third aspect of the invention, on the basis of the interests of each user extracted from his/her electronic mail both sent and received, the database is searched for the television programs matching the user's interests and the retrieved television programs are recommended to the user.

According to a fourth aspect of the invention, the timer recording of television programs can be easily set also away from home.

Namely, according to the fourth aspect of the invention, the user generates an electronic mail message for setting the timer recording of television programs away from home and sends this electronic mail message to a recording apparatus installed in home. The recording apparatus receives the electronic mail message, extracts the information about timer recording, and acquires the television programs matching the timer recording information from a server, thereby timer-recording the matching television programs.

According to a fifth aspect of the invention, television programs can be timer-recorded with ease.

Namely, according to the fifth aspect of the invention, an electronic mail message for timer-recording television programs is received, timer recording information is extracted from the received electronic mail message, and the program information about the television programs matching the timer recording information are obtained from a server, thereby timer-recording the matching television programs.

According to a sixth aspect of the invention, user's interests are extracted from the electric mail both sent and received by the user and the television programs matching the extracted interests are recommended to the user.

According to a seventh aspect of the invention, user's interests can easily be extracted from the electronic mail both sent and received by the user, thereby requesting the search for television programs matching the extracted interests.

The invention claimed is:

1. An information search system comprising:
an information processing apparatus, comprising:
extraction means for analyzing electronic mail associated with a user, the extraction means comprising:
means for grouping the user's electronic mail into topics;
means for extracting from the user's electronic mail interest words corresponding to the topics for obtaining information about a television program;
means for generating topic files for the topics, the topic files including word vectors containing the interest words and including feature vectors containing weights of the interest words, the weights indicating the degree of relevance of the interest words to the topics; and means for calculating evaluation values for the topics based on the weights of the interest words and for selecting topics with an evaluation value above a threshold; and means for sending a request to search television program information based on the interest words corresponding to the selected topics; and means for receiving television program information identified in the search;

an information search apparatus in communication with the information processing apparatus via a network, the information search apparatus comprising:

means for accumulating the television program information;

means for searching the accumulated television program information for television program information associated with the interest words corresponding to the selected topics in response to the search request; and means for sending the television program information identified by the search to the information processing apparatus.

2. The information search system according to claim 1, wherein the extraction means further includes means for performing morphological analysis on the electronic mail to identify the interest words.

3. The information search system according to claim 1, wherein the information processing apparatus further comprises means for generating a database containing the interest words.

4. The information search system according to claim 1, wherein the information processing apparatus further comprises means for controlling the recording of the television program based on the received television program information.

5. The information search system according to claim 1, wherein the information processing apparatus further comprises means for controlling the display of the received television program information.

6. The information search system according to claim 1, wherein the means for accumulating includes means for making a database by relating the television program information with the television program.

7. The information search system according to claim 1, wherein the received television program information includes a recording start time, a recording end time, and channel information for recording the television program.

8. The information search system according to claim 1, wherein the information processing apparatus acquires the electronic mail from another information processing apparatus.

9. An information processing apparatus comprising:

extraction means for analyzing an electronic mail message associated with a user, the extraction means comprising:

means for grouping the user's electronic mail into topics;

means for extracting from the user's electronic mail interest words corresponding to the topics for obtaining information associated with a television program;

means for generating topic files for the topics, the topic files including word vectors containing the interest words and including feature vectors containing weights of the interest words, the weights indicating the degree of relevance of the interest words to the topics; and means for calculating evaluation values for the topics based on the weights of the interest words and for selecting topics with an evaluation value above a threshold; and means for sending a request to an information search apparatus to search television program information based on the interest words corresponding to the selected topics; and means for receiving television program information identified in the search from the information search apparatus.

10. The information processing apparatus according to claim 9, wherein the extraction means further includes means for performing morphological analysis on the electronic mail to identify the interest words.

11. The information processing apparatus according to claim 9, further comprising means for generating a database containing the interest words.

12. The information processing apparatus according to claim 9, further comprising means for controlling the recording of the television program based on the received television program information.

13. The information processing apparatus according to claim 9, further comprising means for controlling the display of the received television program information.

14. The information processing apparatus according to claim 9, wherein the received television program information includes a recording start time, a recording end time, and channel information for recording the television program.

15. The information processing apparatus according to claim 9, wherein the electronic mail is obtained from another information processing apparatus.

16. An information processing method for an information processing apparatus having means for controlling the recording of a television program, the method comprising:

analyzing an electronic mail message associated with a user, the analyzing comprising:

grouping the user's electronic mail into topics;

extracting from the user's electronic mail interest words corresponding to topics for obtaining information associated with the television program;

generating topic files for the topics, the topic files including word vectors containing the interest words and including feature vectors containing weights of the interest words, the weights indicating the decree of relevance of the interest words to the topics; and calculating evaluation values for the topics based on the weights of the interest words and for selecting topics with an evaluation value above a threshold;

sending a request to an information search apparatus to search television program information based on the interest words corresponding to the selected topics; and receiving television program information identified in the search from the information search apparatus.

17. A computer-readable medium storing a computer-readable software program which, when executed by an information processing apparatus having means for controlling the recording of a television program, causes the information processing apparatus to perform a method, the method comprising:

analyzing an electronic mail message associated with a user, the analyzing comprising:

grouping the user's electronic mail into topics;

extracting from the user's electronic mail interest words corresponding to topics for obtaining information associated with the television program;

generating topic files for the topics, the topic files including word vectors containing the interest words and including feature vectors containing weights of the interest words, the weights indicating the degree of relevance of the interest words to the topics; and calculating evaluation values for the topics based on the weights of the interest words and for selecting topics with an evaluation value above a threshold;

sending a request to an information search apparatus to search television program information based on the interest words corresponding to the selected topics; and receiving television program information identified in the search from the information search apparatus.

18. An information search apparatus, comprising:

means for accumulating information associated with television programs;

means for determining genres of the television programs based on the information associated with the television programs;

means for generating dictionary data for the television programs, the dictionary data correlating the genres of the television programs to keywords contained in the information associated with the television programs;

means for receiving an interest word sent from an information processing apparatus, the interest word associated with the preferences of a user;

means for determining a keyword based on the interest word;

means for searching the dictionary data based on the keyword to identify a genre corresponding to the keyword;

means for searching the accumulated television program information based on the identified genre corresponding to the keyword; and means for sending television program information identified in the search to the information processing apparatus.

19. The information search apparatus according to claim 18, wherein the interest word is obtained by performing morphological analysis on an electronic mail message associated with the user.

20. The information search apparatus according to claim 18, wherein the sent television program information contains a recording start time, a recording end time, and a channel information for recording the television program.

21. The information search apparatus according to claim 18, further comprising database generation means for:
  identifying television programs that are not assigned genres based on the information associated with the television programs;
  searching the dictionary data based on the keywords contained in the information associated with the television programs to identify genres for the identified television programs;
  assigning the identified genres to the identified television programs in the accumulated television program information; and
  storing the accumulated television program information.

22. The information search apparatus according to claim 18, wherein the means for generating dictionary data has keyword detection means for detecting a word contained in metadata of a genre, as a keyword of the genre.

23. The information search apparatus according to claim 18, wherein the means for generating dictionary data generates the dictionary data by storing, with the keyword, a frequency at which keyword is detected.

24. An information search method for an information search apparatus for searching for information, the method comprising:

accumulating information associated with television programs;

determining genres of the television programs based on the information associated with the television programs;

generating dictionary data for the television programs, the dictionary data correlating the genres of the television programs to keywords contained in the information associated with the television programs;

receiving an interest word sent from an information processing apparatus, the interest word associated with the preferences of a user;

determining a keyword based on the interest word;

searching the dictionary data based on the keyword to identify a genre corresponding to the keyword;

searching the accumulated television program information based on the identified genre corresponding to the keyword; and sending television program information identified by the search to the information processing apparatus.

25. A computer-readable storage medium storing a computer-readable software program which, when executed by an information search apparatus, causes the information search apparatus to perform a method, the method comprising:

accumulating information associated with television programs;

determining genres of the television programs based on the information associated with the television programs;

generating dictionary data for the television programs, the dictionary data correlating the genres of the television programs to keywords contained in the information associated with the television programs;

receiving an interest word sent from an information processing apparatus, the interest word associated with the preferences of a user;

determining a keyword based on the interest word;

searching the dictionary data based on the keyword to identify a genre corresponding to the keyword;

searching the accumulated television program information based on the identified genre corresponding to the keyword; and sending television program information identified by the search to the information processing apparatus.

26. An information search system having a mobile terminal apparatus, an information processing apparatus connected to the mobile terminal apparatus via a network, and an information search apparatus which is accessed by the information processing apparatus via the network, the mobile terminal apparatus comprising:

means for generating an electronic mail message associated with a user; and first transmission means for sending the electronic mail message to the information processing apparatus;

the information processing apparatus comprising:
  extraction means for analyzing the electronic mail message to extract an interest word for obtaining information associated with a television program;
  means for sending a request to the information search apparatus to search for television program information corresponding to the extracted interest word; and
  means for receiving television program information identified in the search from the information search apparatus;

the information search apparatus comprising:

means for accumulating information associated with television programs;

means for determining genres of the television programs based on the information associated with the television programs;

means for generating dictionary data for the television programs, the dictionary data correlating the genres of the television programs to keywords contained in the information associated with the television programs;

means for receiving the extracted interest word from the information processing apparatus;

means for determining a keyword based on the extracted interest word;

means for searching the dictionary data based on the keyword to identify a genre corresponding to the keyword;

means for searching the accumulated television program information based on the identified genre corresponding to the keyword in response to the search request; and second transmission means for sending television program information identified by the search to the information processing apparatus.

27. The information search system according to claim 26, wherein the extraction means includes means for performing morphological analysis on the electronic mail message to identify the interest word.

28. The information search system according to claim 26, wherein the information processing apparatus further comprises means for controlling the recording of the television program based on the received television program information.

29. The information search system according to claim 26, wherein the means for accumulating includes means for generating a database by relating the television program information with the television program.

30. The information search system according to claim 26, wherein the electronic mail message includes at least one of a television program name, a genre name, and a cast name.

31. The information search system according to claim 26, wherein the received television program information contains a recording start time, a recording end time, and channel information for recording the television program.

* * * * *